(12) United States Patent
Sekine et al.

(10) Patent No.: US 8,493,301 B2
(45) Date of Patent: Jul. 23, 2013

(54) LIQUID CRYSTAL DISPLAY DEVICE

(75) Inventors: Hiroyuki Sekine, Kanagawa (JP); Kazunori Masumura, Kanagawa (JP)

(73) Assignee: NLT Technologies, Ltd., Kanagawa (JP)

(*) Notice: Subject to any disclaimer, the term of this patent is extended or adjusted under 35 U.S.C. 154(b) by 1351 days.

(21) Appl. No.: 12/051,338

(22) Filed: Mar. 19, 2008

(65) Prior Publication Data

US 2008/0239177 A1 Oct. 2, 2008

(30) Foreign Application Priority Data

Mar. 29, 2007 (JP) ................................ 2007-086188
Mar. 7, 2008 (JP) ................................ 2008-057377

(51) Int. Cl.
*G09G 3/36* (2006.01)

(52) U.S. Cl.
USPC ............... 345/87; 345/88; 345/100; 345/102; 345/204; 345/205; 349/15; 353/34

(58) Field of Classification Search
USPC ................... 345/82, 83, 76, 77, 88, 102, 204, 345/208–210, 215, 30, 50, 55, 84, 87, 100, 345/105; 349/15; 353/34
See application file for complete search history.

(56) References Cited

U.S. PATENT DOCUMENTS

| | | | | |
|---|---|---|---|---|
| 7,417,627 B2 * | 8/2008 | Cok | ............................... | 345/173 |
| 2004/0004606 A1 * | 1/2004 | Kodate et al. | ................. | 345/204 |
| 2005/0264504 A1 * | 12/2005 | Park | ............................... | 345/87 |
| 2006/0145962 A1 * | 7/2006 | Jeon | ................................ | 345/76 |

FOREIGN PATENT DOCUMENTS

| | | |
|---|---|---|
| CN | 1499456 A | 5/2004 |
| CN | 1514427 A | 7/2004 |
| CN | 1573451 A | 2/2005 |
| CN | 1584661 A | 2/2005 |
| CN | 1707597 A | 12/2005 |
| JP | 63-97919 A | 4/1988 |
| JP | 5-127195 A | 5/1993 |
| JP | 2001-66547 A | 3/2001 |
| JP | 2001-318363 A | 11/2001 |

OTHER PUBLICATIONS

Office Action dated Oct. 9, 2012, issued by the Japanese Patent Office in counterpart Japanese Patent Application No. 2008-057377.

* cited by examiner

*Primary Examiner* — Lun-Yi Lao
*Assistant Examiner* — Insa Sadio
(74) *Attorney, Agent, or Firm* — Sughrue Mion, PLLC

(57) ABSTRACT

To reduce flickers generated in a liquid crystal display device for allowing the use of a liquid crystal material exhibiting a high response speed so as to improve the light utilizing efficiency of a field sequential type liquid crystal display device. A liquid crystal display device includes: a display panel including a pixel matrix in which pixels each including a switching element and a pixel electrode are arranged in matrix near intersection of data lines and gate lines, and a counter electrode arranged to oppose the pixel matrix; and a control part which divides a period for displaying a color image of one frame into a plurality of sub-frame periods, and lights up light sources of different colors for each of the sub-frame periods to display images on the display panel. A shield electrode layer separated by an insulating film is disposed between the pixel electrode and the data lines.

15 Claims, 49 Drawing Sheets

LIQUID CRYSTAL DISPLAY DEVICE

CROSS-REFERENCE TO RELATED APPLICATION

This application is based upon and claims the benefit of priority from Japanese patent application No. 2007-086188, filed on Mar. 29, 2007, and Japanese patent application No. 2008-057377, filed on Mar. 7, 2008, the disclosure of which is incorporated herein in its entirety by reference.

BACKGROUND OF THE INVENTION

1. Field of the Invention

The present invention relates to a liquid crystal display device.

2. Description of the Related Art

Active matrix type liquid crystal display devices including thin film transistors (TFT) at each of the pixels are capable of displaying videos with high picture qualities, so that many of such type of display devices are used for thin-type television sets, displays for portable terminal devices, projector light valves, etc.

Such liquid crystal display device used for thin type television sets and portable terminal devices normally has such a structure that is shown in FIG. 42. In this liquid crystal display device, for displaying a color image, one pixel is divided into three sub-pixels, and color filters of red (R) 171, green (G) 172, and blue (B) 173 are provided to the sub-pixels, respectively. Gate line 177 are scanned by a gate driver 174, and video signals are supplied to data lines 178 by a data driver 175 to select pixels so as to drive corresponding liquid crystals to achieve a color display.

In the meantime, a light valve used for a liquid crystal projector has a structure where each pixel is formed as a single piece as shown in FIG. 43. There is no color filter provided in the liquid crystal display device that configures this light valve, and a single pixel is not divided into a plurality of sub-pixels, either. This is because, in a typical projector, three light valves of red (R), green (G), and blue (B) are used for corresponding to light of three primary colors, gate lines 187 are scanned by a gate driver 184, and video signals are supplied to a data line 188 by a data driver 185 to drive the liquid crystals of each pixel.

FIG. 44 shows a structure of a three-plate type liquid crystal projector that uses such three light valves. As shown in this drawing, light from a light-source lamp 191 is separated by a color separating mirror 192 or the like and irradiated to each of the light valves 194-196 via mirrors 193. The transmitted light is synthesized by a synthesizing prism 198 to form a color image, and it is projection-displayed by a projection lens 199. Because of such structure, it is unnecessary to provide color filters to each of the light valves 194-196, as shown in FIG. 43.

It is necessary to divide a single pixel into three sub-pixels in the liquid crystal display device which performs color displays by using the color filters, as it is described earlier by referring to FIG. 42. Thus, when the resolution of the liquid crystal display device is increased, the areas of each of the sub-pixels become reduced. This leads to reduction of the numerical aperture, which results in causing light loss. Further, the three-plate type liquid crystal projector shown in FIG. 44 requires three light valves, so that the cost thereof becomes high and the device cannot be formed small in size.

As a measure for overcoming such issues, there is a field sequential type liquid crystal display device as the one depicted in Japanese Unexamined Patent Publication 2001-318363 (Patent Document 1).

The field sequential type is a system which divides the time for a liquid crystal display device to display a video of one screen into three periods, displays videos corresponding to colors of red (R), green (G), and blue (B) in each period, and switches the colors of the light irradiated to the liquid crystal display device by synchronizing with the videos to achieve a color display.

FIG. 45 shows a structure of a related field sequential type liquid crystal display device. In this liquid crystal display device, pixels are arranged in matrix at each intersection point between data lines 198 and gate lines 197 disposed vertically and laterally. A data driver circuit 195 for driving the data lines and a gate driver circuit 194 for driving the gate lines are disposed in the periphery of the pixel matrix. Further, no color filter is arranged at each pixel of this liquid crystal display device. However, although not shown, a backlight for lighting the liquid crystal display device is provided. This backlight has a function of individually lighting up light sources of the three primary colors, i.e. red (R), green (G), and blue (B).

Actions of the liquid crystal display device will be described by referring to a timing chart of FIG. 46.

A frame period Tf during which a video for one screen is displayed in the liquid crystal display device is divided into sub-frame periods Tsf_r, Tsf_g, and Tsf_b.

In the sub-frame period Tsf_r, executed is an action for displaying a video of red (R) at each pixel of the liquid crystal display. First, a gate line G1 is set to high level. Synchronously with this, a video signal is written to the data lines D1-D10. Thereby, the video signal is written to each pixel on a pixel row that is connected to the gate line G1. By performing this action for all the gate lines G1-G8, the video signal of red (R) is written to all the pixels.

After writing the video signal of red (R) to all the pixels, the light source of red (R) is lighted up after a passage of a certain waiting period. With this, the liquid crystal display device displays a video of red (R) among a color video. LED_R herein indicates a control signal for lighting up the light source of red (R). In the same manner, a video of green (G) is displayed in Tsf_g, and a video of blue (B) is displayed in Tsf_b. Thereby, observers mix the colors of those videos in terms of time to recognize it as a color video.

Liquid crystal materials used for this field sequential type need to exhibit extremely high response speed. Regarding T1 and T8 in FIG. 46, T1 shows changes in the transmittance of the pixels that are connected to the gate line G1, and T8 shows changes in the transmittance of the pixels that are connected to the gate line G8. It is necessary for the waiting period to be set as a length of time with which the transmittance changes of T8 become sufficiently small.

If the waiting period is too short and the light source is lighted up while the transmittance change of T8 is still continuing, there is a difference generated between the luminance within a screen even though the same luminance is to be displayed on the entire screen. Meanwhile, if the waiting period is set too long, the light-up time of the light source becomes too short, thereby resulting in providing a dark display. Therefore, it is necessary for the field sequential type liquid crystal display device to use a liquid crystal material that is capable of enabling sufficient response within a sub-frame period.

As described above, the field sequential type liquid crystal display device requires the liquid crystal material that can exhibit high response speed. However, unlike the color-filter type liquid crystal display device, it is unnecessary to divide each pixel into three sub-pixels of red (R), green (G), and blue (B). Thus, the numerical aperture can be designed large, so that the light utilizing efficiency can be improved. Furthermore, when the liquid crystal display device is applied for a liquid crystal projector, color displays can be achieved by using only a single light valve. This provides such an advantage that the device can be reduced in size.

However, with the above-described field sequential type, flickers (flickering of the screen) tend to be generated on the screen. As mentioned above, the field sequential type liquid crystal device uses the liquid crystal material that can respond at a high speed. Thus, the transmittance of the pixels becomes fluctuated even when there is only a slight potential fluctuation generated in the voltages of the pixels.

FIG. 47 shows an equivalent circuit of a single pixel of the field sequential type liquid crystal display device. As can be seen from the drawing, one pixel is configured with a pixel thin film transistor (TFT) 201, a liquid crystal capacitance (Clc) 203, and a storage capacitance (Cst) 202. A video signal supplied to a data line 208 is written to the liquid crystal capacitance 203 and the storage capacitance 202 via the pixel TFT 201 and held.

FIG. 48 shows a plan view of the one pixel, and FIG. 49 shows a fragmentary sectional view taken along a line E-E' of the plan view. FIG. 48 shows the pixel thin film transistor (TFT) 201, the storage capacitance (Cst) 202, a storage capacitance line 206, gate lines 207, the data lines 208, and the like. Further, FIG. 49 shows a counter substrate 210, a counterelectrode 211, an alignment film 212, a pixel electrode (ITO) 214, an Al wiring 215 of the data line, and a TFT substrate 216.

In the field sequential type liquid crystal display device, normally, a light-shielding black matrix (BM) is not provided between a pixel and a pixel on the counter substrate 210 side.

This is because it is unnecessary with the field sequential type to provide color filters and BM. If BM is provided to the counter substrate 210, the numerical aperture may be deteriorated when there is a position shift generated at the time of stacking the TFT substrate 216 and the counter substrate 210. Therefore, it is necessary to provide a function corresponding to that of BM on the TFT substrate 216 side. In the case of this drawing, the Al wiring 215 used as the data line is overlapped to the neighboring pixel electrode 214 to achieve a function instead of BM.

However, when the data line 215 and the pixel electrode 214 overlap with each other, a potential fluctuation of the data line 215 causes a potential fluctuation of the pixel electrode 214 due to coupling of the capacitances.

If the response speed of the liquid crystal 213 is slow, the response of the liquid crystal cannot follow a frequency (sufficiently higher frequency than a normal frame frequency) of the potential fluctuation generated in the data line 215. Thus, even though no influence is imposed upon the picture quality, the liquid crystal 213 reacts to a potential change of high frequency slightly, and a change in the luminance is caused thereby in a case of the liquid crystals of the field sequential type.

Further, since the storage capacitance line 206 forming the storage capacitance 202 is arranged in parallel to the gate line 207 in many cases, it comes to cross with the data line 208. Due to coupling of the capacitances at the cross point, a potential fluctuation of the data line 208 fluctuates the pixel voltage via the storage capacitance 202, thereby causing a change in the luminance of the pixels as well. These changes in the luminance cause flickers, which extremely deteriorates the picture quality.

SUMMARY OF THE INVENTION

An exemplary object of the present invention is to improve the picture quality of a field sequential type liquid crystal display device by reducing flickers of a liquid crystal display device that uses a liquid crystal material exhibiting a high response speed, and to provide a liquid crystal display device in which the light utilizing efficiency is improved dramatically.

In order to achieve the foregoing exemplary object, a liquid crystal display device according to the present invention includes:

a display panel including a pixel matrix in which pixels each including at least a switching element and a pixel electrode are arranged in matrix near intersection points of data lines and gate lines arranged longitudinally and laterally, and a counter electrode that is arranged to oppose the pixel matrix with a liquid crystal layer interposed therebetween; and a control part which divides a period for displaying a color image of one frame into a plurality of sub-frame periods, and lights up light sources of different colors for each of the sub-frame periods to display images according to the colors of the light sources on the display panel, wherein a shield electrode layer separated by an insulating film is disposed between the pixel electrode and the data lines.

While the present invention is built as hardware, it is not limited only to that. The present invention may also be built as a control system, a driving method, and a control program as software.

When the present invention is built as a control system, it is structured as follows. That is, the control system according to the present invention is structured as a control system for drive-controlling a display panel that includes: a pixel matrix in which pixels each including at least a switching element and a pixel electrode are arranged in matrix near intersection points of data lines and gate lines arranged longitudinally and laterally, and a counter electrode that is arranged to oppose the pixel matrix with a liquid crystal layer interposed therebetween. The control system includes a control part which divides a period for displaying a color image of one frame into a plurality of sub-frame periods, and lights up light sources of different colors for each of the sub-frame periods to display images according to the colors of the light sources on the display panel, wherein the control part applies a voltage to a shield electrode layer that is disposed between the pixel electrode and the data lines.

When the present invention is built as a driving method, it is structured as follows. That is, the driving method according to the present invention is structured as a driving method for displaying an image on a display panel that includes: a pixel matrix in which pixels each including at least a switching element and a pixel electrode are arranged in matrix near intersection points of data lines and gate lines arranged longitudinally and laterally, and a counter electrode that is arranged to oppose the pixel matrix with a liquid crystal layer interposed therebetween. The method includes:

dividing a period for displaying a color image of one frame into a plurality of sub-frame periods, and lighting up light sources of different colors for each of the sub-frame periods to display images according to the colors of the light sources on the display panel; and applying a voltage to a shield electrode layer that is disposed between the pixel electrode and the data lines.

When the present invention is built as a control program, it is structured as follows. That is, the control program according to the present invention is structured as a control program for drive-controlling a display panel that includes: a pixel matrix in which pixels each including at least a switching element and a pixel electrode are arranged in matrix near intersection points of data lines and gate lines arranged longitudinally and laterally, and a counter electrode that is arranged to oppose the pixel matrix with a liquid crystal layer interposed therebetween. The program allows a computer to execute:

a function of outputting a control instruction to divide a period for displaying a color image of one frame into a plurality of sub-frame periods, and to light up light sources of different colors for each of the sub-frame periods to display images according to the colors of the light sources on the display panel; and a function of outputting a control instruction to apply a voltage to a shield electrode layer that is disposed between the pixel electrode and the data lines.

The present invention prevents the pixel electrode and the data line from being coupled via the parasitic capacitance through shielding. On the other hand, the present invention utilize the coupling thereof generated via the parasitic capacitance to control the potential fluctuations of the pixel electrode to be almost equal between each of the sub-frames, so that flickers can be reduced dramatically even when a liquid crystal material exhibiting a high response speed is used. As a result, it becomes possible to improve the luminance by using the driving method with a large number of sub-frames by the use of the liquid crystal material that exhibits a high response speed.

DETAILED DESCRIPTION OF THE EXEMPLARY EMBODIMENTS

Next, exemplary embodiments of the invention will be described in detail by referring to the accompanying drawings.

As shown in FIG. 1-FIG. 41, as a basic structure, a liquid crystal display device according to exemplary embodiments of the invention includes: a display panel that includes a pixel matrix in which pixels each including at least a switching element (11) and a pixel electrode (24, 94, 104, or 114) are arranged in matrix in the vicinity of intersection points of data lines (D1-D10, 18, 58, 78, 88, 98, 108, or 118) and gate lines (G1-G8, 17, or 57), and a counter electrode arranged by opposing to the pixel matrix with a liquid crystal layer interposed therebetween; and a control part (32) which divides a period for displaying a color image of one frame into a plurality of sub-frame periods, and lights up light sources of different colors for each sub-frame period to display an image in the display panel in accordance with the color of the light source, wherein a shield electrode layer separated by an insulating film is provided between the pixel electrode and the data line. The control part changes the waveforms to supply a voltage to the shield electrode layer (25, 55, 95, or 105) by each sub-frame period.

With the exemplary embodiments of the invention, it is possible to shield between the pixel electrode and the data line to reduce coupling of the parasitic capacitance generated therebetween, thereby allowing flickers caused due to a voltage fluctuation generated in the pixel electrode to be reduced dramatically.

Next, the liquid crystal display device according to the exemplary embodiments of the invention will be described in more detail by referring to specific examples.

First Exemplary Embodiment

Figure 1:
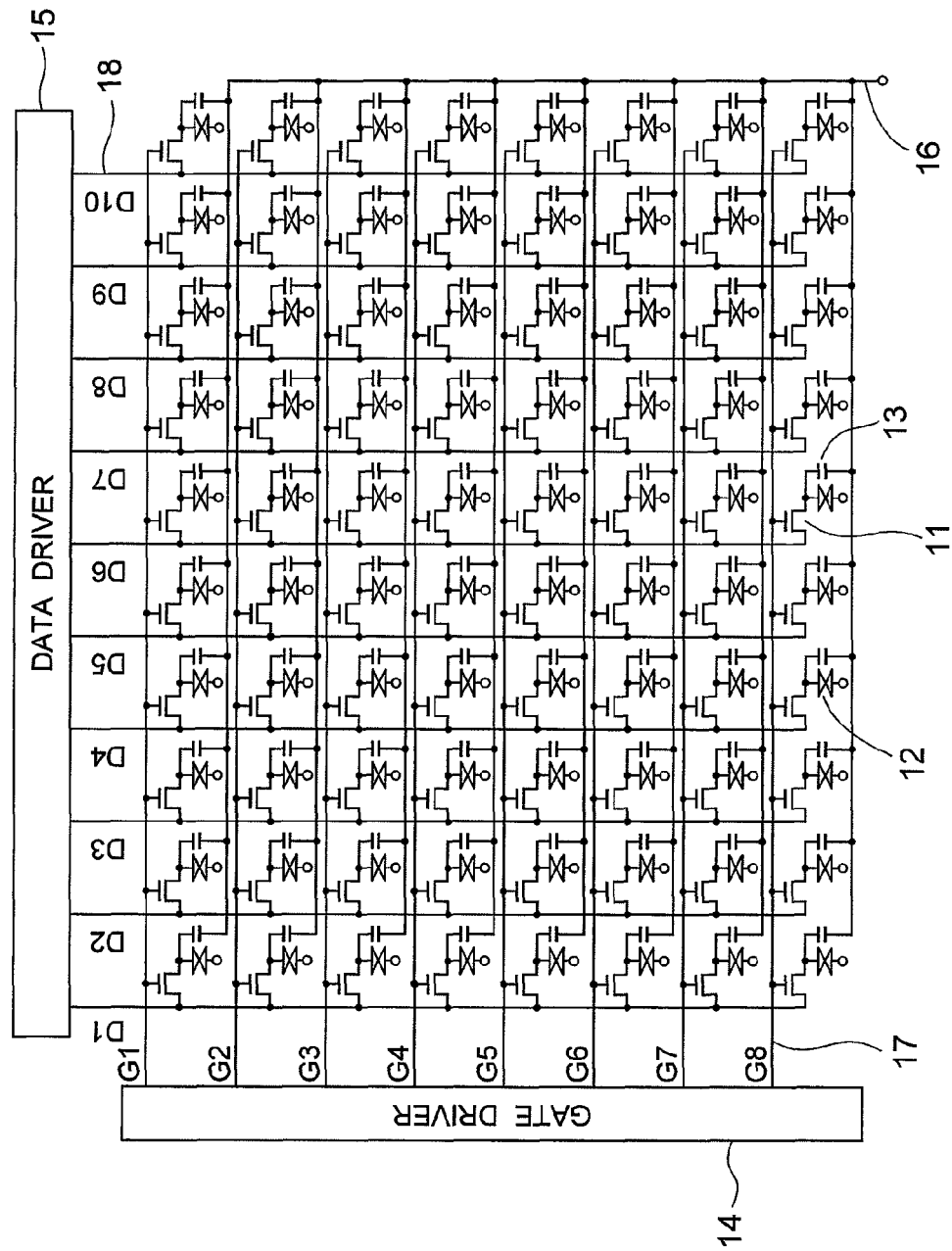
FIG. 1 is a circuit diagram showing a display part of a liquid crystal display device according to a first exemplary embodiment of the invention.

FIG. 1 is a circuit diagram showing a structure of a TFT substrate of the liquid crystal display device according to a first exemplary embodiment of the invention.

The first exemplary embodiment is structured with a TFT substrate 26 that includes: a pixel matrix in which pixels each including at least a pixel TFT (switching element) 11 and a liquid capacitance (Clc) 12 are disposed in matrix at each intersection point of the data lines D1-D10 and the gate lines G1-G8 arranged vertically and laterally; and a data driver circuit 15 disposed in the periphery of the pixel matrix for driving the data lines D1-D10 as well as a gate driver circuit 14 disposed in the periphery for driving the gate lines G1-G8. Further, a common counter electrode (common electrode) 21 is disposed at each pixel, and liquid crystals are filled between the TFT substrate 26 and a counter substrate 20 that is disposed by opposing to the TFT substrate 26. An alignment film 22 for aligning the liquid crystals is provided on the surfaces of the TFT substrate 26 and the counter substrate 20, respectively.

In this example, ten data lines and eight gate lines are illustrated. However, the numbers of those lines are not limited to such values. Further, a storage capacitance (Cst) 13 may be provided to the pixels. Furthermore, the data driver circuit 15 and the gate driver circuit 14 may be formed with TFTs on the TFT substrate, may be formed by mounting driver ICs on the TFT substrate, or circuits that are provided outside the TFT substrate and connected via a cable or the like may be used.

Figure 2:
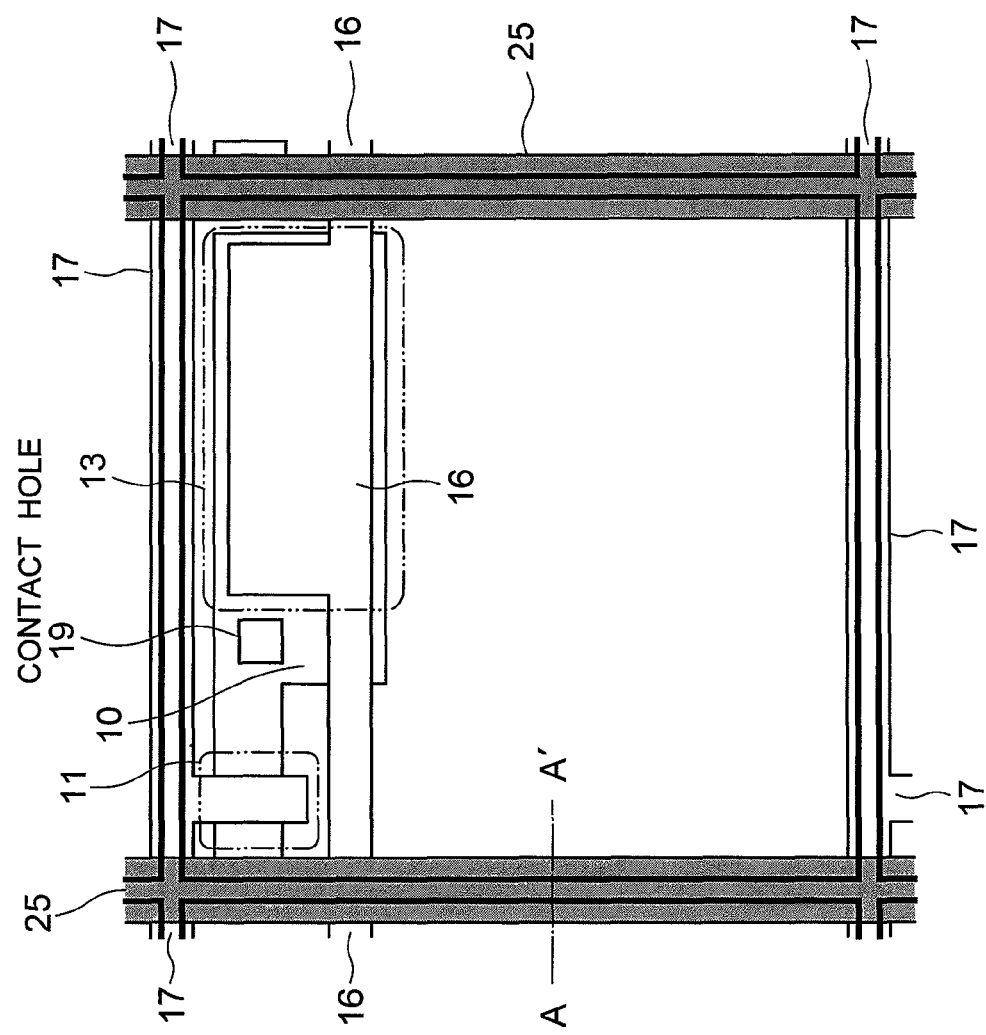
FIG. 2 is a plan view showing a structure of a single pixel according to the first exemplary embodiment shown in FIG. 1.
Figure 3:
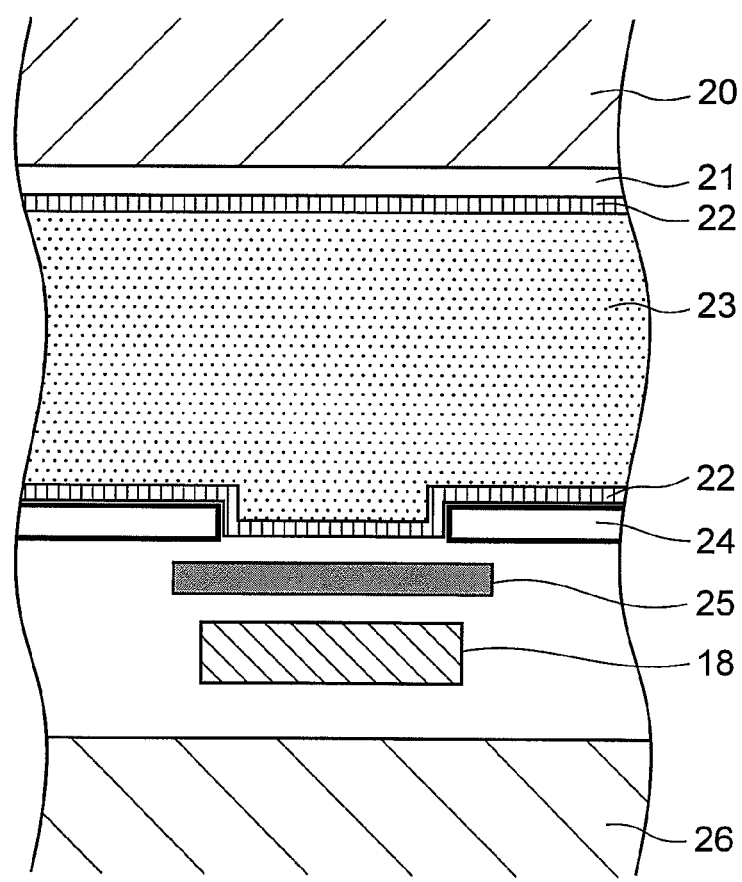
FIG. 3 is a schematic sectional view taken along a line A-A' of FIG. 2.

FIG. 2 is a plan view showing a single pixel of the first exemplary embodiment. Further, FIG. 3 shows a sectional structure of the pixel shown in FIG. 2, which is taken along a line A-A'. In the first exemplary embodiment, a shield electrode (shield electrode layer) 25 in a width for covering the data line 18 is provided between the data line 18 and the pixel electrode 24 that forms the storage capacitance 13. This shield electrode 25 is disposed at least on the data line 18 in an area where the pixels that contributes to displays of the liquid crystal display device are placed, and it is connected mutually to the shield electrode layer of a neighboring pixel on the data line. The other ends of the storage capacitances 13 are coupled with a common storage capacitance line 16.

Figure 4:
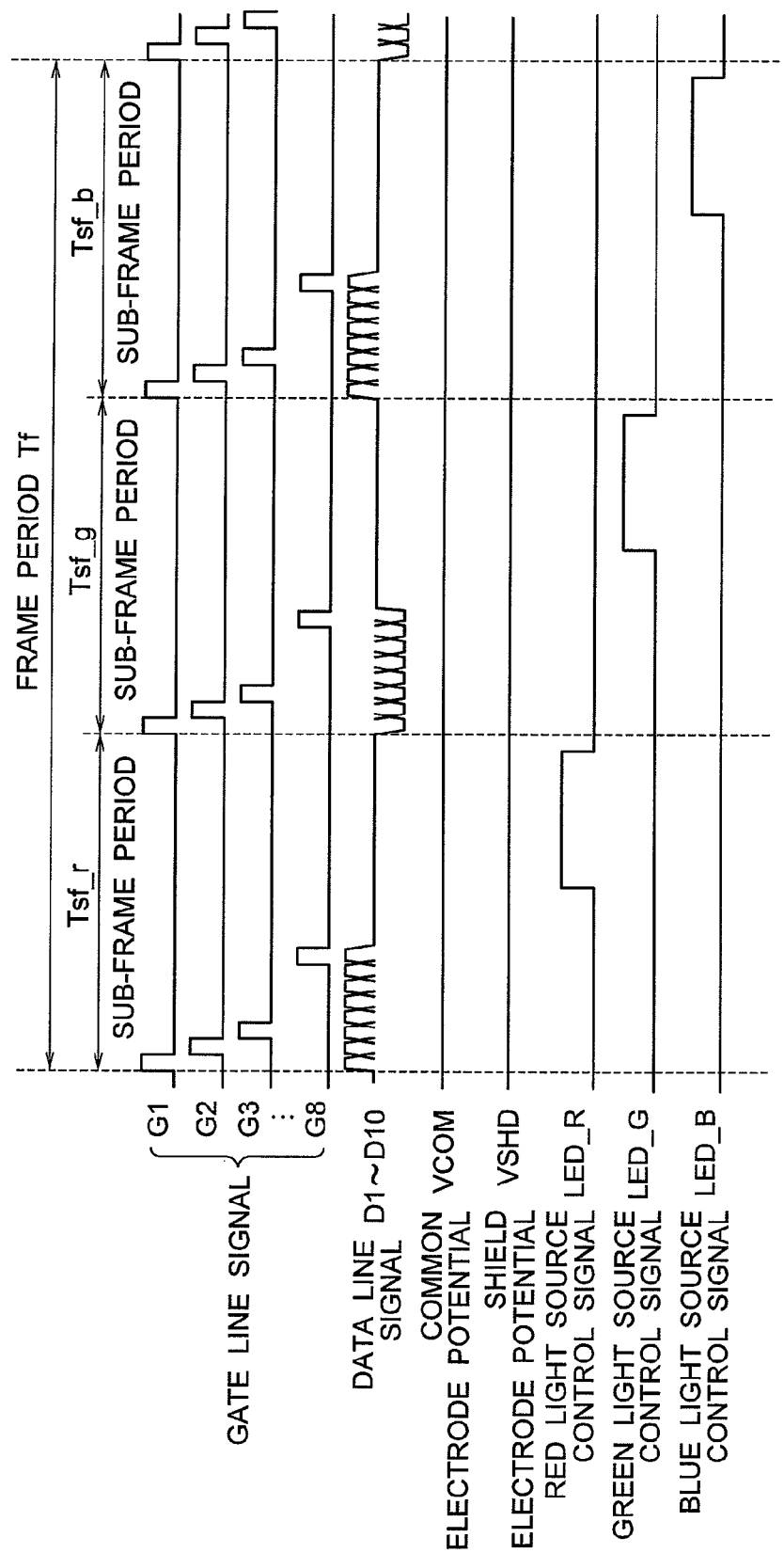
FIG. 4 is a timing chart showing a driving method according to the first exemplary embodiment shown in FIG. 1.

Next, actions of the first exemplary embodiment will be described by referring to a timing chart of FIG. 4. Tf is a frame period for displaying a color image of one screen. The control circuit 32 to be described later divides the frame period at least into three sub-frame periods Tsf_r, Tsf_g, and Tsf_b, and lights up light sources of different colors by each of the sub-frame periods to display an image in accordance with the color of the light source on a display panel.

More specifically, in the sub-frame period Tsf_r, upon receiving a video signal 43 from the control circuit 32 to be described later, the gate driver circuit 14 outputs a pulse to the gate lines G1-G8 for successively turning the pixel TFTs 11 to ON-state based on the video signal 43. Upon receiving a control signal 44 from the control circuit 32 to be described later, the data driver circuit 15 outputs a video signal of R to the data lines D1-D10 by synchronizing with the output of the gate driver circuit 14 based on the control signal 44.

Through such actions, the video signal is written successively to each pixel row along the gate lines G1-G8. During a period where a control signal LED_R becomes high level, which is after a certain period past from the time where the video signal is written to the last pixel row that is connected to the gate line G8, the light source of red (R) is lighted up, and an image of red (R) is displayed thereby.

In the sub-frame period Tsf_g, the gate lines G1-G8 are driven by the gate driver circuit 14 successively as in the case of the sub-frame period Tsf_r, and the data driver circuit 15 outputs an image of green (G) to the data lines D1-D10 by synchronizing therewith to write the image of green (G) to all the pixels. By lighting up the light source of green (G) during a period where a control signal LED_G is in high level, the image of green (G) is displayed. Similarly, an image of blue (B) is displayed in the sub-frame period Tsf_b. Through a series of such actions, an observer of the liquid crystal display device comes to recognize the images of red (R), green (G), and blue (B) as a color image by a color mixing effect achieved in terms of time.

Note here that it is desirable to set the period from the point where the signal is written to the last pixel row to the point where the light source is lighted up to be longer than the time the liquid crystal 23 can respond sufficiently. For example, when displaying an image with a frame frequency of 60 Hz, it is desirable for the response time of the liquid crystal 23 to be 5.6 ms or less since the sub-frame period is about 5.6 ms. The shorter the response time, the more the light utilizing efficiency can be improved. However, if the deterioration in the light utilizing efficiency is to be tolerated, display can be achieved even when the response time of the liquid crystal 23 is more than 5.6 ms. The waiting time in that case can be set shorter than the response time of the liquid crystal 23. In that case, however, there may be cases where a difference in the luminance on the screen needs to be corrected. The liquid crystal response time herein indicates a total time that is a sum of the time where the transmittance changes from 0 to 90 percent and the time where the transmittance changes from 100 to 10 percent.

Further, in this embodiment, a common electrode potential VCOM is set as a constant potential, and the polarities of the video signals for VCOM are changed by a sub-frame period unit. A shield electrode potential VSHD is set as a constant potential. The reason why the polarity of the video signal written to all the pixels with respect to VCOM is set equal by a sub-frame unit is because it becomes possible with this driving method to decrease the electric field intensity between the pixel electrodes that are neighboring to each other in the vertical direction, so that an area having light leakage due to disclinations can be reduced. When the light leakage area is reduced, a large numerical aperture can be secured so that the light utilizing efficiency can be improved. However, if the deterioration of the light utilizing efficiency can be tolerated, it is also possible to employ a line inversion with which the polarity becomes different for every pixel row or a dot inversion with which the polarity becomes different in a checkerwise pattern.

Further, illustrated herein is an example where the counter electrode potential VCOM is set to a constant potential, and the polarities of the video signal to be written to the pixels for VCOM are inverted by a sub-frame unit so as to achieve an AC drive with which a DC electric field is not applied to the liquid crystal. However, it is also possible to use a method which changes the potential of VCOM by a sub-frame unit. Furthermore, while the example of setting the shield electrode potential VSHD to a constant potential is illustrated in the drawing, the voltage may be changed by each sub-frame period. Alternatively, the sub-frame period may be divided into a plurality of periods, and the potential may be changed by each of the divided periods.

With the liquid crystal display device according to the exemplary embodiment of the invention, it is possible to decrease flickers dramatically even when a material exhibiting high response speed is used for the liquid crystal. Flickers as an issue of the liquid crystal display device that uses a material of a high response speed for the liquid crystal are generated because a potential fluctuation of the data lines causes a potential fluctuation of the pixel electrode when the pixel electrode and the data line is coupled because of the parasitic capacitance. In the liquid crystal display device according to the exemplary embodiment of the invention, however, a shield electrode is provided under the pixel electrode via an insulating film, so that the parasitic capacitance of the pixel electrode and the data line or the like can be reduced to be extremely small. Therefore, the flickers can be reduced dramatically.

Figure 5:
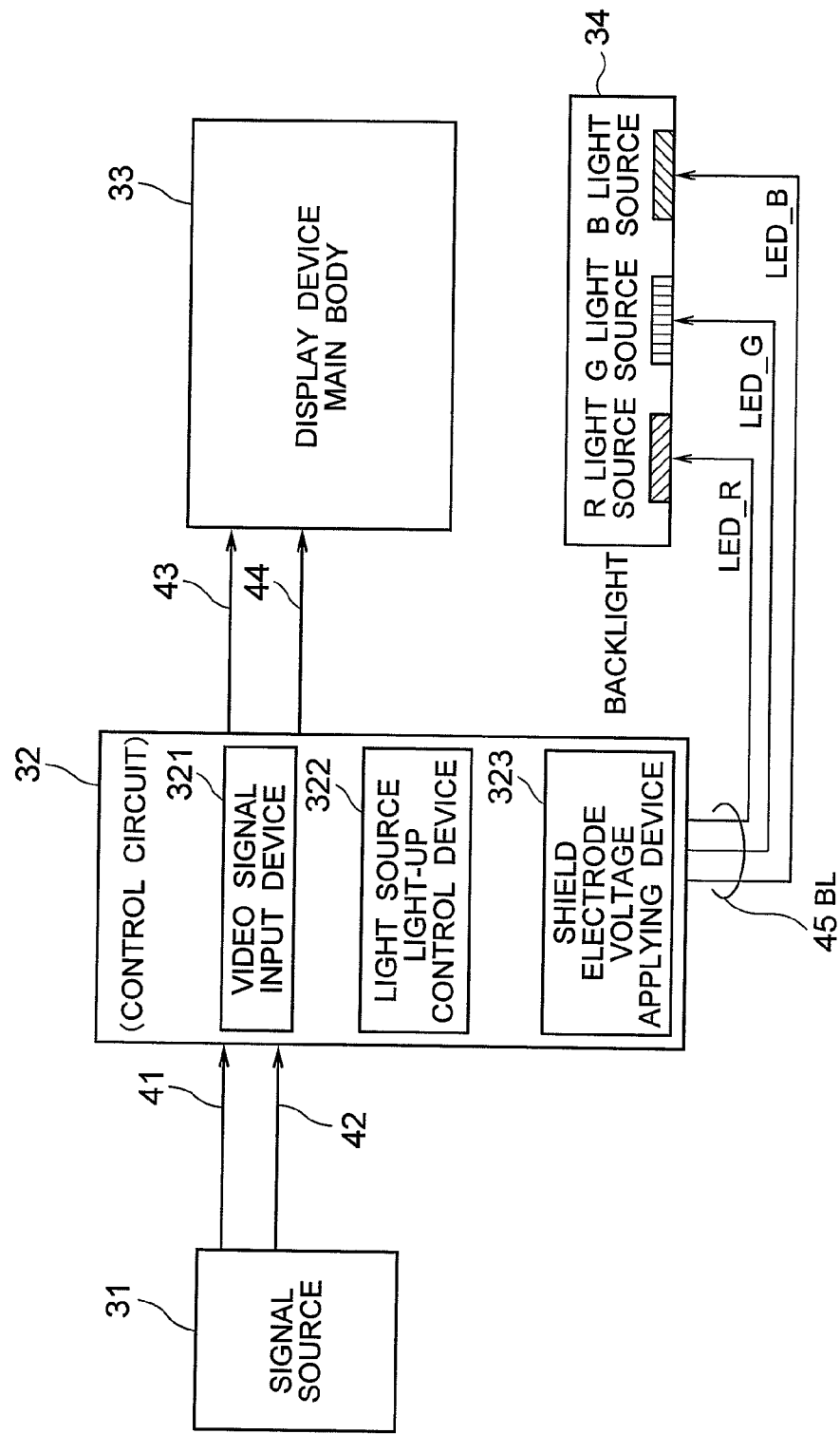
FIG. 5 is a block diagram showing a structure of the entire liquid crystal display device according to the first exemplary embodiment of the invention.

FIG. 5 shows a block diagram of the liquid crystal display device according to the first exemplary embodiment of the invention. For performing color displays by using the liquid crystal display device according to the first exemplary embodiment of the invention, it is necessary to provide the control circuit 32 for driving a liquid crystal display main body (display panel) 33, a backlight 34 that is capable of controlling light-up of the light sources of red (R), green (G), and blue (B) individually, and a signal source 31 for generating a video signal 41.

The control circuit 32 includes: a video signal input device 321 which generates, by using the video signal 41 and a synchronous signal 42 from the signal source 31, a video signal 43 and a control signal 44 required for driving the liquid crystal display device main body 33; and a light source light-up control device 322 which outputs a BL control signal 45 for controlling the backlight 34 by synchronizing with the action of the liquid crystal display device main body 33. Further, as will be described later, the control circuit 32 also includes a shield electrode voltage applying device 323 for applying a voltage to the shield electrode layer 25 of the liquid crystal display device 33.

The backlight 34 has a function that is capable of lighting up the light sources of red (R), green (G), and blue (B) individually based on the BL control signal 45 from the light source light-up control device 322 of the control circuit 32. As an example of such light source, an LED can be used. Further, although not shown, it is necessary to provide a power supply for supplying a voltage to the control circuit 32, the liquid crystal display device 33, and the backlight 34.

Figure 6:
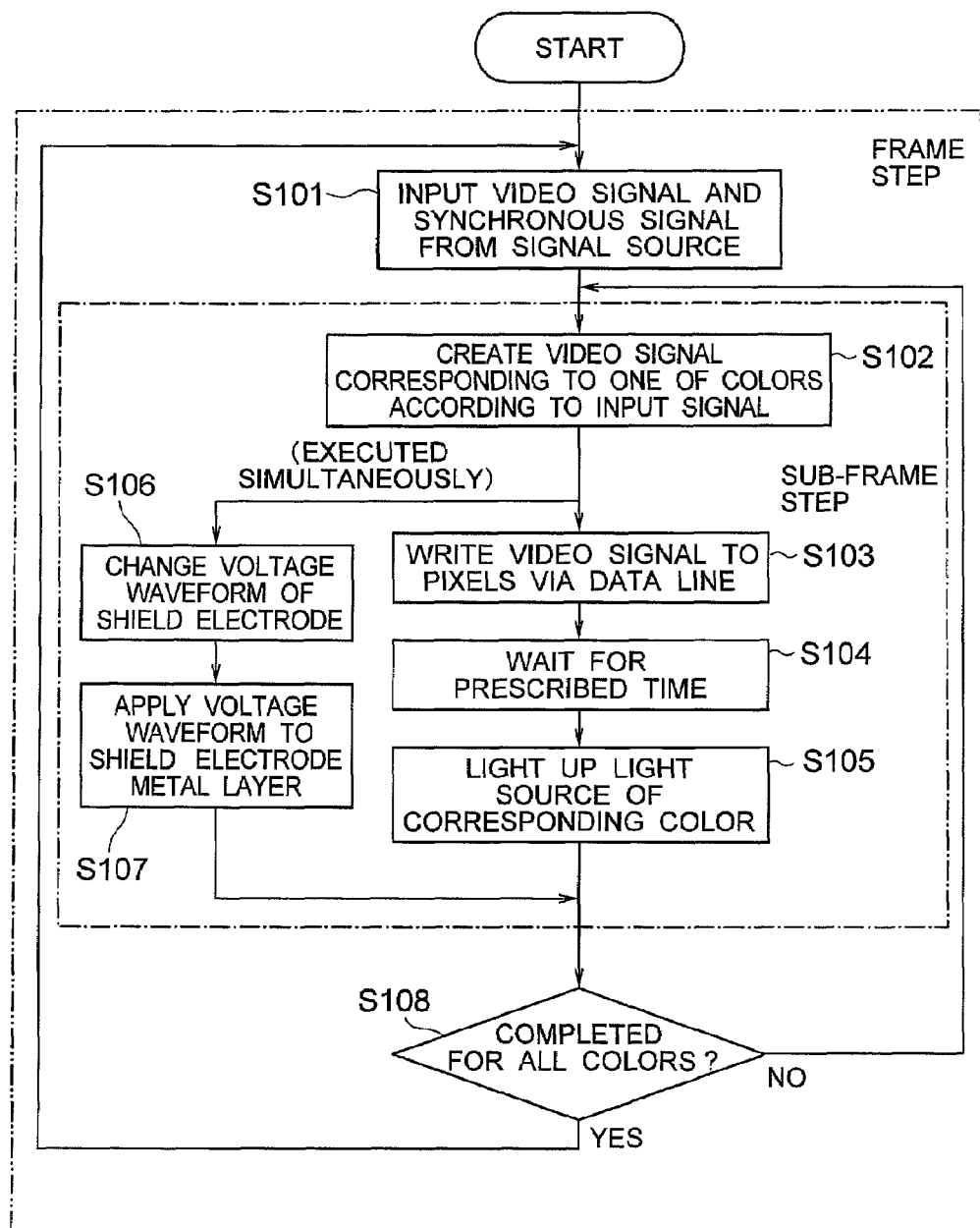
FIG. 6 is a flowchart showing actions of the entire liquid crystal display device that is disclosed in FIG. 5.

Actions of the control circuit 32 of the liquid crystal display device for driving the first exemplary embodiment of the invention will be described by referring to a flowchart of FIG. 6.

When an action of the liquid crystal display device is started, in step S101, the control circuit 32 receives inputs of the video signal 41 and the synchronous signal 42 from the signal source 31. Then, in step S102, the procedure is advanced to one of sub-frame steps where a video signal corresponding to one color among each of the colors is formed in accordance with the inputted signal.

The video signal 43 corresponding to one color among each of the colors formed in this manner by corresponding to the inputted signal is written in step S103 to the pixels via the data lines by using the video signal input device 321 (writing step). After completing the writing, a prescribed waiting time is secured in step S104, and the light source of the corresponding color is lighted up in step S105 by using the light source light-up control device 322 (display step).

In parallel with the actions from the step S103 to the step S105, a voltage waveform applied to the shield electrode layer is changed in step S106 from that of the previous time, and the voltage waveform is applied in step S107 to the shield electrode layer by using the shield electrode voltage applying device 323. A series of actions from the step S102 to the step S107 corresponds to one sub-frame step.

After finishing this sub-frame step, it is judged in step S108 to find out whether or not the sub-frame step is completed for all the colors. When judged that it is not completed for all the colors, the procedure returns to the step S102 to execute the sub-frame step for the next color. After completing the sub-frame step for all the target colors, the procedure is returned to the step S101 to input a next input signal.

A series of actions from the step S101 to the step S108 shown herein corresponds to one frame step.

Next, an example of a method for manufacturing the first exemplary embodiment shown in FIG. 2 will be described by referring to the drawings.

FIG. 7-FIG. 11 are illustrations showing pixel layouts of the liquid crystal display device main body 33 by a unit of main process steps.

First, an insulating film such as $SiO_2$ or SiN is formed on a transparent substrate made of glass, quartz, plastic, or the like. Then, a semiconductor layer to be TFT is formed thereon, and it is patterned thereafter.

Figure 7:
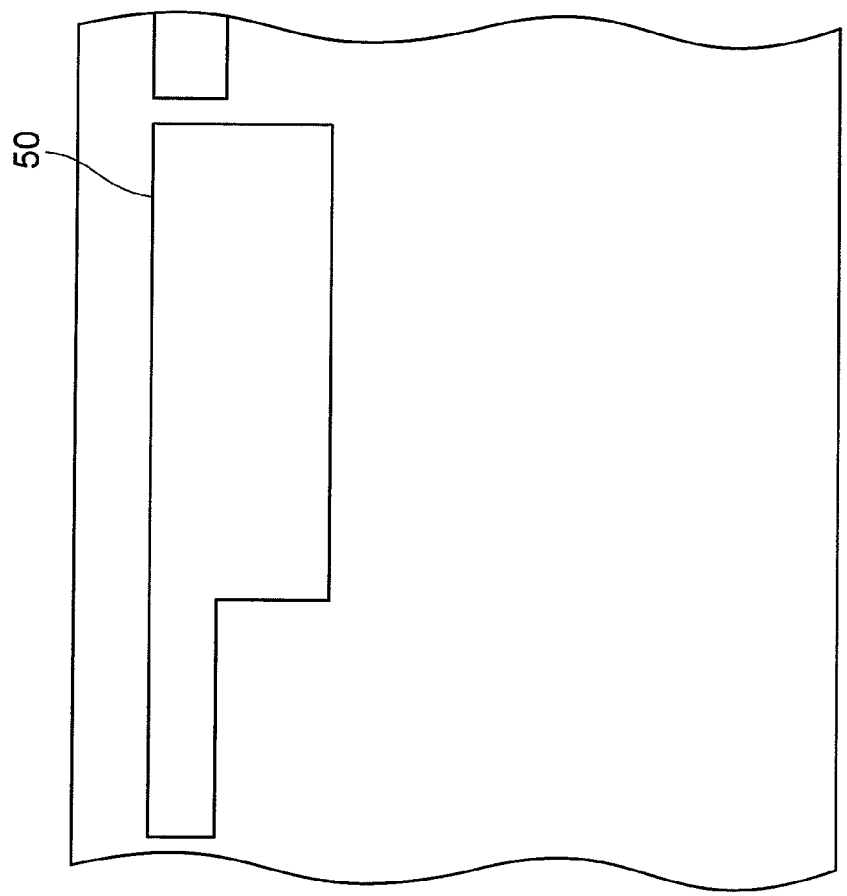
FIG. 7 is an illustration for describing a pixel layout (1) of a process step in manufacturing steps of the display part that is disclosed in FIG. 1.

FIG. 7 shows a pixel layout at a stage where patterning of the semiconductor layer is completed. Each of treatments such as annealing, impurity doping, hydrogenation, and activation is performed on the semiconductor layer as necessary in the respective optimum process steps.

A gate metal layer is formed on the top face of the semiconductor layer with a thin insulating film made by $SiO_2$ or the like interposed therebetween, and it is patterned.

Figure 8:
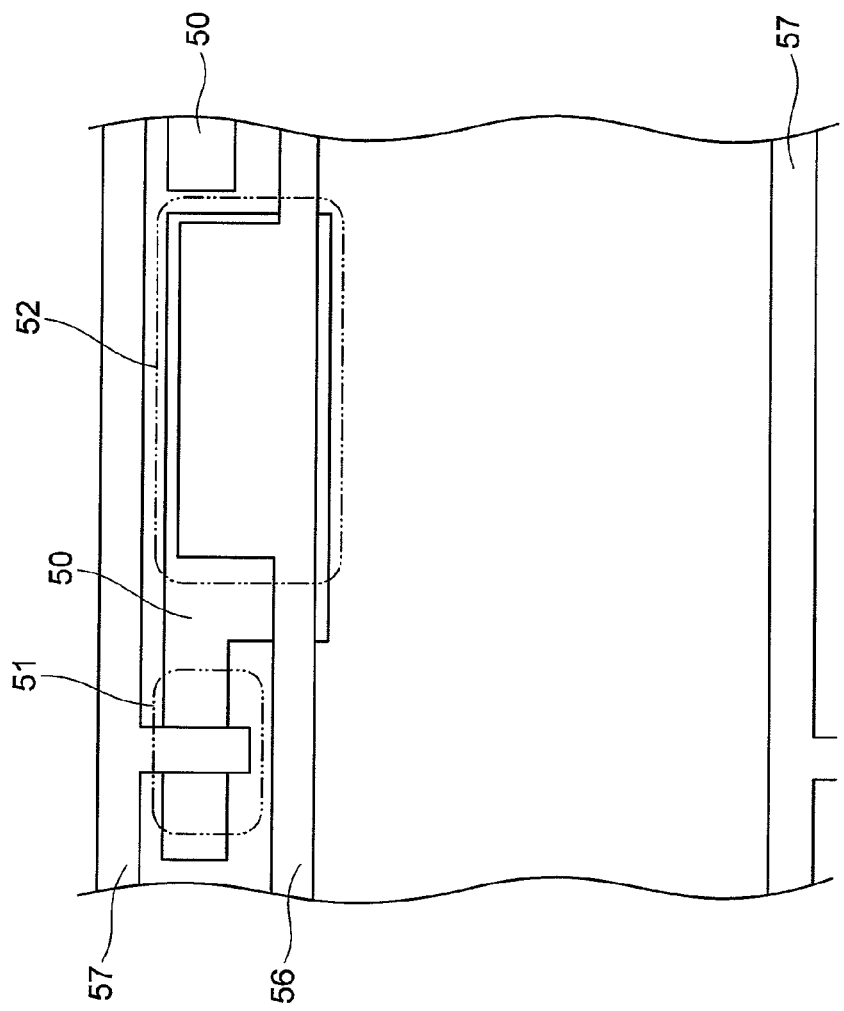
FIG. 8 is an illustration for describing a pixel layout (2) of the process step following that of FIG. 7.

FIG. 8 shows a pixel layout after completing patterning of the gate metal, in which a pixel TFT 51, a storage capacitance 52, a storage capacitance line 56, and a gate line 57 are provided. As the metal used for the gate line 57, WSi, Mo, Cr, Al, or the like may be used even though the material to be used varies depending on the highest temperature reached in the process. Thereafter, an insulating film of $SiO_2$ or the like is formed, and a contact hole for electrically connecting a data line metal to a semiconductor layer or the gate metal is formed at necessary points. Then, the data line metal layer is formed and patterned.

Figure 9:
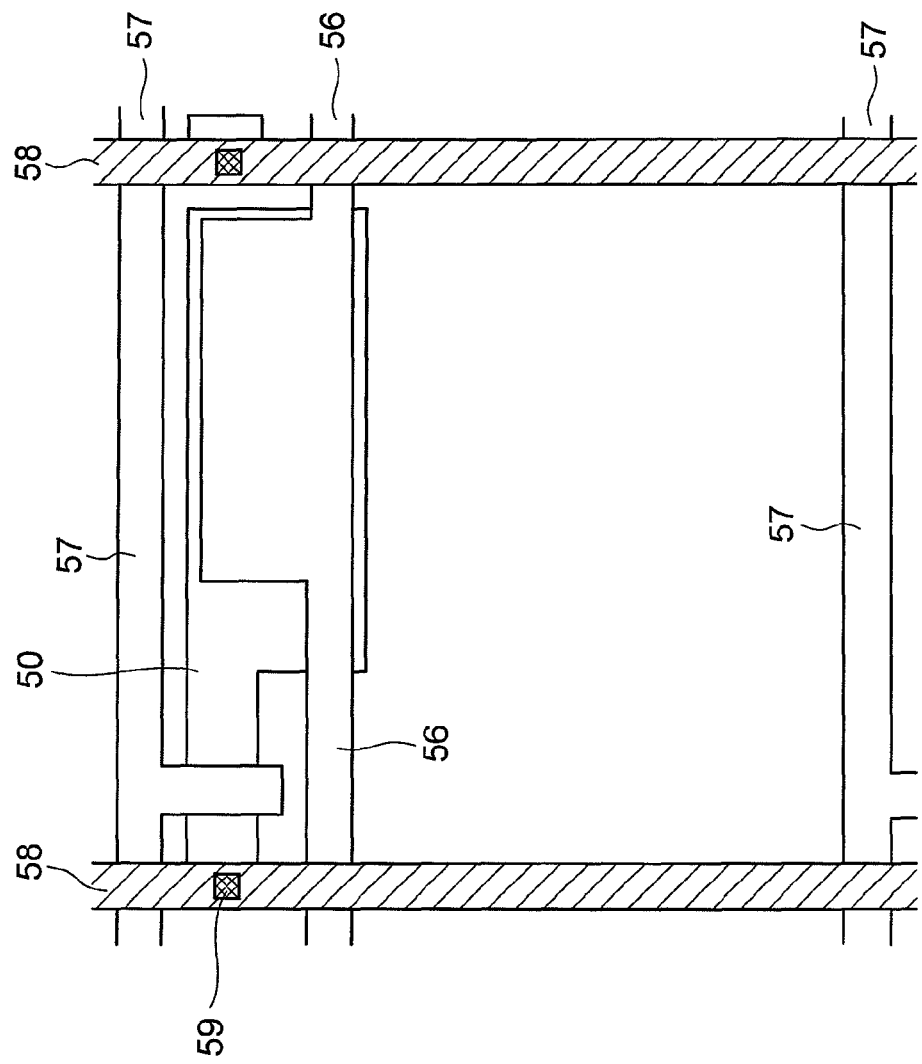
FIG. 9 is an illustration for describing a pixel layout (3) of the process step following that of FIG. 8.

FIG. 9 shows a pixel layout after completing the patterning of the metal layer that configures a data line 58. It is desirable to use a low-resistance metal such as Al for the metal layer. A metal layer configuring a shield electrode 55 is formed on the data line 58 with an insulating film of $SiO_2$, SiN, or the like interposed therebetween, and it is patterned. The width of the shield electrode 55 is wider than the width of the data line 58, and it is disposed at a position to cover the data line 58. The shield electrodes 55 of the pixels neighboring to each other in the vertical direction along the data line 58 are connected.

Figure 10:
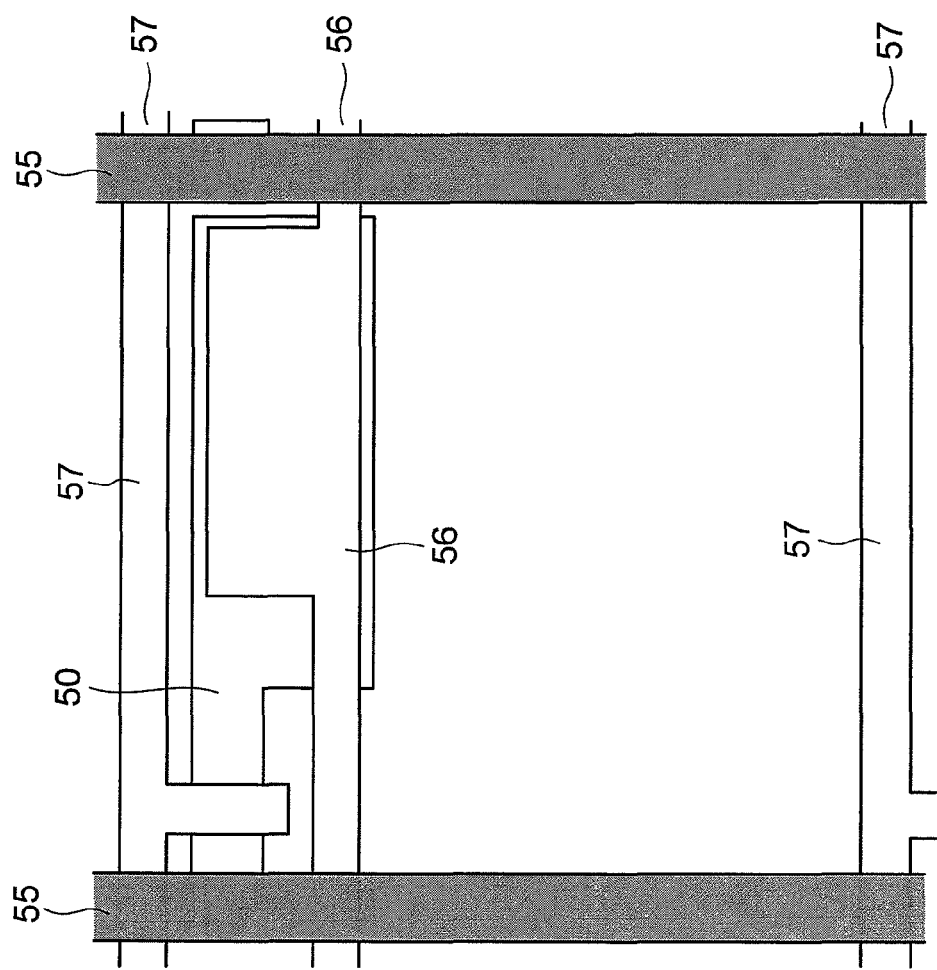
FIG. 10 is an illustration for describing a pixel layout (4) of the process step following that of FIG. 9.

FIG. 10 shows a pixel layout after completing the patterning of the shield electrode layer 55. Although not shown, the shield electrode layer 55 is electrically connected to the data line metal layer 58 or the gate metal layer 57 via a contact hole within a display area or outside the display area. A pixel electrode metal layer is formed on the shield electrode layer 55 with an insulating film interposed therebetween, and it is patterned.

Figure 11:
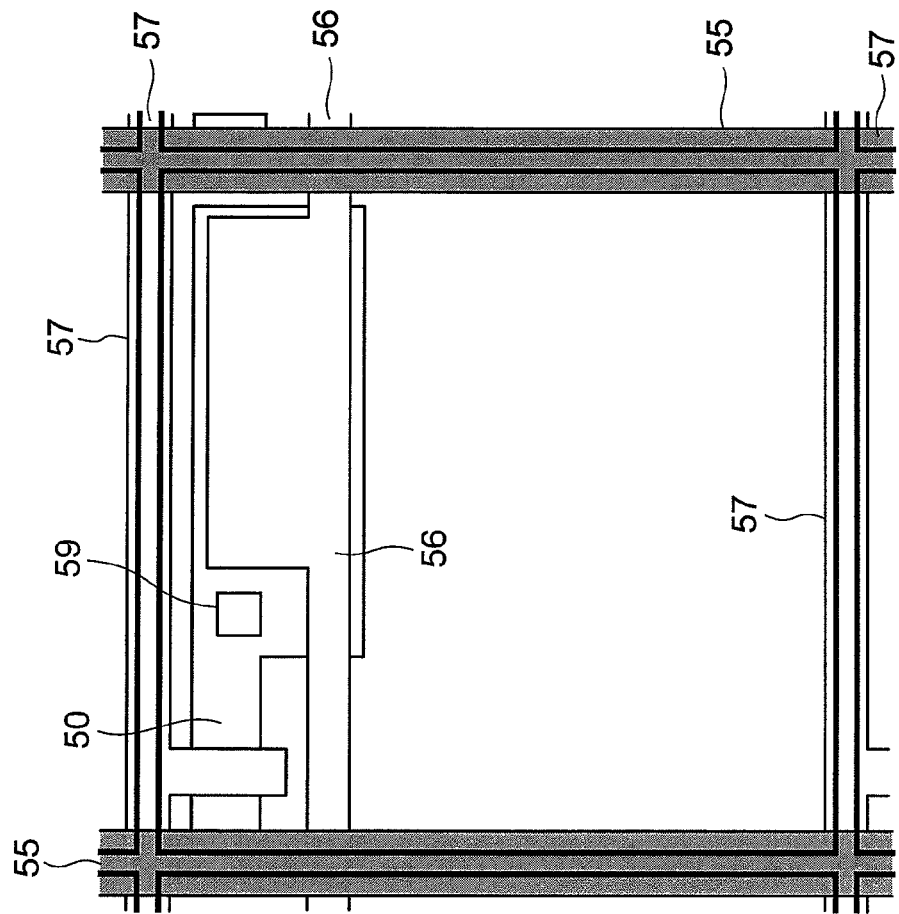
FIG. 11 is an illustration for describing a pixel layout (5) of the process step following that of FIG. 10.

FIG. 11 shows a pixel layout after completing the patterning of the pixel electrode metal layer. A laminated film of flattening films made of $SiO_2$ or SiN and acryl resin, etc. may be used as the insulating film formed between the shield electrode layer 55 and the pixel electrode metal layer. Further, a transparent electrode film is used for the pixel electrode metal layer, and an example of the material thereof is ITO. It is necessary for the pixel electrode to be electrically connected to the semiconductor layer that configures TFT. In the drawing, a case of connecting the pixel electrode to the semiconductor layer via a contact hole 60 is illustrated.

However, it is also fine for the pixel electrode and the semiconductor layer to be electrically connected via a plurality of contact holes by including a data line metal, a shield metal, and the like interposed therebetween. Further, the material for the insulating film and the material for the metal film mentioned above as way of examples are not relevant to the intrinsic matters of the present invention, and other materials may be used as well. The important thing in this exemplary embodiment is to have a structure in which the shield electrode separated by the insulating film is laminated between the data line and the pixel electrode.

With the first exemplary embodiment, it is possible to reduce flickers dramatically even when the material exhibiting a high response speed is used for the liquid crystal. Flickers as the issue of the liquid crystal display device that uses the material of a high response speed for the liquid crystal are generated because a potential fluctuation of the data line 18 causes a potential fluctuation of the pixel electrode 24 when the pixel electrode 24 and the data line 18 are coupled because of the parasitic capacitance.

In the first exemplary embodiment, however, the shield electrode 25 is provided under the pixel electrode 24 via an insulating film, so that the parasitic capacitance between the pixel electrode 24 and the data line 18 or the like can be reduced to be extremely small. Therefore, the flickers can be reduced dramatically even when the material of a high response speed is used for the liquid crystal. With this, it is possible to achieve the liquid crystal display device capable of bright display through improving the light utilizing efficiency by shortening the waiting time that is from the time at which the video signal is written to the last pixel to the time at which the light source is lighted up.

Second Exemplary Embodiment

Figure 12:
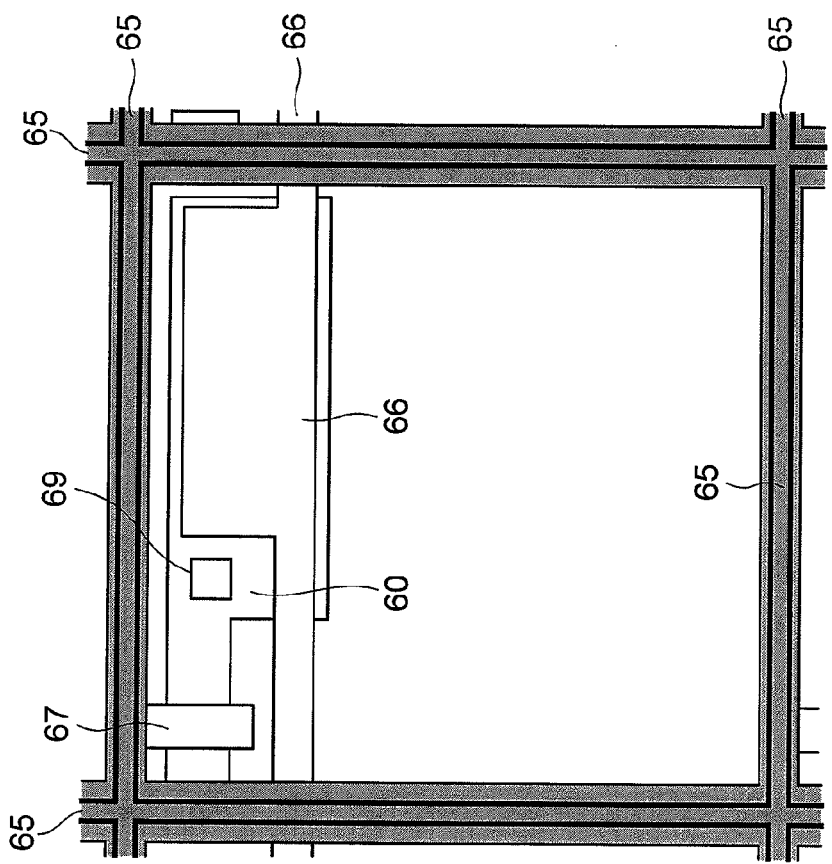
FIG. 12 is an illustration for describing a pixel layout according to a second exemplary embodiment of the invention.

FIG. 12 shows an example of a pixel layout according to a second exemplary embodiment of the invention.

The second exemplary embodiment is different from the first exemplary embodiment in respect that a shield electrode 65 is connected also to neighboring shield electrodes 65 on the right and left sides via a conductive layer provided along the gate lines. In the example illustrated herein, the shield electrodes 65 are disposed on the gate lines so as to be connected to the shield electrodes of the pixels on the right and left sides. However, it is not essential for the shield electrodes 65 to be disposed on the gate lines. The shield electrodes 65 may be disposed at any positions as long as within the pixel area. However, it is desirable to dispose the shield electrodes 65 on the gate lines or the storage capacitance lines in order to prevent reduction of the numerical aperture.

In this pixel layout, the shield electrodes 65 are connected between the pixels that are neighboring to each other vertically and laterally. Thus, it is possible to suppress fluctuations of the shield electrode potential, which is caused due to coupling of the capacitances of the shield electrodes and the data lines. Thereby, the potential fluctuation of the pixel electrode can be reduced still further. As a result, the flickers can be decreased dramatically.

Third Exemplary Embodiment

Figure 13:
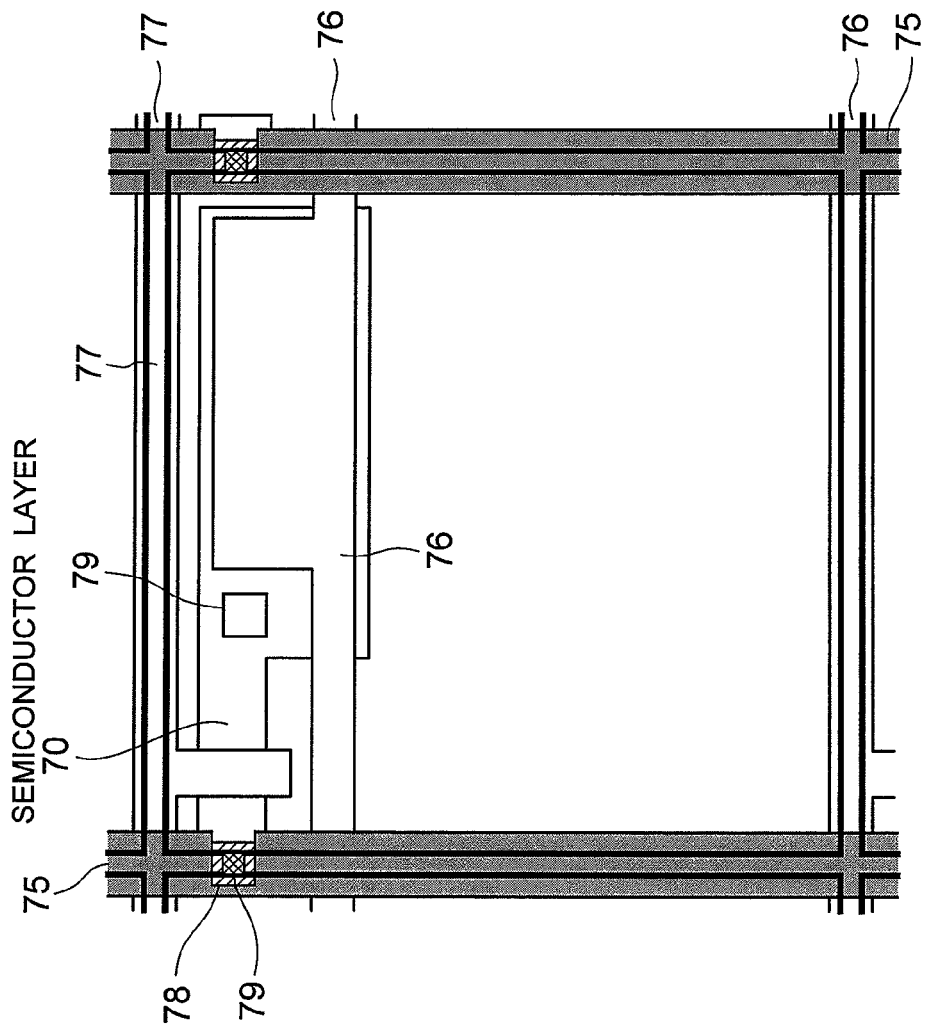
FIG. 13 is an illustration for describing a pixel layout according to a third exemplary embodiment of the invention.

FIG. 13 shows an example of a pixel layout according to a third exemplary embodiment of the invention.

The third exemplary embodiment is different from the first exemplary embodiment in respect that shield electrodes 75 are disposed on data lines 78 to cover the data lines 78 except for connecting points between the data lines 78 and the pixel TFT, and the shield electrodes 75 are connected to the shield electrodes of the neighboring pixels on the data lines 78.

In the example of FIG. 13, the data line 78 is not covered by the shield electrode 75 at an area where a contact hole 79 for connecting the data line 78 and the pixel TFT is provided. It is because there is a hollow part on the sectional figure of the data line 78 formed in the contact hole 79 part, and the data line 78 and the shield electrode 75 may be short-circuited if the shield electrode 75 is disposed on the hollow part.

Figure 14:
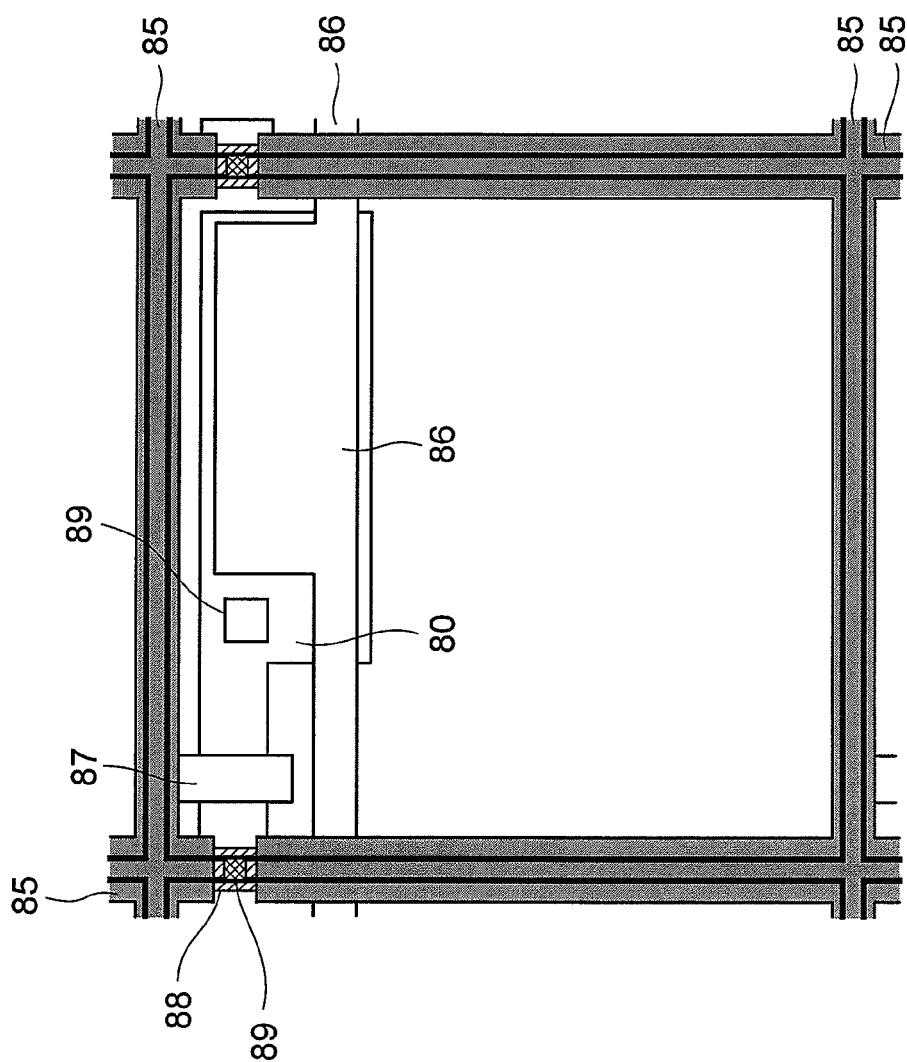
FIG. 14 is an illustration for describing another pixel layout according to the third exemplary embodiment of the invention.

In the example illustrate herein, there is an area where the shield electrode 75 does not cover the data line 78 so as to avoid the contact hole 79 part. Because of the same reason, an area where the shield electrode 75 does not cover the data line 78 may also be provided at an intersection point between the semiconductor layer and the data line, an intersection point between the gate line and the data line, etc. Further, as shown in FIG. 14, with a layout where shield electrodes 85 are connected between the electrodes neighboring to each other along the gate lines, the shield electrodes 85 may be isolated at the intersection point between the contact hole 89 part and a data line 88, the intersection point between the semiconductor layer and a data line 88, and the intersection point between a gate line 87 and the data line 88, etc.

With these pixel layouts, the effect of suppressing flickers is decreased in accordance with the size of the area where the shield electrodes 75, 85 do not cover the data lines 78, 88. However, defects caused by short-circuit generated between the shield electrodes 75, 85 and the data lines 78, 88 can be reduced, so that it is expected to improve the yields.

Fourth Exemplary Embodiment

Figure 15:
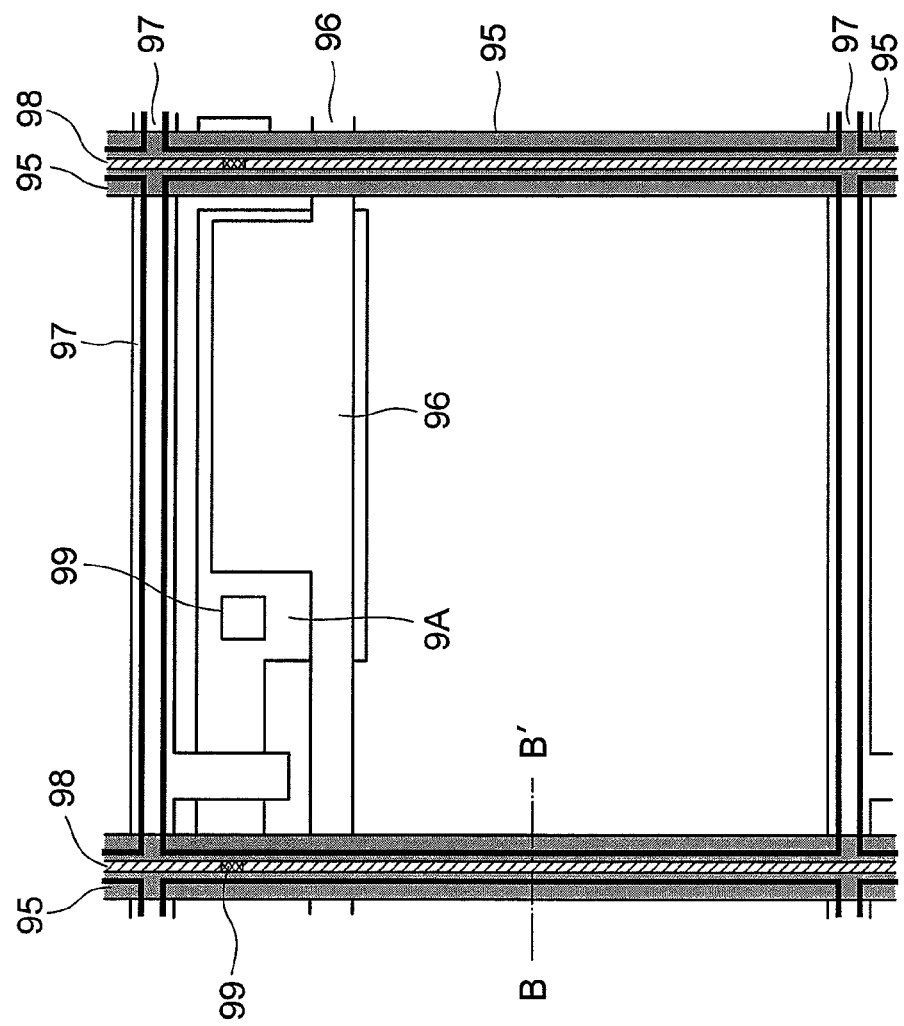
FIG. 15 is an illustration for describing a pixel layout according to a fourth exemplary embodiment of the invention.
Figure 16:
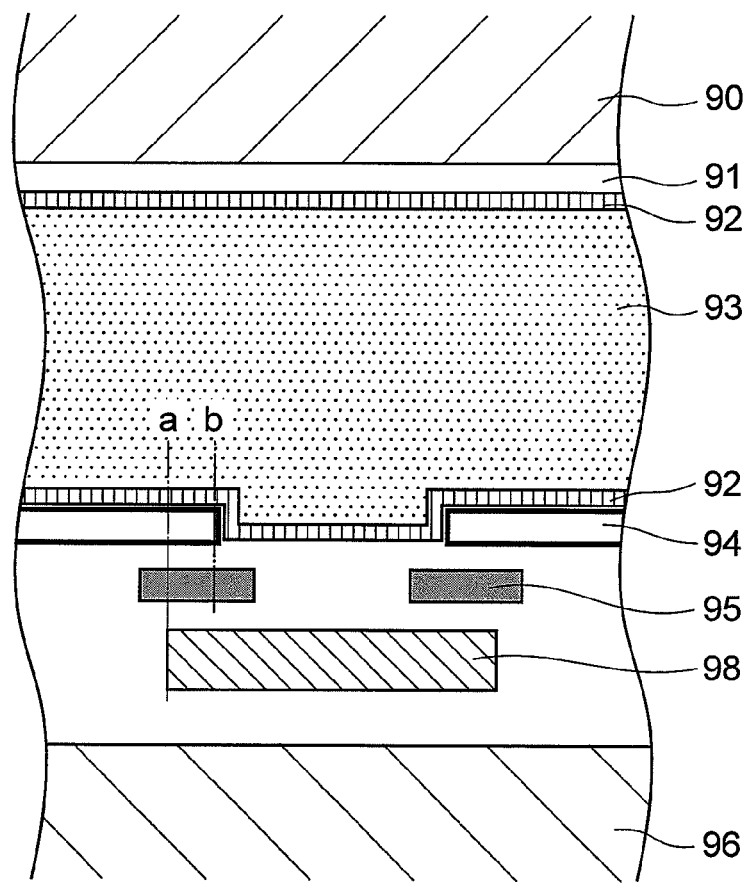
FIG. 16 is an illustration showing a sectional structure of one pixel according to the fourth exemplary embodiment of the invention.

FIG. 15 shows a pixel layout according to a fourth exemplary embodiment of the invention. FIG. 16 shows a sectional structure thereof taken along a line B-B' of FIG. 15.

The fourth exemplary embodiment is different from the first exemplary embodiment in respect that a shield electrode layer 95 in the fourth exemplary embodiment is disposed between an end part of a data line 98 on a pixel electrode 94 side and an end part of the pixel electrode 94 on the data line side, and the shield electrode layer 95 is connected on the end part of the data line 98 mutually with the shield electrode layers of the pixels that are neighboring to each other.

Provided that the end part of the data line 98 is referred to as a and the end part of the pixel electrode 94 as b, the shield electrode 95 is disposed to cover at least the overlapped part, i.e. a part indicated by a-b, of the data line 98 and the pixel electrode 94. In the part other than the overlapped part, there is an area where the data line 98 is not covered by the shield electrode 95.

In the example of FIG. 15, the shield electrodes 95 are connected between the pixels that are neighboring to each other in the vertical direction along the data line 98. However, as shown in FIG. 12, the shield electrodes 95 may also be connected between the pixels neighboring to each other in the lateral direction. Further, as shown in FIG. 13, a part of the overlapped part of the data line 98 and the pixel electrode 94 may not have to be covered by the shield for preventing short-circuit between the shield electrode 95 and the data line 98, or for other reasons. With this pixel layout, an effect of suppressing flickers can be obtained by disposing the shield electrode 95 at the overlapped part where the component of capacitance coupling between the pixel electrode 94 and the data line 98 becomes the highest. Further, the wiring capacitance of the data line 98 can be made smaller by reducing the size of the overlapped area between the data line 98 and the shield electrode 95. Thus, it becomes possible to write a voltage to the data line 98 at a high speed. Furthermore, a load on the data driver circuit for driving the data line 98 can be reduced, so that the low power consumption can be achieved.

Fifth Exemplary Embodiment

Figure 17:
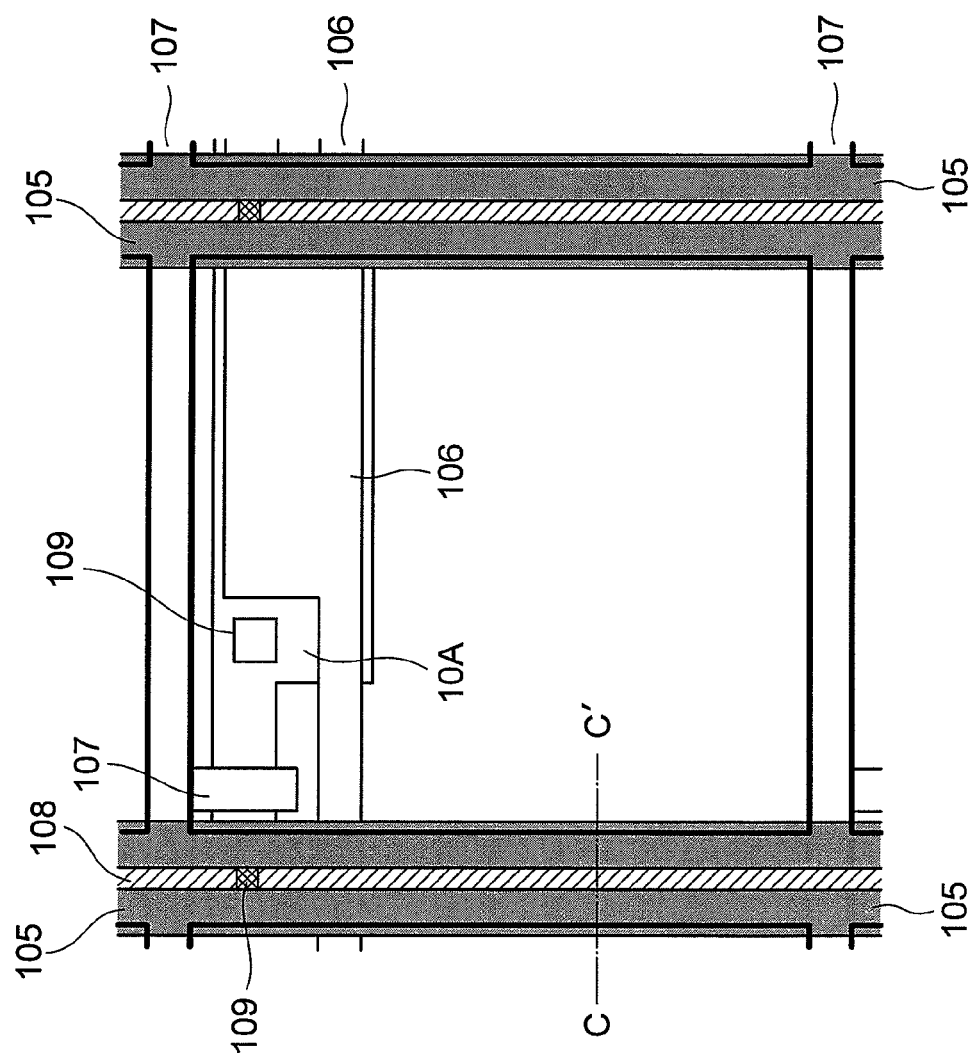
FIG. 17 is an illustration for describing a pixel layout according to a fifth exemplary embodiment of the invention.
Figure 18:
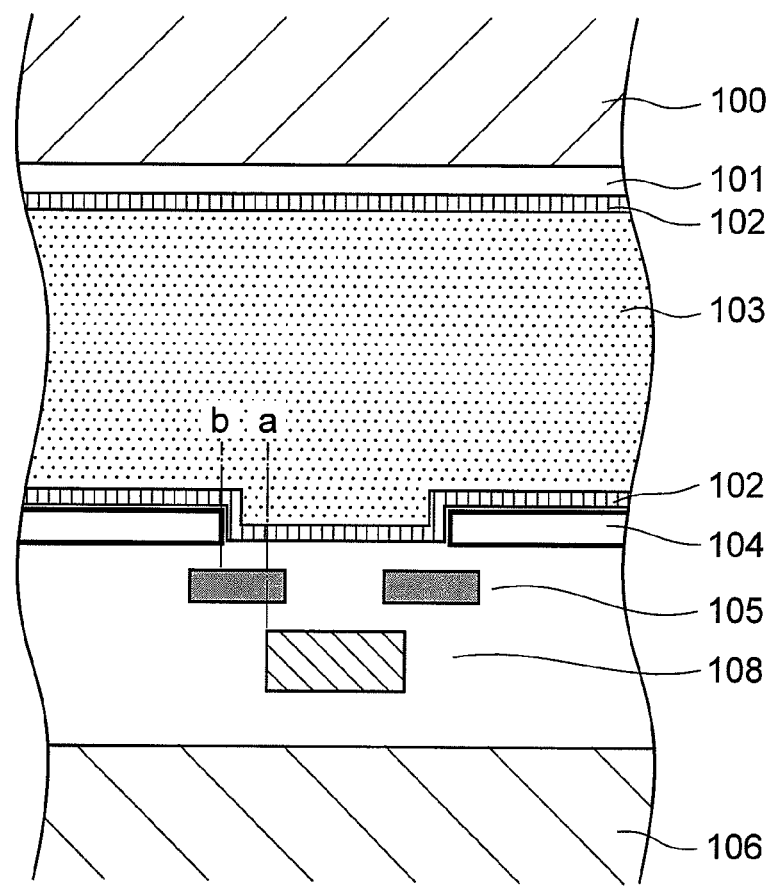
FIG. 18 is an illustration showing a sectional structure of one pixel according to the fifth exemplary embodiment of the invention.

FIG. 17 shows a pixel layout according to a fifth exemplary embodiment of the invention. FIG. 18 shows a sectional structure thereof taken along a line C-C' of FIG. 17.

As in the case of the fourth exemplary embodiment, a shield electrode layer 105 of the fifth exemplary embodiment is disposed between an end part of a data line 108 on a pixel electrode 104 side and an end part of the pixel electrode 104 on the data line 108 side, and the shield electrode layer 105 is connected mutually with the shield electrodes of the neighboring pixels on the end part of the data line 108.

Further, the fifth exemplary embodiment is different from the first exemplary embodiment in respect that it is designed in such a layout that: the end part a of the data line 108 and the end part b of the pixel electrode 104 are arranged not to overlap with each other in the majority of the pixel area; the shield electrode 105 is arranged to overlap with the end part a of the data line 108, the end part b of the pixel electrode 104, or on both of the end part a and the end part b; and a part or the entire part of the data line 108 is not covered by the shield electrode 105.

FIG. 17 illustrates the example where the shield electrodes 105 are connected between the pixels neighboring to each other in the vertical direction along the data line 108. However, as in FIG. 12, the shield electrodes 105 may also be connected between the pixels neighboring to each other in the lateral direction. Further, as shown in FIG. 13, a part of the end part a of the pixel electrode 104 may not have to be covered by the shield electrode 105 for preventing short-circuit between the shield electrode 105 and the data line 108 or for other reasons.

In the pixel layout, the electric force line generated due to a potential difference of the pixel electrode 104 and the data line 108 becomes the densest on a line a-b (connecting the end part a and the end part b) where the distance between the pixel electrode 104 and the data line 108 is the closest. Thus, by disposing the shield electrode 105 at this part, coupling of the capacitances of the pixel electrode 104 and the data line 108 can be reduced. Thereby, the effect of suppressing flickers can be obtained. Further, through reducing the size of the overlapped area between the data line 108 and the shield electrode 105, wiring capacitance of the data line 108 can be reduced. Therefore, it becomes possible to write a voltage to the data line 108 at a high speed. Furthermore, a load on the data driver circuit for driving the data line 108 can be reduced, so that the low power consumption can be achieved.

Sixth Exemplary Embodiment

Figure 19:
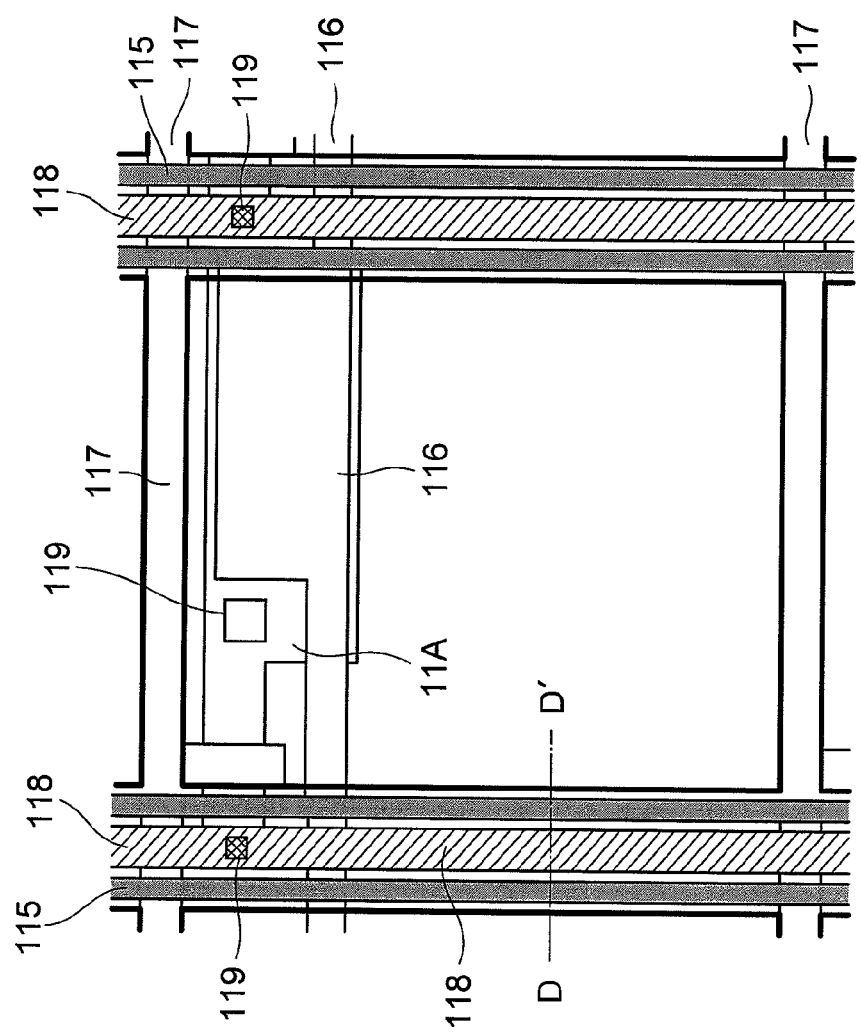
FIG. 19 is an illustration for describing a pixel layout according to a sixth exemplary embodiment of the invention.
Figure 20:
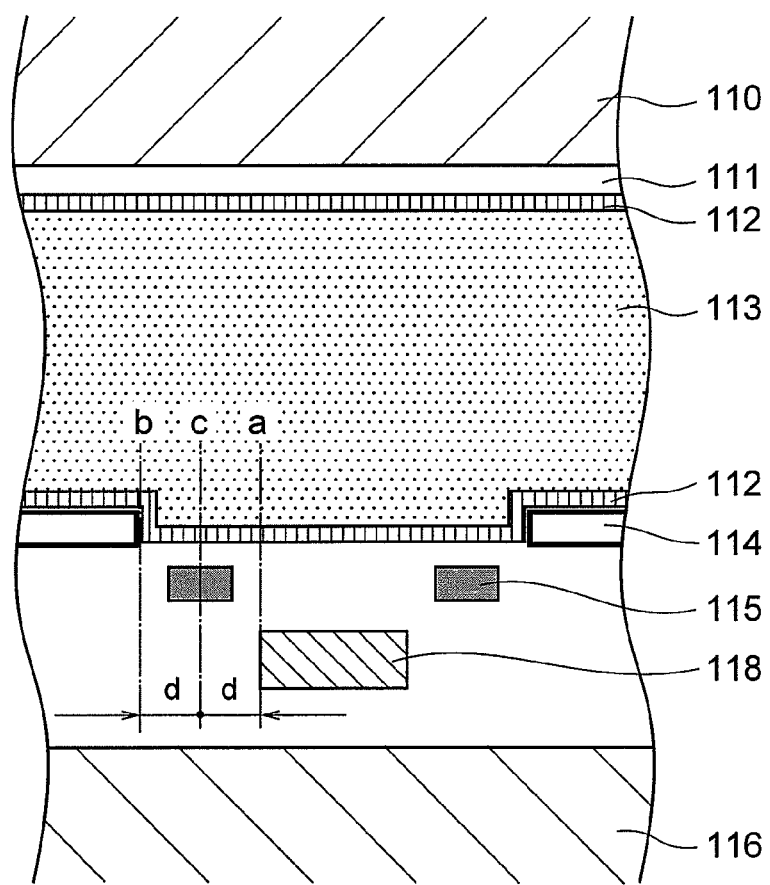
FIG. 20 is an illustration showing a sectional structure of one pixel according to the sixth exemplary embodiment of the invention.

FIG. 19 shows a pixel layout according to a sixth exemplary embodiment of the invention. FIG. 20 shows a sectional structure thereof taken along a line D-D' of FIG. 19.

The sixth exemplary embodiment is different from the first exemplary embodiment in respect that a shield electrode layer 115 is disposed at an intermediate point of a line connecting an end part of a data line 118 on a pixel electrode 114 side and an end part of the pixel electrode 114 on the data line 118 side, and an extended part of the shield electrode layer 115 that is in parallel to the data line 118 is connected mutually with the shield electrode layers of the neighboring pixels.

That is, the sixth exemplary embodiment has such a layout that: the end part a of the data line 118 and the end part b of the pixel electrode 114 are arranged not to overlap with each other in the majority of the pixel area; the shield electrode 105 is arranged at a position c that is the intermediate point between the part a and the part b; and a part or the entire part of the data line 118 is not covered by the shield electrode 115.

FIG. 19 illustrates an example where the shield electrodes 115 are connected between the pixels neighboring to each other in the vertical direction along the data line 118. However, as in FIG. 12, the shield electrodes 115 may also be connected between the pixels neighboring to each other in the lateral direction. Further, as shown in FIG. 13, the end part a of the pixel electrode 114 may not have to be covered by the shield electrode 115 for preventing short-circuit between the shield electrode 115 and the data line 118 or for other reasons.

In the pixel layout, the electric force line generated due to a potential difference of the pixel electrode 114 and the data line 118 becomes the densest on a line a-b (connecting the end part a and the end part b) where the distance between the pixel electrode 114 and the data line 118 is the closest. Thus, by disposing the shield electrode 115 at this part, coupling of the capacitances of the pixel electrode 114 and the data line 118 can be reduced. Thereby, the effect of suppressing flickers can be achieved. However, the effect is smaller than that of the case described in the fifth exemplary embodiment.

Meanwhile, since the shield electrode 115 does not overlap with the pixel electrode 114 and the data line 118, a step generated in the pixel part due to the shield electrode 115 disposed therein can be made smaller. Decreasing the step is effective for improving the alignment property of the liquid crystal molecules. Further, since the size of the overlapped area of the data line 108 and the shield electrode 115 can be reduced, wiring capacitance of the data line 108 can be made smaller. Therefore, it becomes possible to write a voltage to the data line 118 at a high speed. Furthermore, a load on the data driver circuit for driving the data line 118 can be reduced, so that low power consumption can be achieved.

Seventh Exemplary Embodiment

Figure 21:
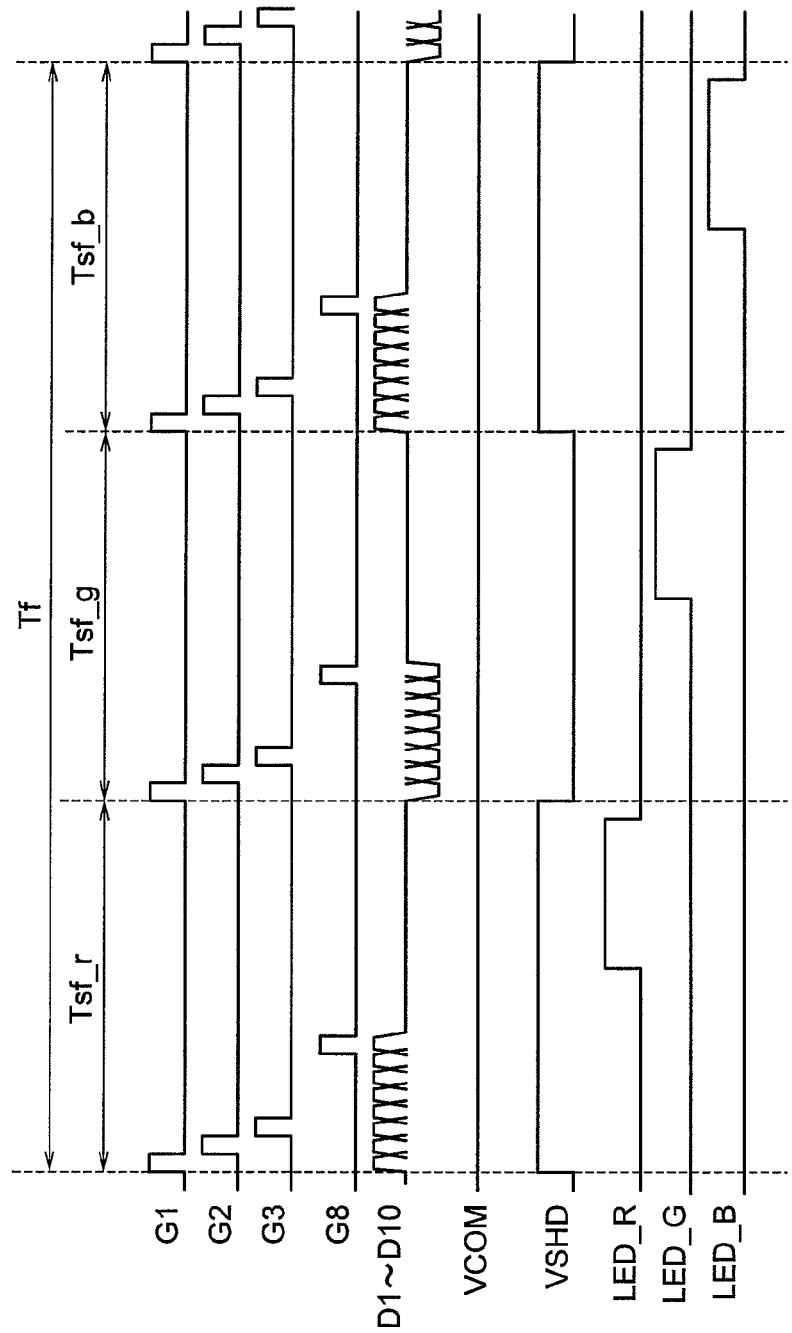
FIG. 21 is a timing chart for showing a driving method of a liquid crystal display device according to a seventh exemplary embodiment of the invention.

FIG. 21 is a timing chart showing a driving method of a liquid crystal display device according to a seventh exemplary embodiment of the present invention.

As a configuration and a structure of the liquid crystal display device, any of the above-described first to sixth exemplary embodiments of the invention can be employed. The difference between the seventh exemplary embodiment and the first exemplary embodiment is the driving method, i.e. the way of controlling the shield electrode potential VSHD. As shown in FIG. 21, in the seventh exemplary embodiment, the shield electrode potential VSHD is changed by a sub-frame unit in accordance with the polarities of the video signals for VCOM.

With this driving method of the liquid crystal display device, flickers can be reduced dramatically.

As described above, the potential fluctuation of the pixel electrode caused due to the potential fluctuation of the data line can be reduced sufficiently by setting the shield electrode to a constant potential. In addition, through changing the potential of the shield electrode by a sub-frame unit, it becomes possible to compensate a luminance difference generated in accordance with a difference in the polarities of the video signals that cannot be fully prevented only by the effect of the shield. Therefore, the flickers can be reduced still further.

The reason for this is that it becomes possible to control the potential of the pixel electrode with the potential of the shield electrode, through changing the potential of the shield electrode depending on the polarities of the video signals, thereby making it possible to reduce the luminance change that cannot be prevented only with the shield effect.

The change amount of the shield electrode potential VSHD can be obtained through changing the VSHD while observing the liquid crystal display device to adjust the amount of flickers to be the minimum.

Eighth Exemplary Embodiment

Figure 22:
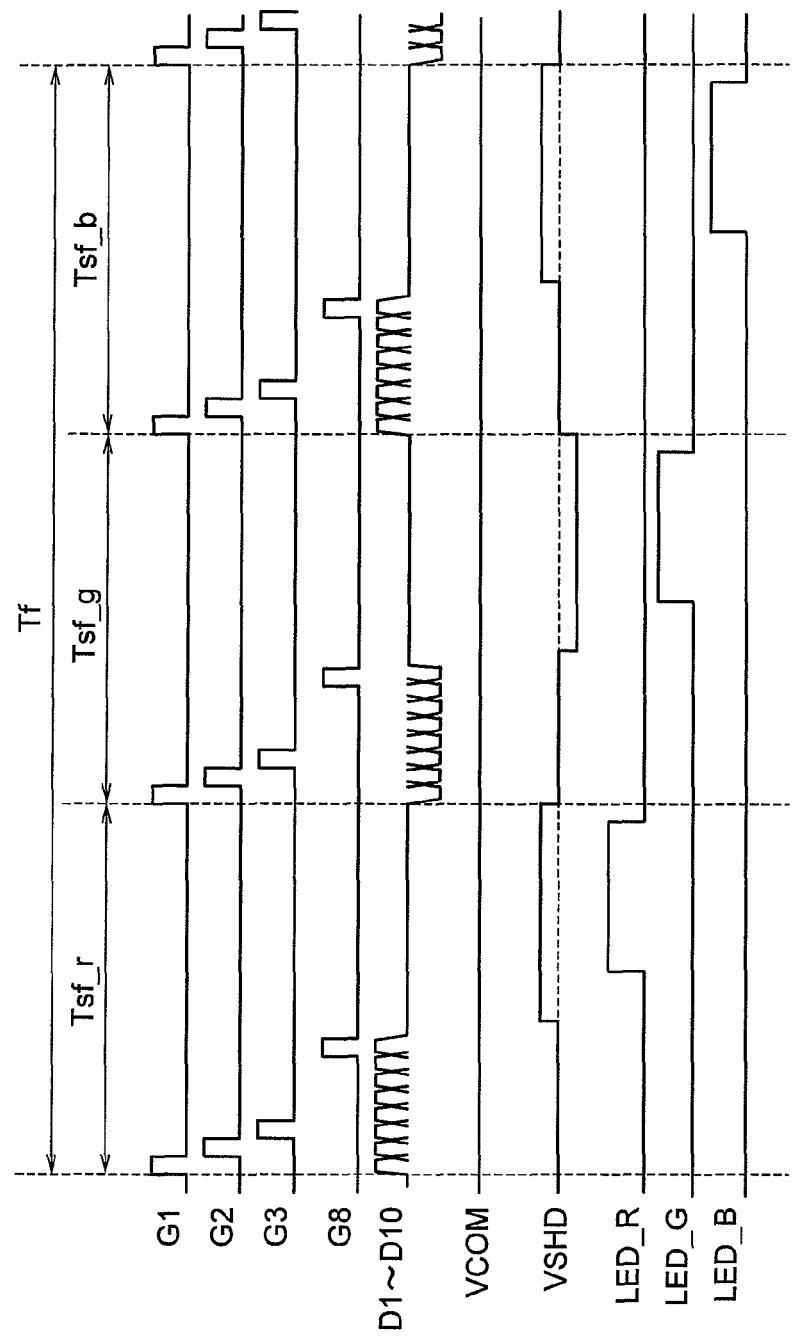
FIG. 22 is a timing chart for showing a driving method of a liquid crystal display device according to an eighth exemplary embodiment of the invention.

FIG. 22 is a timing chart showing a driving method of a liquid crystal display device according to an eighth exemplary embodiment of the invention. As a configuration and a structure of the liquid crystal display device, any of the above-described first to sixth exemplary embodiments of the invention can be employed. The difference between the eighth exemplary embodiment and the first exemplary embodiment is the driving method, i.e. the way of controlling the shield electrode potential VSHD.

As shown in FIG. 22, the difference therebetween is as follows. That is, in the eighth exemplary embodiment, the shield electrode potential VSHD is changed by a sub-frame unit in accordance with the polarities of the video signals for VCOM and, further, it is changed within the sub-frame unit for the period where the video signal is written and for the other period.

The period where the potential becomes different within the sub-frame is a period from the point where writing of the video signal is completed until the point where next writing is started, and it is set to include at least the period where the light source is lighted up.

With this method, control of the luminance by changing the shield electrode potential can be performed more effectively, because the pixel electrode potential is fluctuated by the change of the shield electrode potential while the pixel is holding the video signal, since the shield electrode potential is changed after completing the writing of the video signal. Therefore, the luminance can be changed in accordance with the fluctuation amount of the pixel electrode potential, thereby enabling the luminance to be controlled more effectively. The change amount of the shield electrode potential VSHD can be obtained through changing the VSHD while observing the liquid crystal display device to adjust the amount of flickers to be the minimum.

Ninth Exemplary Embodiment

Figure 23:
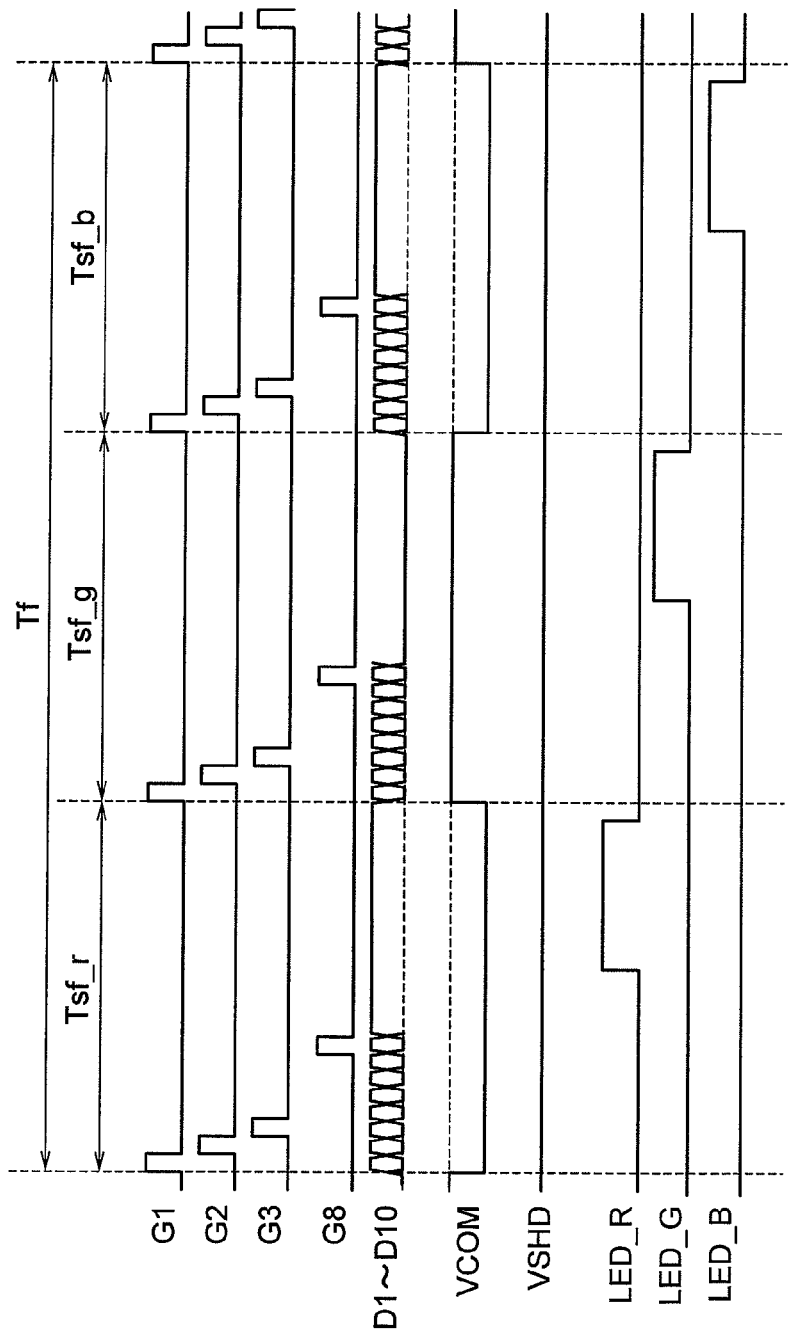
FIG. 23 is a timing chart for showing a driving method of a liquid crystal display device according to a ninth exemplary embodiment of the invention.

FIG. 23 is a timing chart showing a driving method of a liquid crystal display device according to a ninth exemplary embodiment of the invention.

As a configuration and a structure of the liquid crystal display device, any of the above-described first to sixth exemplary embodiments of the invention can be employed. The difference between the ninth exemplary embodiment and the first exemplary embodiment is the driving method. That is: the counter electrode potential VCOM is changed by a sub-frame unit, and the setting of the potential of the video signal varies depending on the VCOM; and the way of controlling the shield electrode potential is different. The counter electrode potential VCOM is changed by an amount that is almost equivalent to the maximum amplitude of the video signals by a sub-frame unit, and the potential of the video signal is set in accordance with the potential of this VCOM.

With this driving method, the amplitude of the video signals outputted from the data driver circuit can be suppressed about to a half of the case where VCOM is set to a constant potential. This makes it possible to reduce the power consumed by the data driver circuit. Further, by setting the shield electrode potential to a constant potential, an effect of shielding the pixel electrode from the potential fluctuation of the data line can be obtained. As a result, flickers can be reduced.

Tenth Exemplary Embodiment

Figure 24:
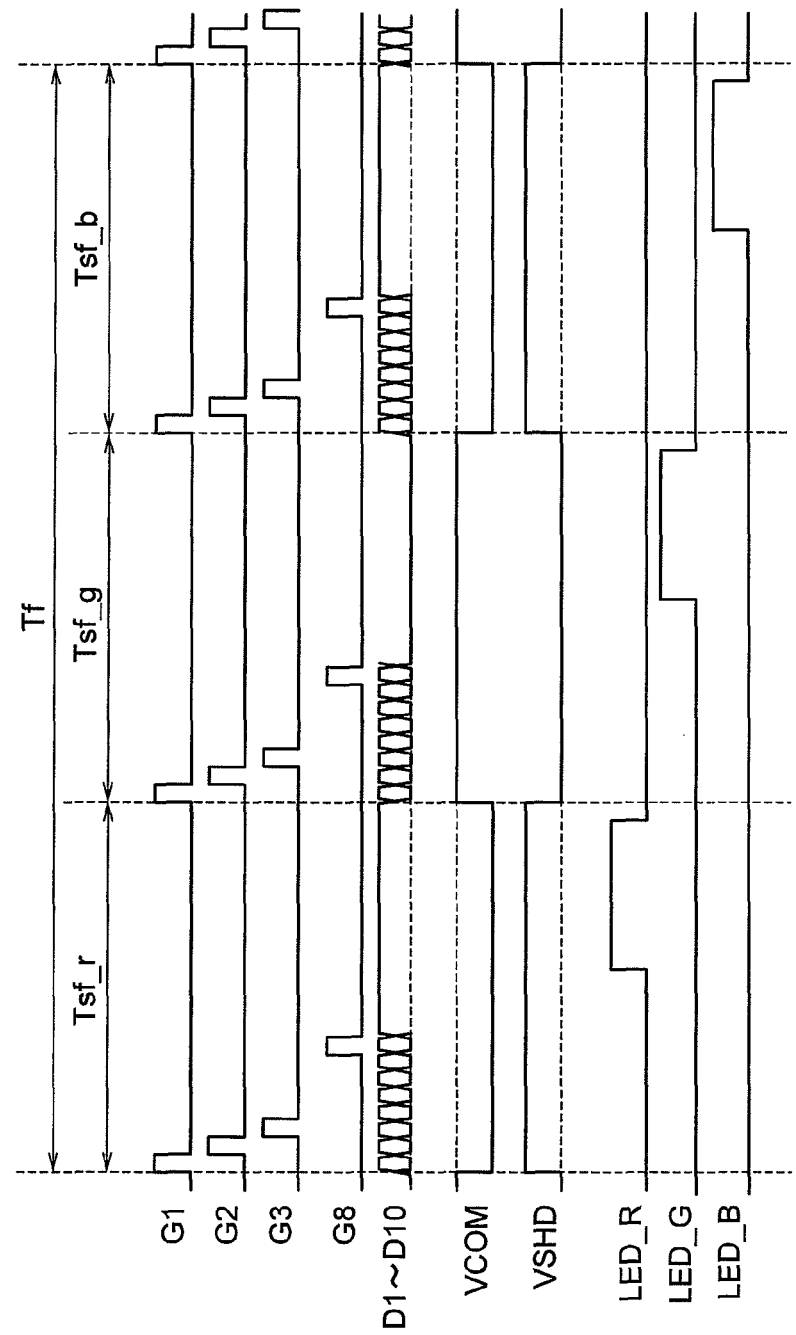
FIG. 24 is a timing chart for showing a driving method of a liquid crystal display device according to a tenth exemplary embodiment of the invention.

FIG. 24 is a timing chart showing a driving method of a liquid crystal display device according to a tenth exemplary embodiment of the invention. As a configuration and a structure of the liquid crystal display device, any of the above-described first to sixth exemplary embodiments of the invention can be employed. The difference between the tenth exemplary embodiment and the ninth exemplary embodiment described above is that not only the counter electrode potential VCOM is changed by a sub-frame unit but also the shield electrode potential VSHD is changed by a sub-frame unit.

In the example shown in FIG. 24, the polarities of the video signals D1-D10 written to the pixels for the counter electrode potential VCOM are changed by each of the sub-frames Tsf_r, Tsf_g, and Tsf_b. The shield electrode potential VSHD is changed during a period from the point where the control signals LED_R, LED_G, and LED_B of the backlight turn to low level until the point where the video signal is written in a next sub-frame.

With this driving method, it becomes possible to compensate a luminance difference generated in accordance with a difference in the polarities of the video signals that cannot be fully prevented only by the effect of the shield, through changing the potential of the shield electrode by a sub-frame unit. Therefore, flickers can be reduced still further. The reason for this is the same as the reason described in the seventh exemplary embodiment. The change amount of the shield electrode potential VSHD can be obtained through changing the VSHD while observing the liquid crystal display device to adjust the amount of flickers to be the minimum.

Eleventh Exemplary Embodiment

Figure 25:
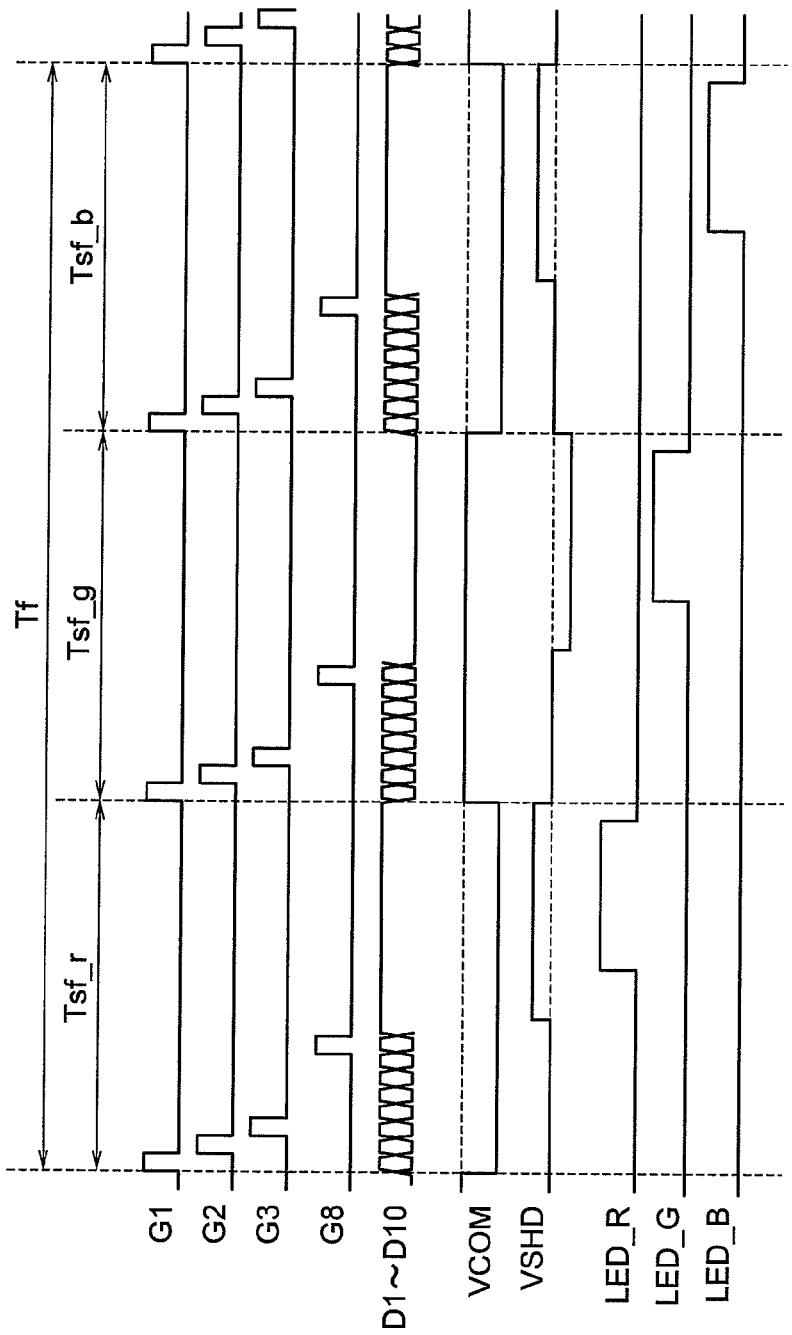
FIG. 25 is a timing chart for showing a driving method of a liquid crystal display device according to an eleventh exemplary embodiment of the invention.

FIG. 25 is a timing chart showing a driving method of a liquid crystal display device according to an eleventh exemplary embodiment of the invention. As a configuration and a structure of the liquid crystal display device, any of the above-described first to sixth exemplary embodiments of the invention can be employed. The difference between the eleventh exemplary embodiment and the fourth exemplary embodiment described above is that not only the counter electrode potential VCOM is changed by a sub-frame unit but also the shield electrode potential VSHD is changed by a sub-frame unit. In addition, it is changed within the sub-frame unit for the period where the video signal is written and for the other period.

With this method, control of the luminance by changing the shield electrode potential can be performed more effectively. The reason for this is the same as the reason described in the eighth exemplary embodiment. The change amount of the shield electrode potential VSHD can be obtained, through changing the VSHD while observing the liquid crystal display device to adjust the amount of flickers to be the minimum.

Twelfth Exemplary Embodiment

Figure 26:
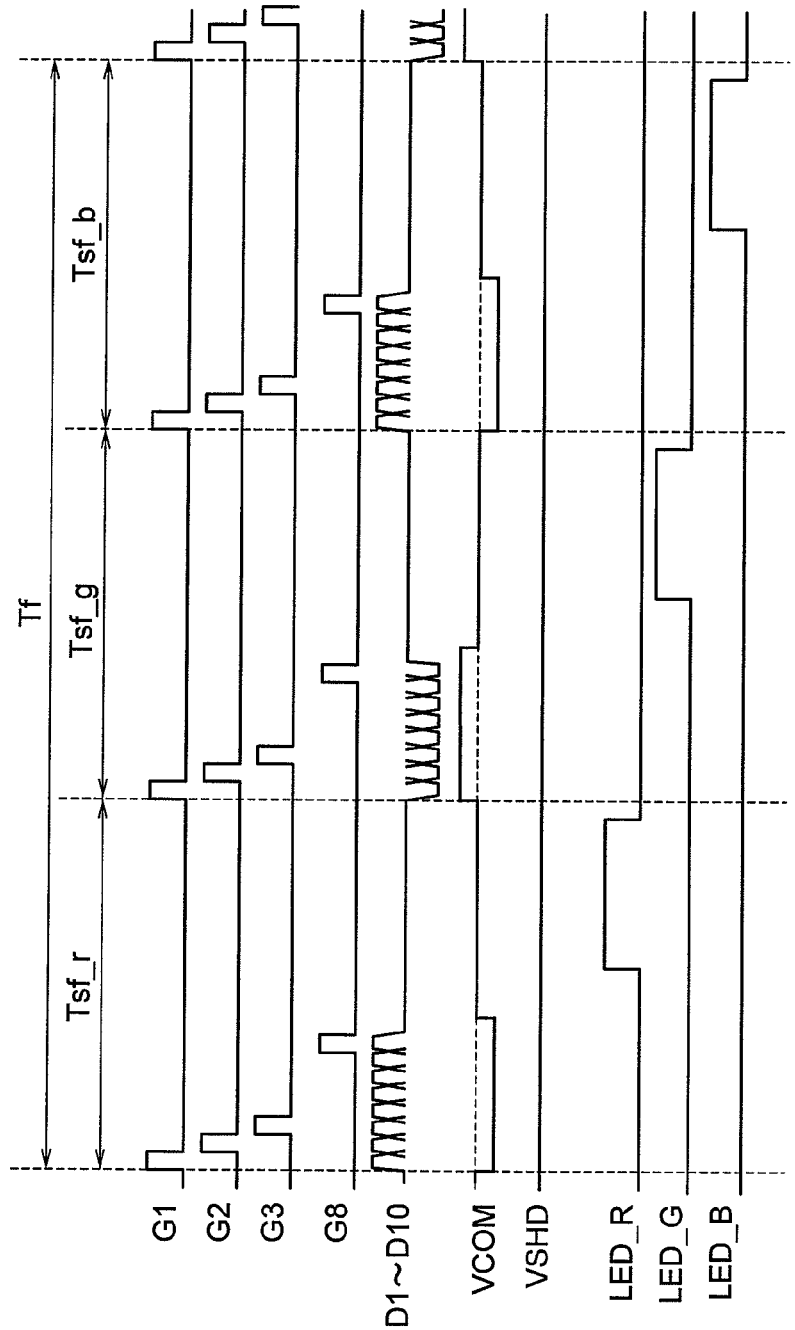
FIG. 26 is a timing chart for showing a driving method of a liquid crystal display device according to a twelfth exemplary embodiment of the invention.

FIG. 26 is a timing chart showing a driving method of a liquid crystal display device according to a twelfth exemplary embodiment of the invention. As a configuration and a structure of the liquid crystal display device, any of the above-described first to sixth exemplary embodiments of the invention can be employed. Further, the driving method shown with the timing chart of FIG. 26 is almost the same as that of the first exemplary embodiment. The difference between the twelfth exemplary embodiment and the first exemplary embodiment is the drive waveform of the counter electrode potential VCOM and the timing for lighting up the light source.

The voltage of the counter electrode potential VCOM in each sub-frame is changed for the period where the video signal is written and for other periods. As the changing method thereof, employed is a driving method in which: the value of VCOM in the period where the video signal is being written is set as a voltage with which all the pixels becomes substantially black display, regardless of the values of the video signals written to each pixel; and VCOM is returned to a normal voltage after writing of all the video signals is completed. Further, the light source of the backlight is lighted up after passage of a certain time from the point where VCOM changes to the normal voltage.

Through this action, all the pixels of the liquid crystal display device are changed to a state that corresponds to the video signal written at once, from the point when VCOM is changed to the normal voltage. Therefore, there is no luminance difference generated in any positions of the screen even when the light source is lighted up before the change in the liquid crystal is fully completed. As a result, the period for lighting up the backlight can be set longer, so that a bright screen can be obtained.

When employing this method, it is necessary to set the polarities of the video signals for VCOM to be written to all the pixels in each sub-frame period to be the same. This method for setting the shield electrode potential VSHD and the potentials of the video signals employed in this driving method may be changed to any of the methods described in the seven to eleventh exemplary embodiments. In the case of this driving method, the response time required for the liquid crystal is not necessarily as short as the sub-frame period. However, the shorter the response time, the more the light utilizing efficiency can be improved.

With the driving method of the twelfth exemplary embodiment, it becomes possible to obtain a fine picture quality without having flickers even when the material exhibiting high response speed is used for the liquid crystal. The reason of this is the same as the reason described in the first to eleventh exemplary embodiments. In addition to that, it is also possible to obtain an effect of achieving a bright screen. The reason for achieving this is that the period for lighting up the backlight can be set longer.

Thirteenth Exemplary Embodiment

Figure 27:
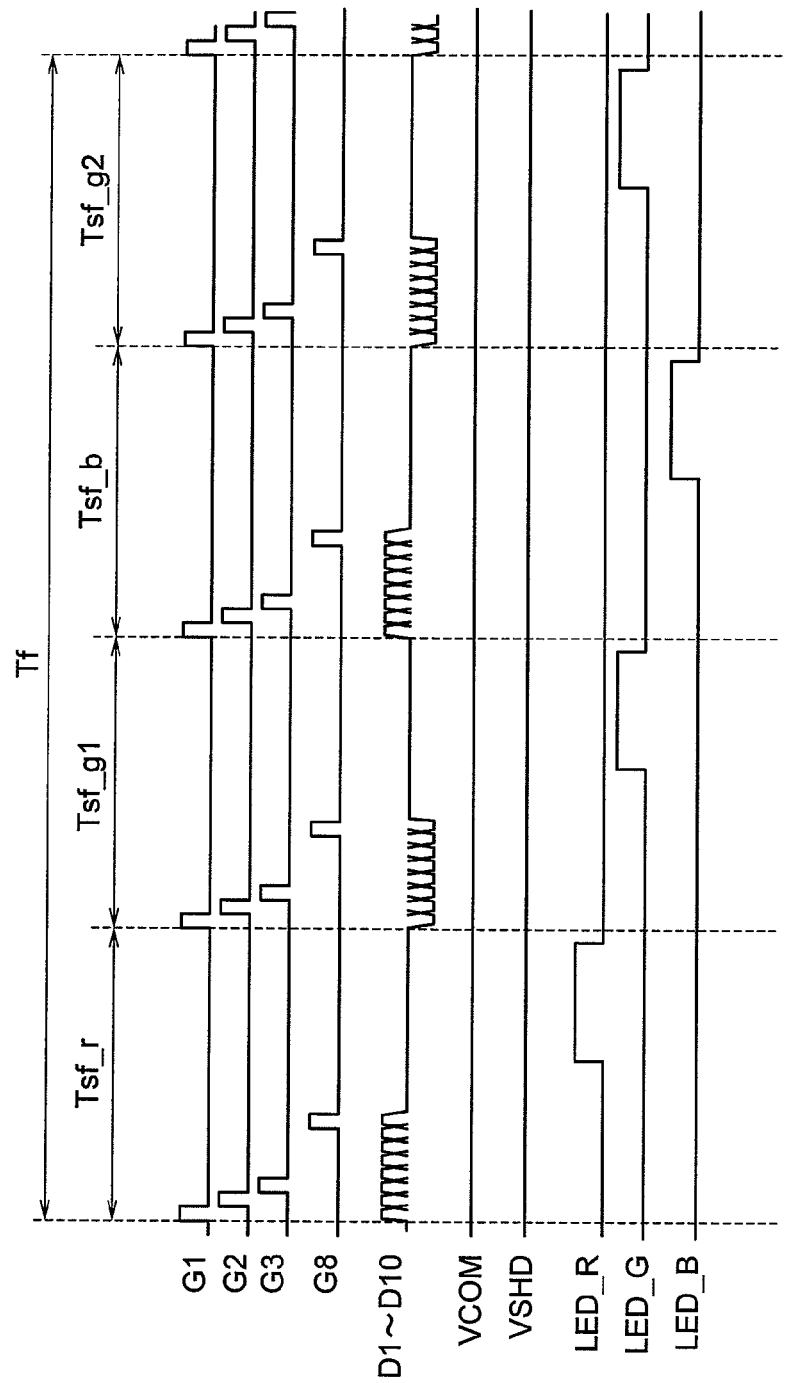
FIG. 27 is a timing chart for showing a driving method of a liquid crystal display device according to a thirteenth exemplary embodiment of the invention.

FIG. 27 is a timing chart showing a driving method of a liquid crystal display device according to a thirteenth exemplary embodiment of the invention. As a configuration and a structure of the liquid crystal display device, any of the above-described first to sixth exemplary embodiments of the invention can be employed.

With this driving method, one frame period Tf is divided into sub-frame periods Tsf_r, Tsf_g1, Tsf_b, and Tsf_g2. Actions in each frame period are almost the same as those of the first exemplary embodiment, except that the shield electrode potential VSHD is set to be constant. An image of R is displayed in the period Tsf_r, and an image of B is displayed in Tsf_b. An image of G is displayed in both of the periods Tsf_g1 and Tsf_g2. Although not shown, the polarities of the video signals for the counter electrode potential are inverted by each sub-frame of a next frame.

With this driving method, the image of G is displayed twice, thereby obtaining such an advantage that the screen can be brightened. Among the luminance of R, G, and B required for displaying adequate white on the liquid crystal display device, the luminance of G is the largest. The next is R, and B is the last. Therefore, it is necessary to increase the luminance of the light source of G of the backlight.

When LEDs are used for the light sources, the light emitting efficiency becomes deteriorated when the electric current flown to the LEDs is increased. Thus, it is necessary to increase the number of LEDs for G than the LEDs for other colors, or to drive the LEDs for R and B by a small electric current than that of the LEDs for G. However, by displaying G twice in one frame, the luminance required per display can be made smaller. Thus, the electric current required thereby can be reduced as well. As a result, it becomes unnecessary to execute actions by deteriorating the light emitting efficiency. This makes it possible to obtain bright images even when the backlight is driven with the same electric power.

Because of the similar reasons, it is possible to brighten the screen further with a driving method which divides one frame into five sub-frames, and displays G and R twice. Further, the method for setting the counter electrode potential VCOM, the shield electrode potential VSHD, and the potentials of the video signals in this driving method may be changed to the methods described in the seventh-twelfth exemplary embodiments. In that case, in addition to the effect of having a bright screen, the effects described in each of those exemplary embodiments can be obtained as well.

Fourteenth Exemplary Embodiment

Figure 28:
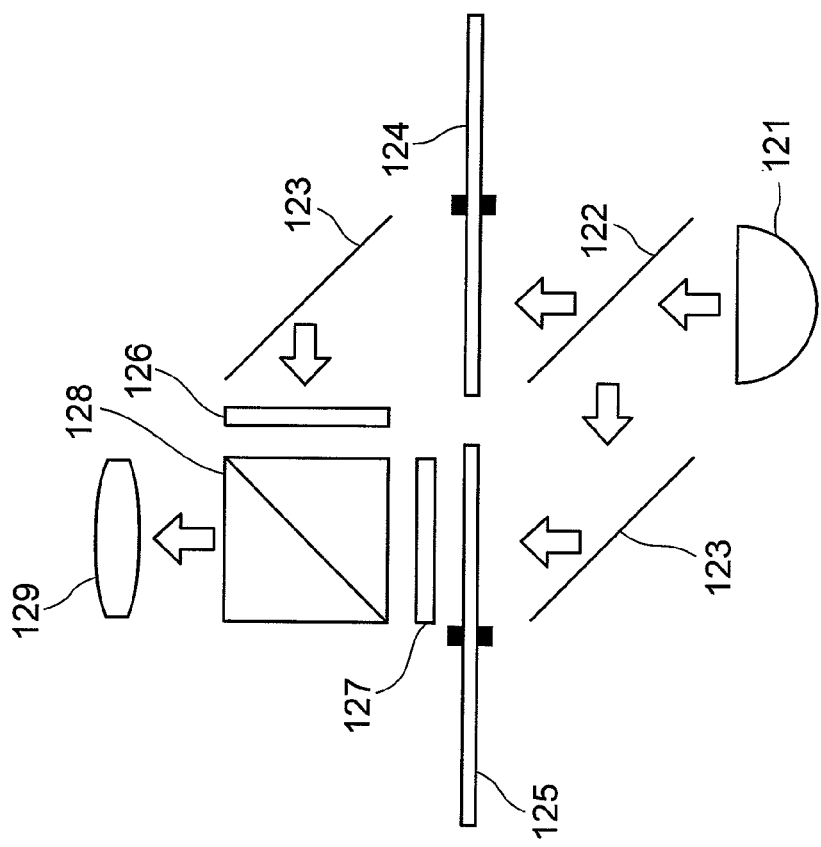
FIG. 28 is a block diagram showing a structure of a liquid crystal projector that is a fourteenth exemplary embodiment of the invention.

FIG. 28 shows a structural example of a liquid crystal projector using the liquid crystal display device according to each exemplary embodiment of the invention described above.

This liquid crystal projector is configured with: a light source lamp 121; a color separating mirror 122; a plurality of mirrors 123; two color wheels 124, 125; a liquid crystal display device 126 for G; a liquid crystal display device 127 for R and B; a synthesizing prism 128; and a projection lens 129. The color separating mirror 122 has a function of transmitting only the light of green (G) wave range and reflecting the light of other wave ranges. It is not essential for the color separating mirror 122 to be configured with a single mirror but may be configured with a plurality of color separating mirrors and a mirror or with a color filter and a mirror, for example.

Figure 29:
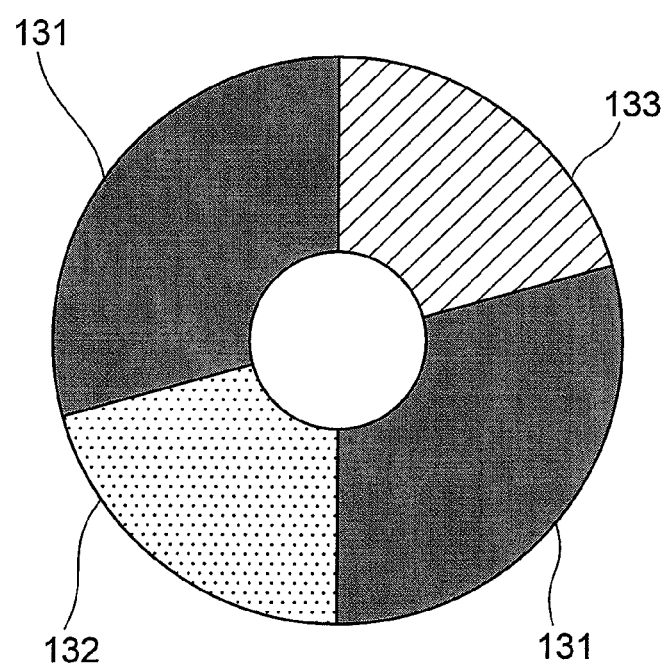
FIG. 29 is an illustration for describing a structure of a color wheel that is used in the fourteenth exemplary embodiment of the invention.
Figure 30:
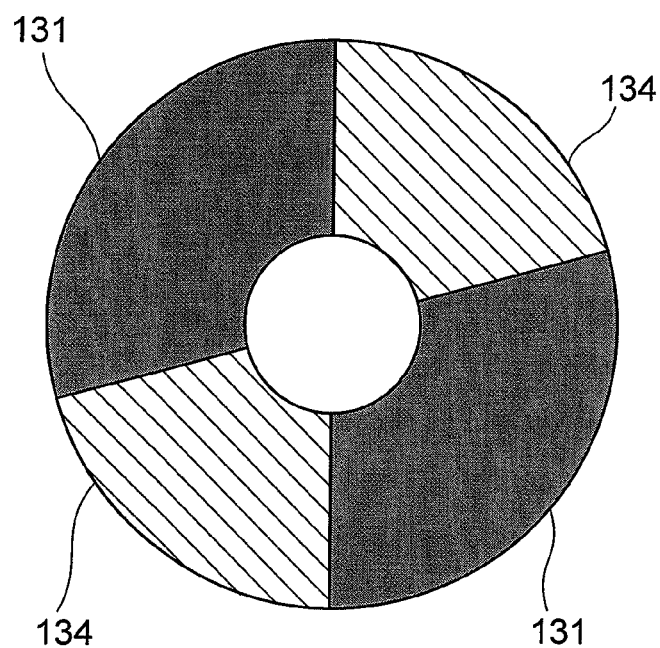
FIG. 30 is an illustration for describing another structure of the color wheel that is used in the fourteenth exemplary embodiment of the invention.

As shown in FIG. 29 and FIG. 30, the color wheels 124 and 125 used herein are: the color wheel 125 for R and B in which an R filter 132 that transmits the light of red wave range, a B filter 133 that transmits the light of blue wave range, and a shield filter 131 for shielding the light are arranged in a doughnut-like disk form; and the color wheel 124 for G in which two G filters 134 that transmit the light of green wave range and two shield filter 131 for shielding the light are arranged in a doughnut-like disk form. For the G filter 134 of the color wheel 124 for G, a color filter that transmits the light of wave range other than that of green may be used as well.

The synthesizing prism 128 is configured by combining a plurality of prisms, which has a function of synthesizing the light that makes incident on two planes and outputting the synthesized light from another plane. Instead of the synthesizing prism 128, an optical system having an equivalent function may also be used.

As a configuration and a structure of the liquid crystal display device 126 for G and the liquid crystal display device 127 for R, B, any of the above-described first to sixth exemplary embodiments of the invention can be employed. Actions thereof will be described hereinafter, assuming that the liquid crystal display device described in the first exemplary embodiment is employed as those devices.

White light emitted from the light source lamp 121 is separated by the color separating mirror 122 into light of green wave range and light of other wave ranges. The G light of the green range is irradiated to the liquid crystal display device 126 for G via the G color wheel 124, the halfway mirror 123, and the like, and the transmitted light makes incident on the synthesizing prism 128.

The light of other wave ranges than green makes incident on the color wheel 125 for R, B via the halfway mirror 123 and the like, and the transmitted light is irradiated to the liquid crystal display device 127 for R, B. The light transmitted through the liquid crystal display device 127 for R and B makes incident on the synthesizing prism 128, and it is synthesized with the light transmitted through the liquid crystal display device 126 for G, and the synthesized light is enlarged and projected on a screen through the projection lens 129.

Figure 31:
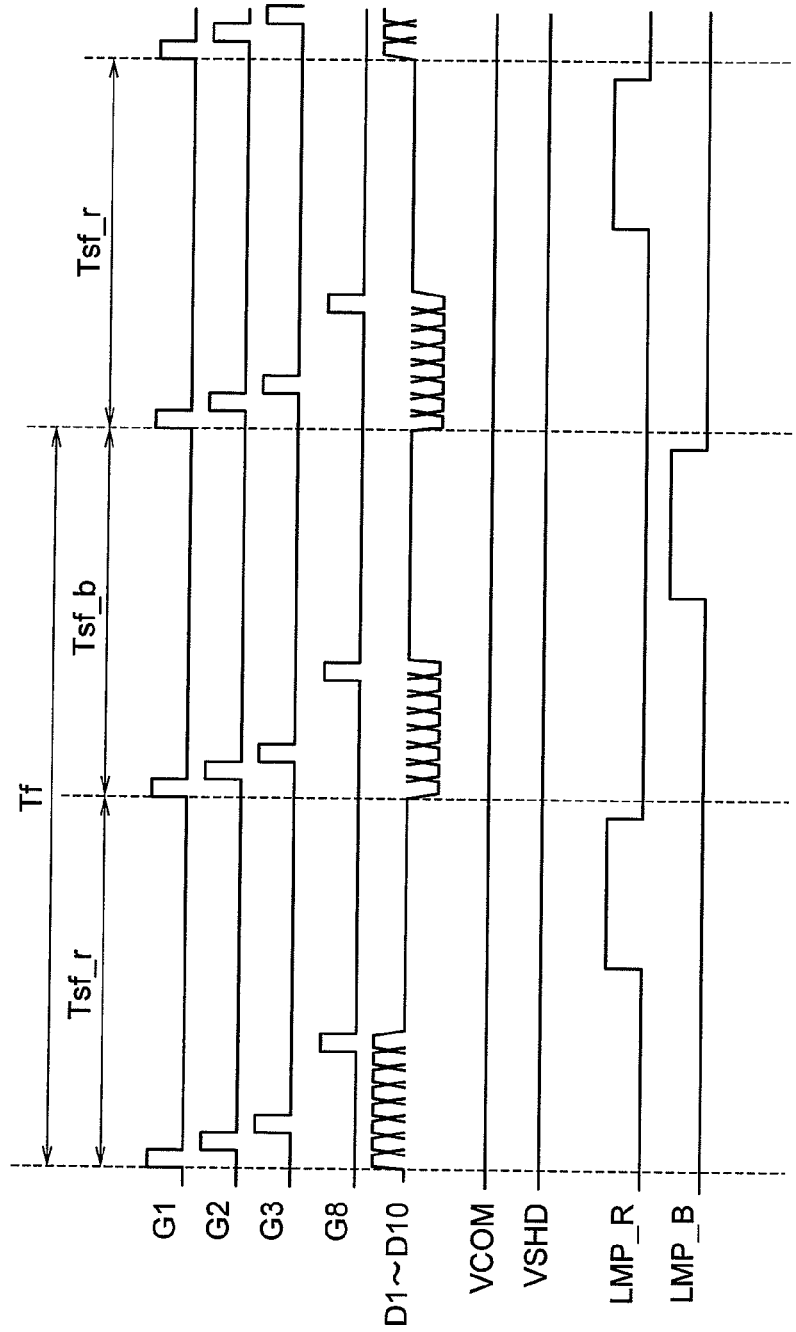
FIG. 31 is a timing chart for showing a driving method of a liquid crystal display device according to the fourteenth exemplary embodiment of the invention.
Figure 32:
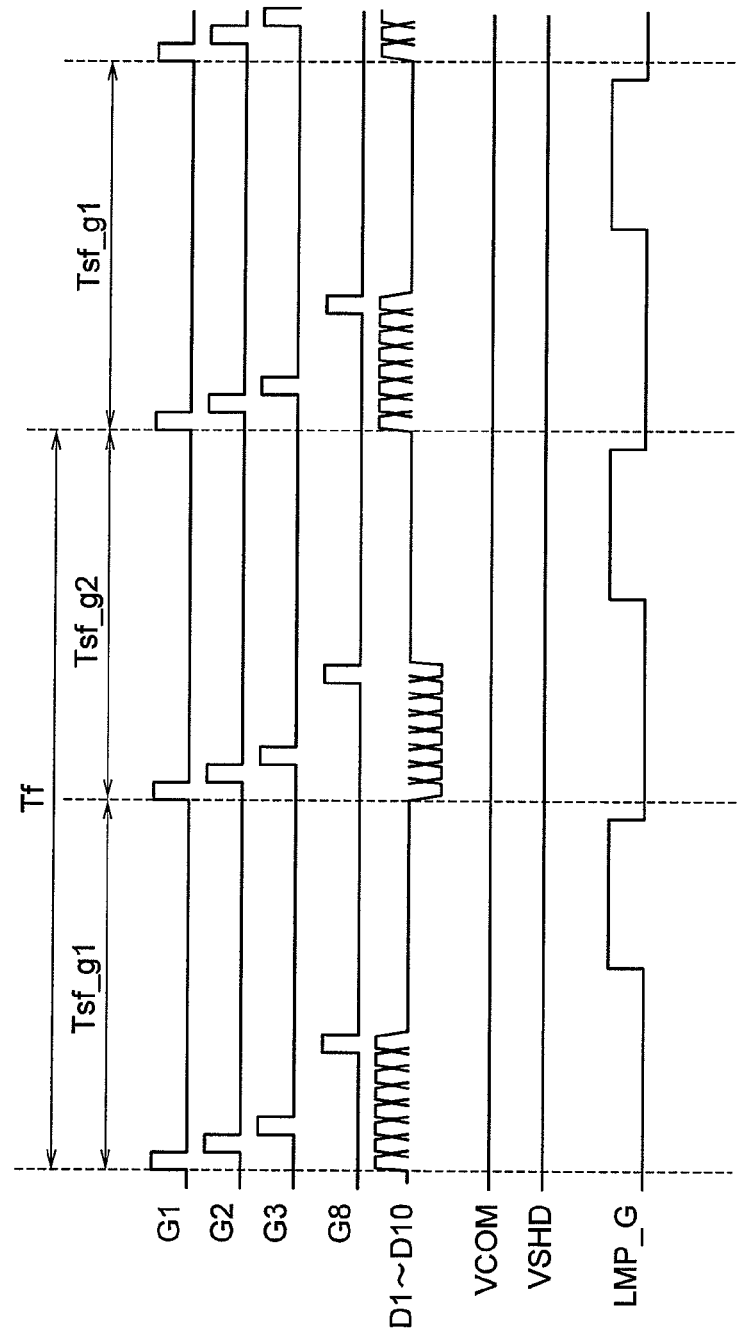
FIG. 32 is a timing chart for showing the driving method of the liquid crystal display device according to the fourteenth exemplary embodiment of the invention.

FIG. 31 shows a timing chart of the liquid crystal display device 127 for R, B, and FIG. 32 shows a timing chart of the liquid crystal display device 126 for G.

First, actions of the liquid crystal display device 127 for R and B will be described by referring to FIG. 31. In the liquid crystal display device 127 for R and B, one frame period is divided into two sub-frame periods Tsf_r and Tsf_b.

In the sub-frame period Tsf_r, the gate driver circuit outputs a pulse to the gate lines G1-G8 for driving the pixel TFTs to be turned to ON state successively. The data driver circuit outputs a video signal of red (R) to the data lines by synchronizing with the output of the gate driver circuit. Through these actions, the video signal is written successively to each pixel row along the gate lines. During a period where a control signal LPM_R becomes high level, which is after a certain period past from the time where the video signal is written to the last pixel row that is connected to the gate line G8, rotary action is controlled such that the R filter 132 of the color wheel 125 comes on an optical path that connects the mirror 123 and the liquid crystal display device 127 for R, B, so that the light of red wave range is irradiated to the liquid crystal display device 127. An R image that is the transmitted light therefrom is projected on a screen through the synthesizing prism 128 and the projection lens 129.

Similarly, a video signal of B is written successively to the liquid crystal display device 127 also in the sub-frame period Tsf_b, and rotary action is controlled such that the B filter 133 of the color wheel 125 comes on the optical path that connects the mirror 123 and the liquid crystal display device 127 for R, B during the period where the control signal LPM_B becomes high level. Thereby, an image of blue (B) can be obtained. This image (B) is also projected on the screen through the synthesizing prism 128 and the projection lens 129.

Meanwhile, with the liquid crystal display device 126 for G, one frame period is divided into two sub-frame periods Tsf_g1 and Tsf_g2 as shown in a timing chart in FIG. 32. A video signal of green (G) is displayed on the liquid crystal display device 126 in each frame, and it is projected on the screen. Videos displayed in the two sub-frame periods Tsf_g1 and Tsf_g2 may be completely identical video signals or may be video signals that are changed according to a certain rule.

As an example of the certain rule, considered is a driving method which sets luminance signal precision of inputted signals to be twice the precision that can be expressed originally by the liquid crystal display device 126 and, when displaying the luminance that is equal to or less than the minimum resolution of the liquid crystal display device 126, cancels the display in one of the sub-frame periods.

Through these actions, the number of gradations of G can be doubled. The timing for projecting the images of R, B and the timing for projecting the images of G may be completely the same or may be shifted from each other. The counter electrode potential VCOM and the shield electrode potential VSHD of the liquid crystal display device for R, B and the liquid crystal display device for G are both set as certain potentials. As the method for setting the potentials, any methods described along with the sectional structure of the liquid crystal device in the seventh-eleventh exemplary embodiments may be employed.

With the fourteenth exemplary embodiment, it becomes possible to reduce the size and the cost of the liquid crystal projector. The reason for this is that it is possible with this embodiment to configure a projector with two liquid crystal display devices, whereas three liquid crystal display devices are required conventionally.

Fifteenth Exemplary Embodiment

Figure 33:
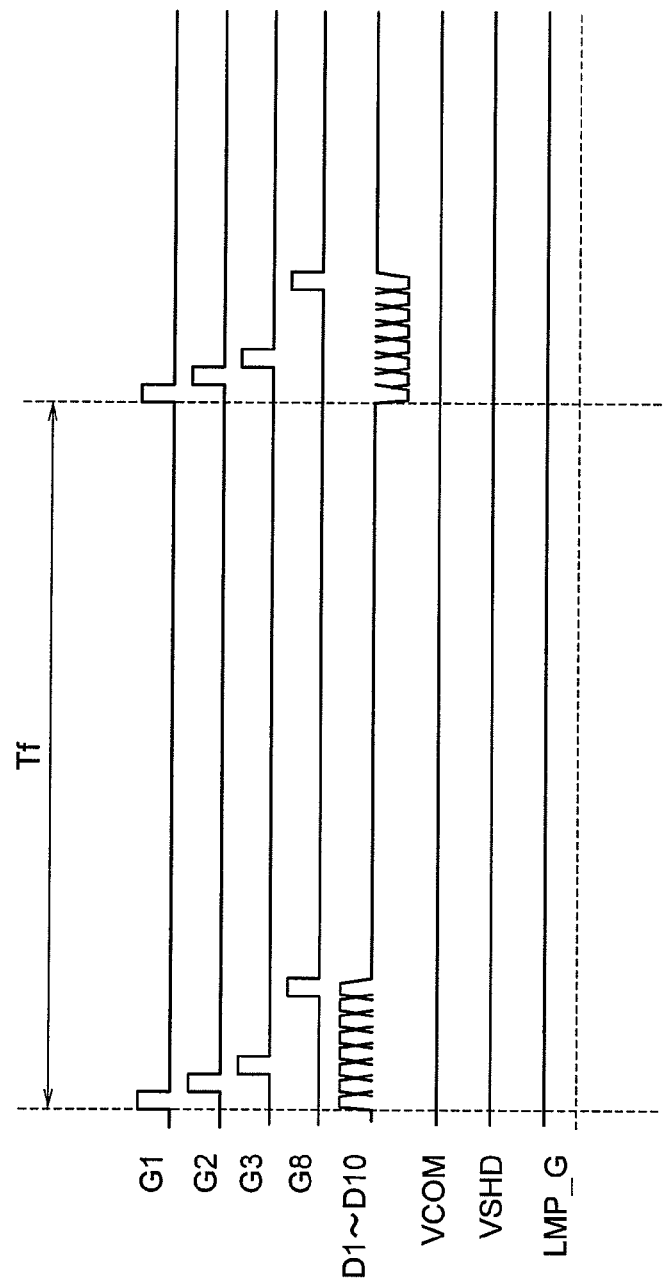
FIG. 33 is a timing chart for showing a driving method of a liquid crystal display device according to a fifteenth exemplary embodiment of the invention.

FIG. 33 shows a timing chart showing another driving method of the liquid crystal display device 126 for G of the liquid crystal projector that is shown in FIG. 28 as the fourteenth exemplary embodiment of the invention.

With this driving method illustrated herein, the liquid crystal display device 126 for G displays an image of (G) only once in a single frame period. Further, the light of green (G) wave range is irradiated to the liquid crystal display device constantly in one frame. Therefore, it is unnecessary to provide the color wheel for G that is illustrated in the configuration of the liquid crystal projector shown in FIG. 28.

With this liquid crystal projector, the size and the cost of the device can be reduced, since it becomes possible to configure the projector with two liquid crystal display devices, whereas three liquid crystal display devices are required conventionally. Further, it is because the color wheel for G becomes unnecessary.

Sixteenth Exemplary Embodiment

Figure 34:
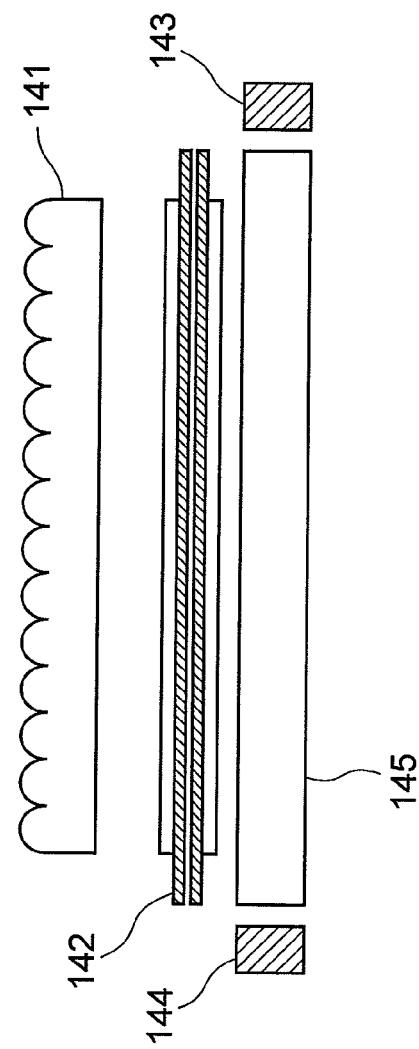
FIG. 34 is a block diagram showing a structure of a three-dimensional image display that is a sixteenth exemplary embodiment of the invention.

FIG. 34 is a block diagram showing a sixteenth exemplary embodiment of the invention.

The sixteenth exemplary embodiment of the invention includes a backlight (lighting device) 145 that is capable of controlling the light-up period separately for the left and right sides, a liquid crystal display panel 142, a lens array 141, light sources 143, 144 on the left and right sides and, even though not shown, a control circuit for driving the liquid crystal display device and the backlight, and a power supply. The liquid crystal display panel 142 is the liquid crystal display device of the above-described embodiments, i.e. the device that is provided with a shield electrode 25. The angles of the light emitted from the backlight 145 vary depending on which of the two light sources (the light source 143 or the light source 144) is lighted up.

Figure 35:
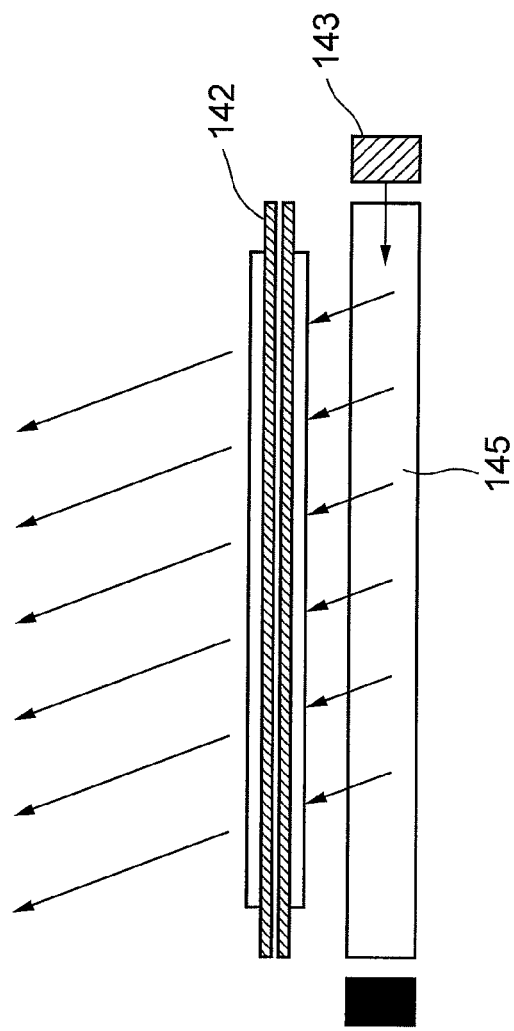
FIG. 35 is an illustration for describing an action of a backlight used in the sixteenth exemplary embodiment of the invention.
Figure 36:
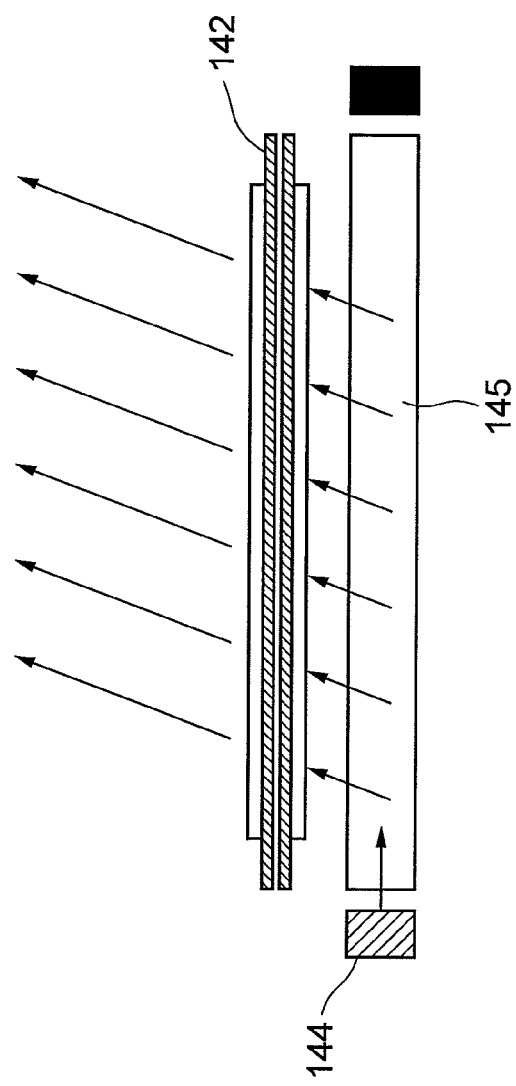
FIG. 36 is an illustration for describing another action of the backlight used in the sixteenth exemplary embodiment of the invention.

FIG. 35 and FIG. 36 are illustrations respectively showing the irradiation directions of the light when the light source 143 and the light source 144 are lighted up. For example, when the light source 143 is lighted up as in FIG. 35, the light emitted therefrom turns out to be parallel light rays that are tilted to the left with respect to a perpendicular line for the top face of the backlight 145.

Similarly, when the light source 144 is lighted up as in FIG. 36, the light emitted therefrom turns out to be parallel light rays that are tilted to the right with respect to the perpendicular line.

The backlight 145 irradiates the light emitted towards one of two different directions to a first observing position by transmitting through the liquid crystal display panel 142, specifically the pixels thereon, and irradiates the light emitted towards the other direction to a second observing position by transmitting through the pixels. The control circuit 32 displays an image for the first observing position or an image for the second observing position in accordance with the directions of the irradiated light, through outputting an instruction to the backlight 145 to irradiate the light emitted towards the two different directions alternately for every continuous two sub-frame periods.

Thereby, the images that are different from each other are displayed for the first observing position and the second observing position. Further, by setting the first observing position and the second observing position for the positions of the left eye and the right eye of an observer, it becomes possible to display a three-dimensional image through displaying the image for the right eye and the image for the left eye. Furthermore, each of the light source 144 and the light source 143 is configured with three light sources that correspond to the primary colors of light, R, G, and B. Each of those light sources can control the light-up period individually.

Figure 37:
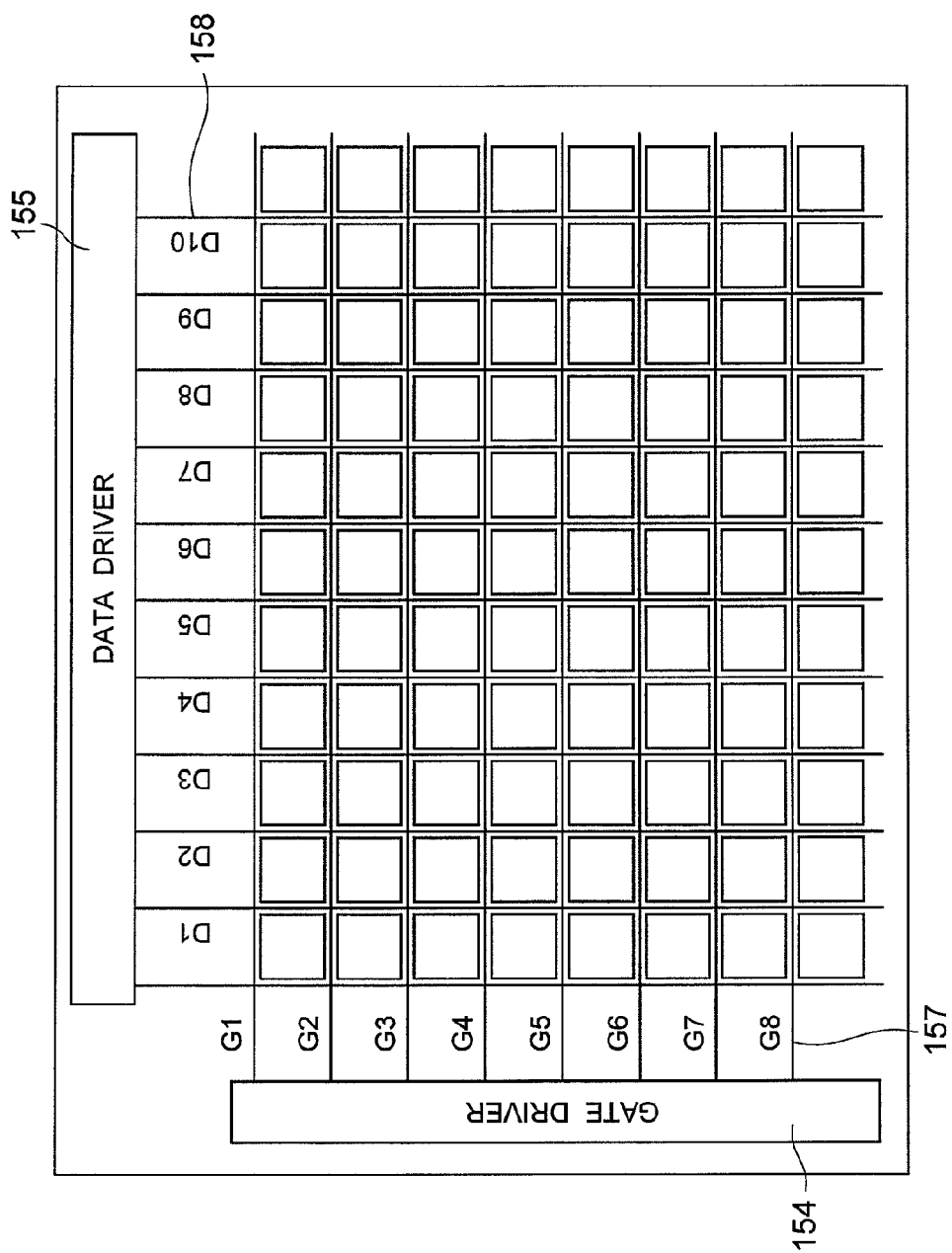
FIG. 37 is a block diagram showing a structure of a liquid crystal display device according to the sixteenth exemplary embodiment of the invention.

FIG. 37 is an illustration showing a structure of the liquid crystal display panel 142 that is used as the display of this exemplary embodiment. The liquid crystal display panel 142 has no color filter, and each pixel is not divided into sub-pixels. As a configuration and a structure of the liquid crystal display device, any of the above-described first to sixth exemplary embodiments of the invention can be employed. Further, a material that is capable of high-speed action is used for the liquid crystal.

Figure 38:
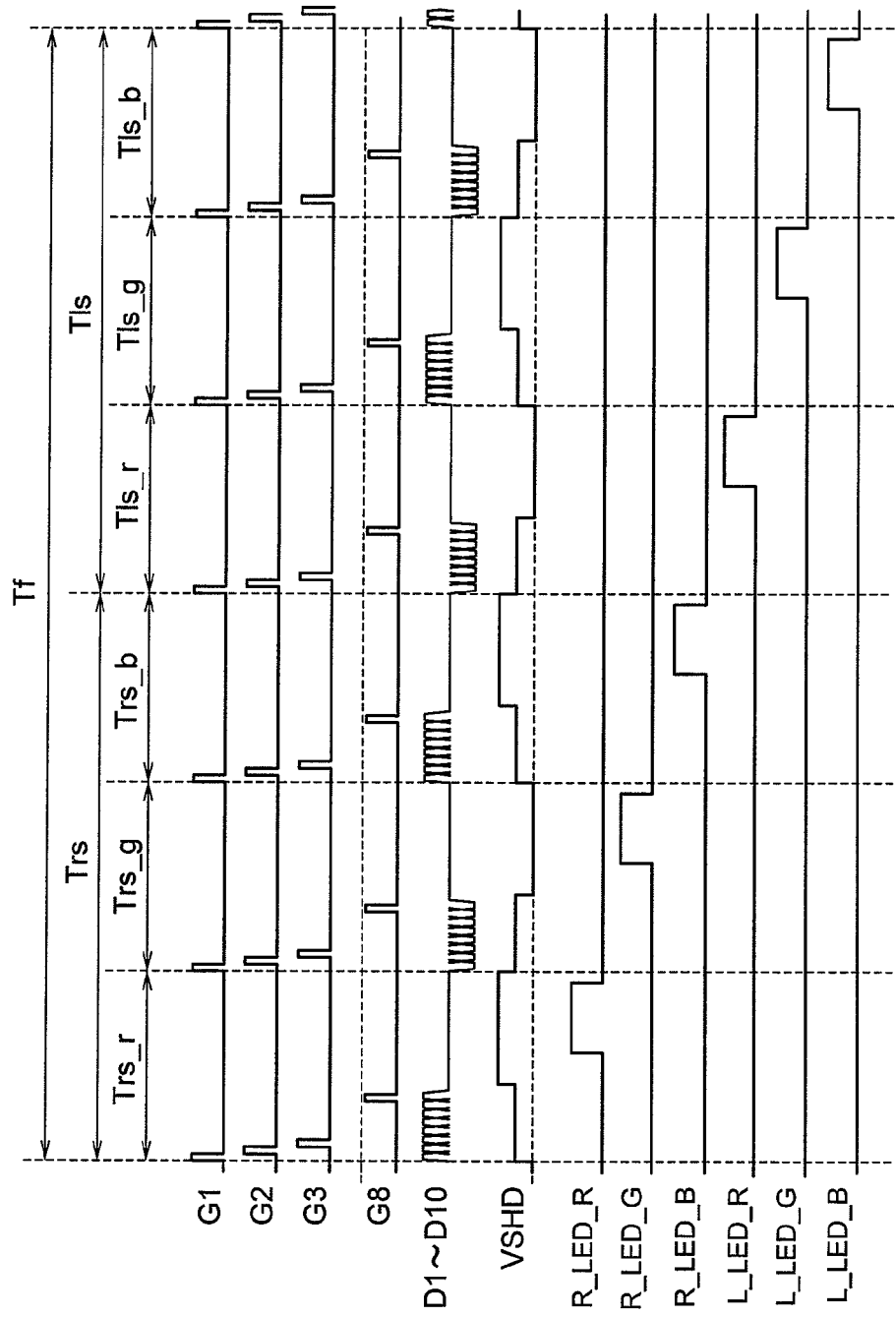
FIG. 38 is a timing chart for showing a driving method of the liquid crystal display device according to the sixteenth exemplary embodiment of the invention.

FIG. 38 is a timing chart showing the actions of the liquid crystal display panel 142. Tf in the drawing indicates a frame period where a three-dimensional image for one screen is displayed. In this liquid crystal display panel, this frame period Tf is divided into two sub-frame periods Trs and Tls. Trs is a sub-frame period where an image that reaches the right eye is displayed, and Tls is a sub-frame period where an image that reaches the left eye is displayed.

Each sub-frame is further divided into three periods. The sub-frame Trs is divided into Trs_r, Trs_g, Trs_b, and the sub-frame Tls is divided into Tls_r, Tls_g, Tls_b. Actions in each of the periods Trs_r, Trs_g, Trs_b, Tls_r, Tls_g, and Tls_b may be executed by any one of the methods described in the seventh-eleventh exemplary embodiments, and a three-dimensional image can be displayed thereby. In the drawing, R_LED_R shows the period where the light source (of the light source 144) emitting the light of red wave range is lighted up. Similarly, R_LED_G shows the period where the light source (of the light source 144) emitting the light of green wave range is lighted up, and R_LED_B indicates the period where the light source (of the light source 144) emitting the light of blue wave range is lighted up. Meanwhile, L_LED_R, L_LED_G, and L_LED_B show the periods where the light sources (of the light source 143) emitting the light of red wave range, the light of green wave range, and the light of blue wave range are lighted up, respectively.

With this exemplary embodiment of the invention, it is possible to display a color three-dimensional image to be bright with fewer flickers. It is because no color filter is used in the liquid crystal display device that is employed for this exemplary embodiment of the invention. Thus, it is unnecessary to divide the pixels into three sub-pixels, so that the light of the backlight can be utilized efficiently. Furthermore, it is unnecessary to divide the pixels for displaying the image for the right eye and the image for the left eye. Therefore, it is possible to provide a larger numerical aperture for transmitting the light when fabricating a liquid crystal display device having the same display area. Thus, a brighter image can be obtained. The reasons for enabling the flickers to be reduced are the same as those described above in the first-thirteenth exemplary embodiments.

Seventeenth Exemplary Embodiment

Figure 39:
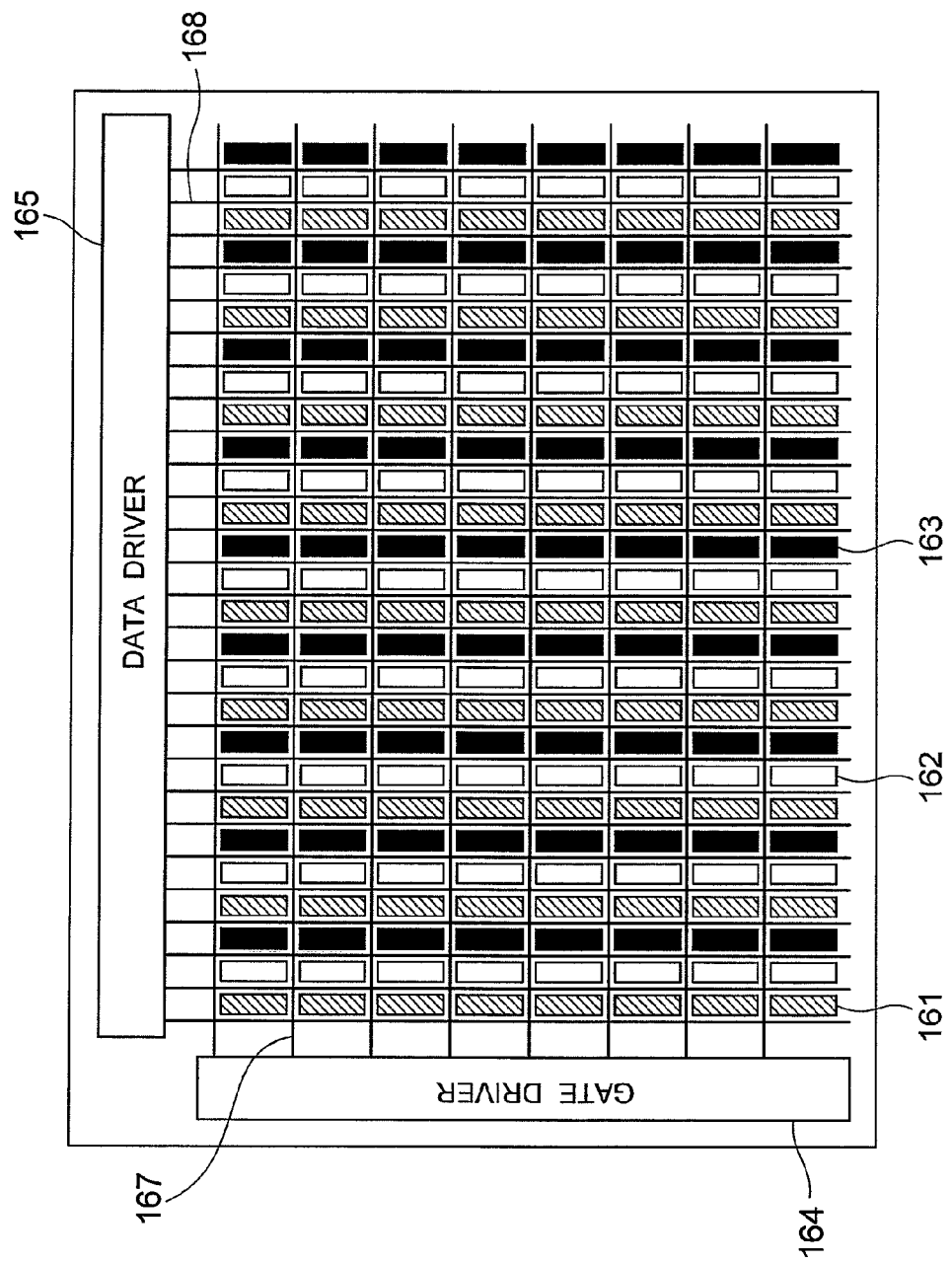
FIG. 39 is a block diagram showing a structure of a display part of a liquid crystal display device used in a three-dimensional image display that is a seventeenth exemplary embodiment of the invention.
Figure 40:
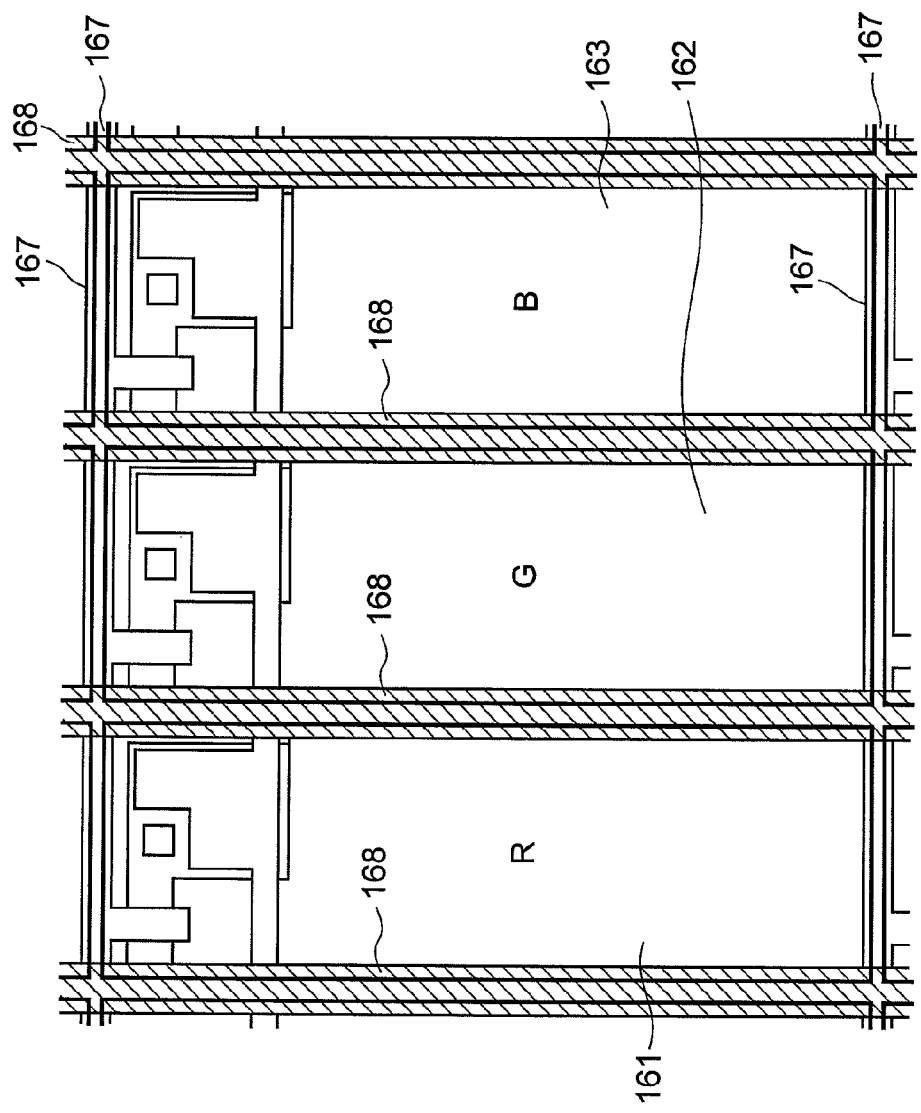
FIG. 40 is an illustration for describing a pixel layout of the liquid crystal display device used in the seventeenth exemplary embodiment of the invention.

FIG. 39 shows another structure of the liquid crystal display panel that is shown in FIG. 34. As shown in FIG. 40, in this liquid crystal display panel, each pixel is divided into three sub-pixels of R, G, and B. Therefore, a light source that emits white light is used for the light source R and the light source L of the backlight, respectively.

Figure 41:
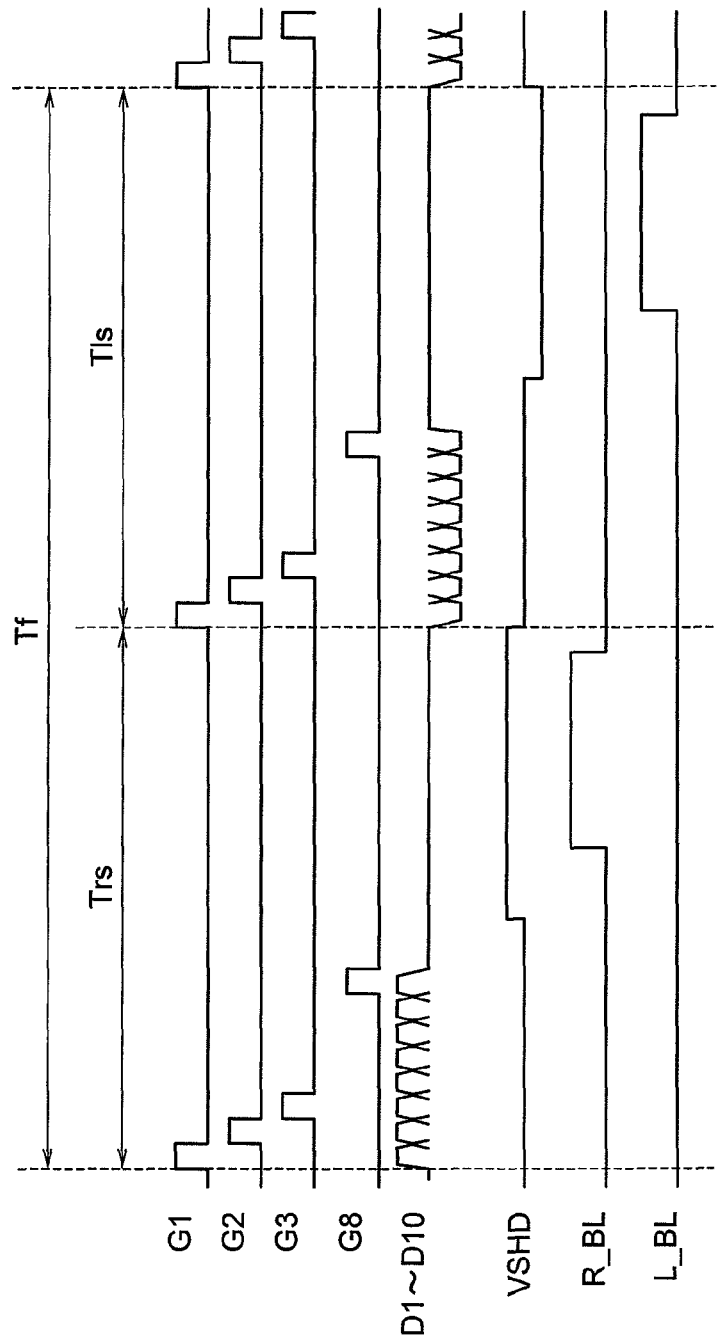
FIG. 41 is a timing chart for showing a driving method of the liquid crystal display device used in the seventeenth exemplary embodiment of the invention.
Figure 42:
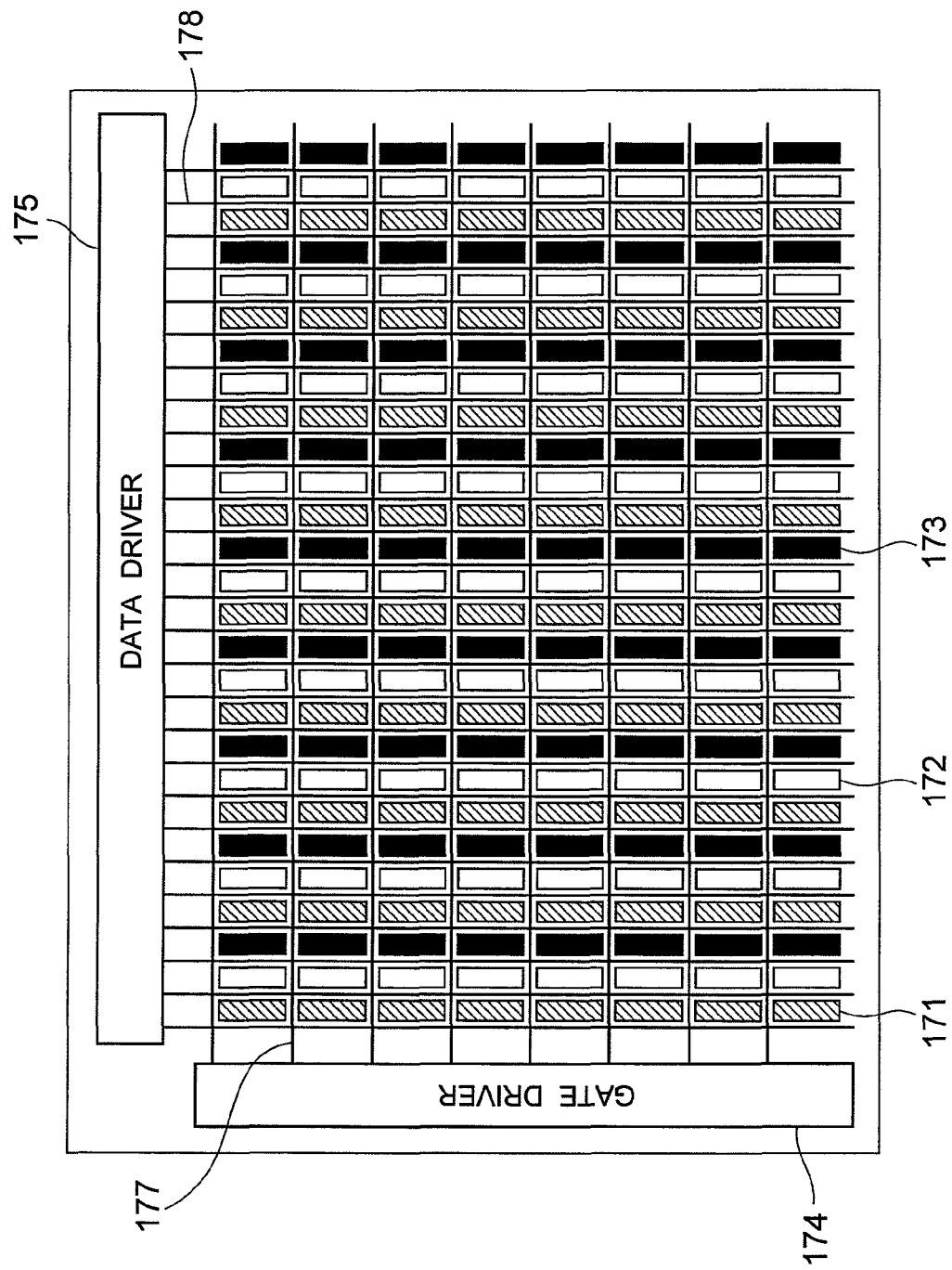
FIG. 42 is a block diagram showing a structure of a display part of a related liquid crystal display device.
Figure 43:
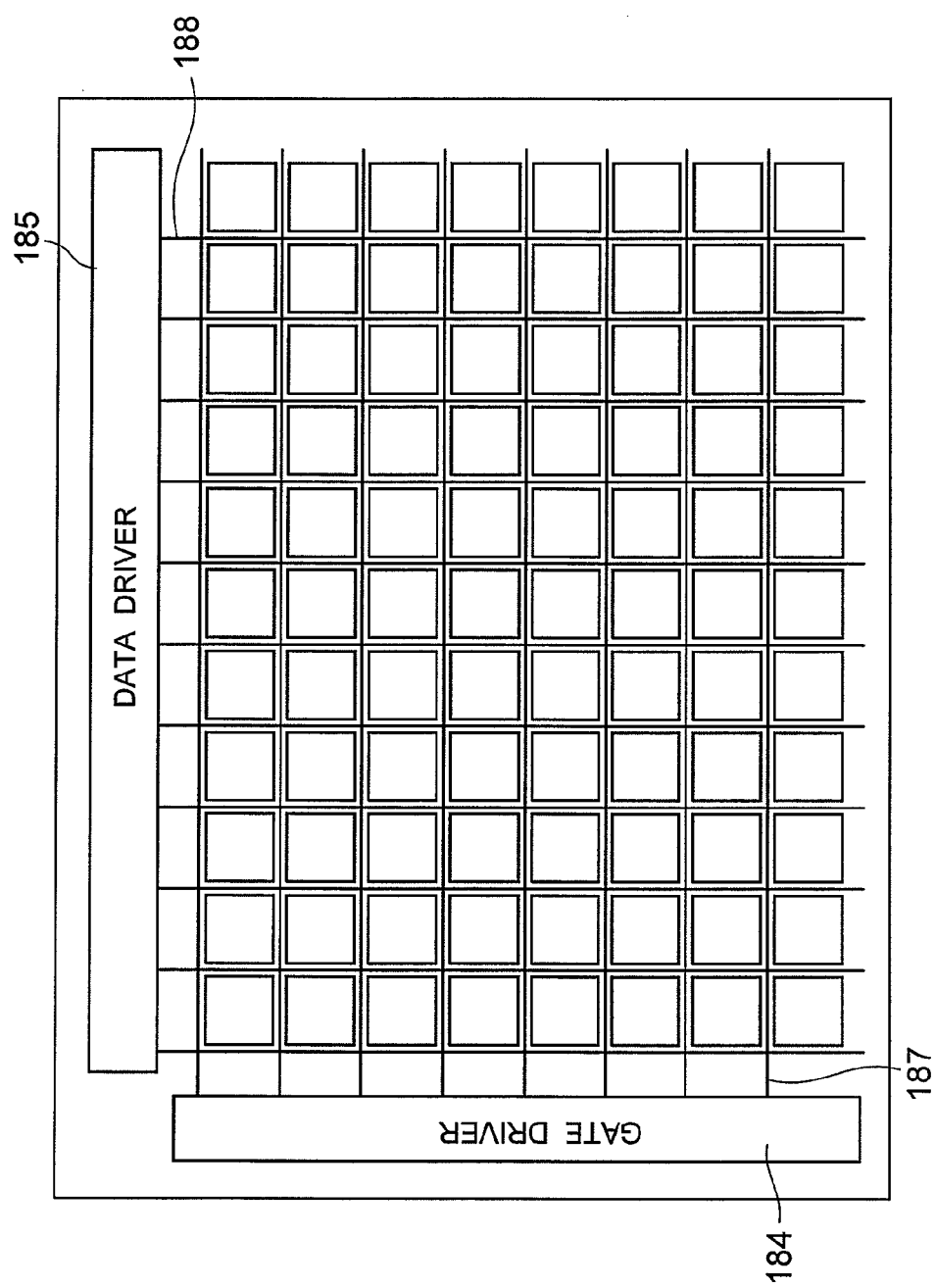
FIG. 43 is a block diagram showing a structure of the liquid crystal display device used in a related liquid crystal projector.
Figure 44:
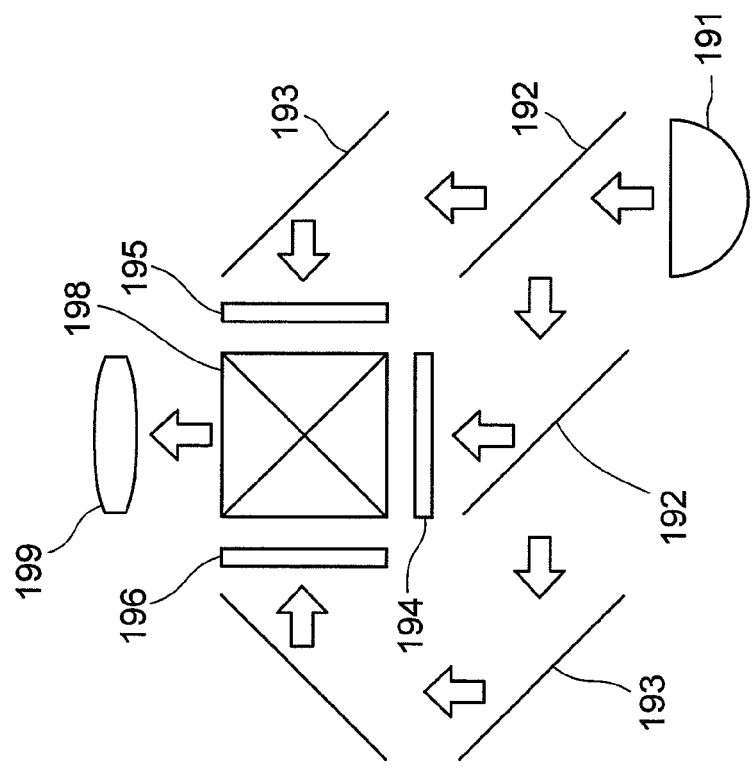
FIG. 44 is an illustration for describing a structure of the related liquid crystal projector.
Figure 45:
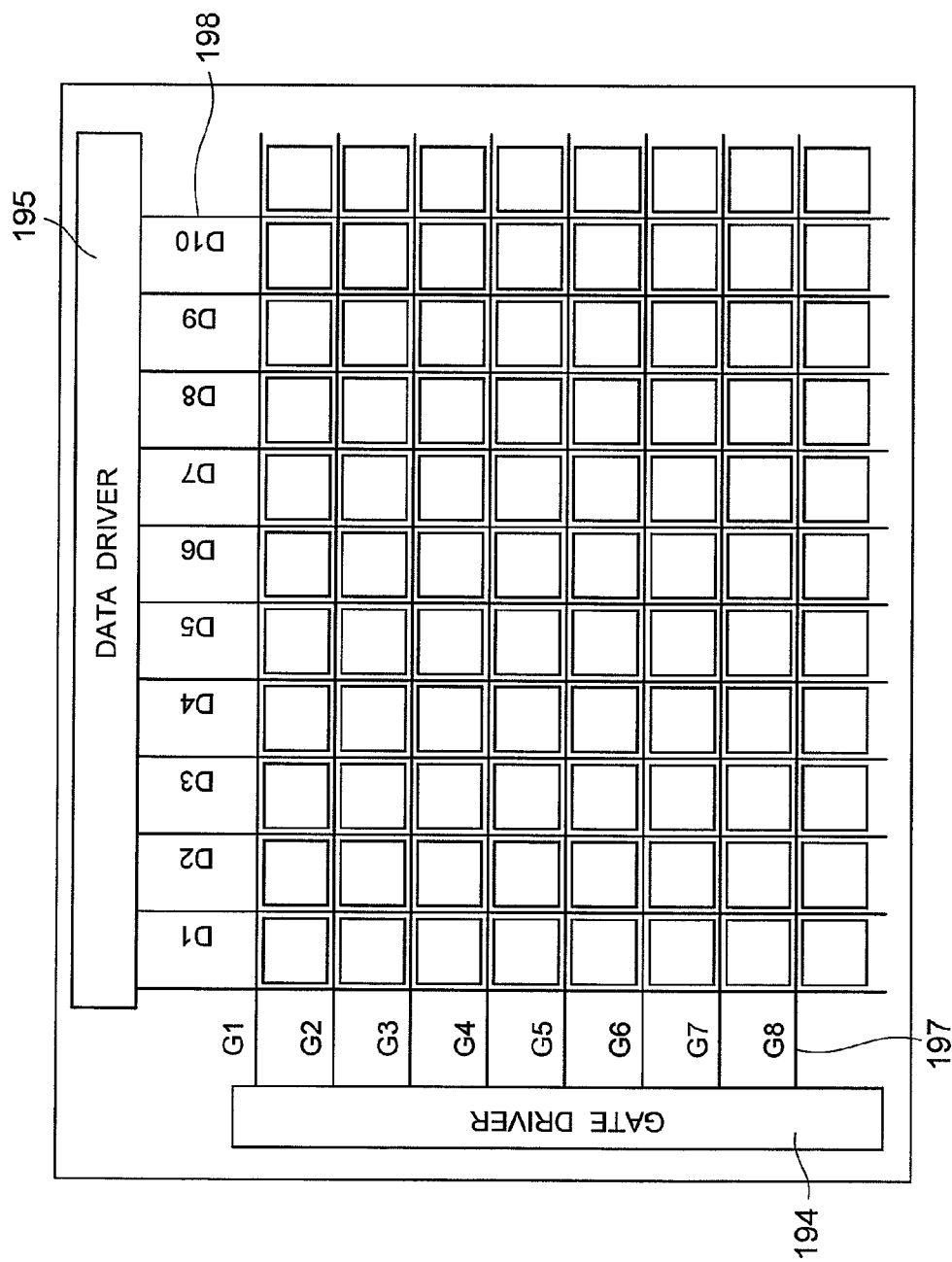
FIG. 45 is a block diagram showing a structure of a related field sequential type liquid crystal display device.
Figure 46:
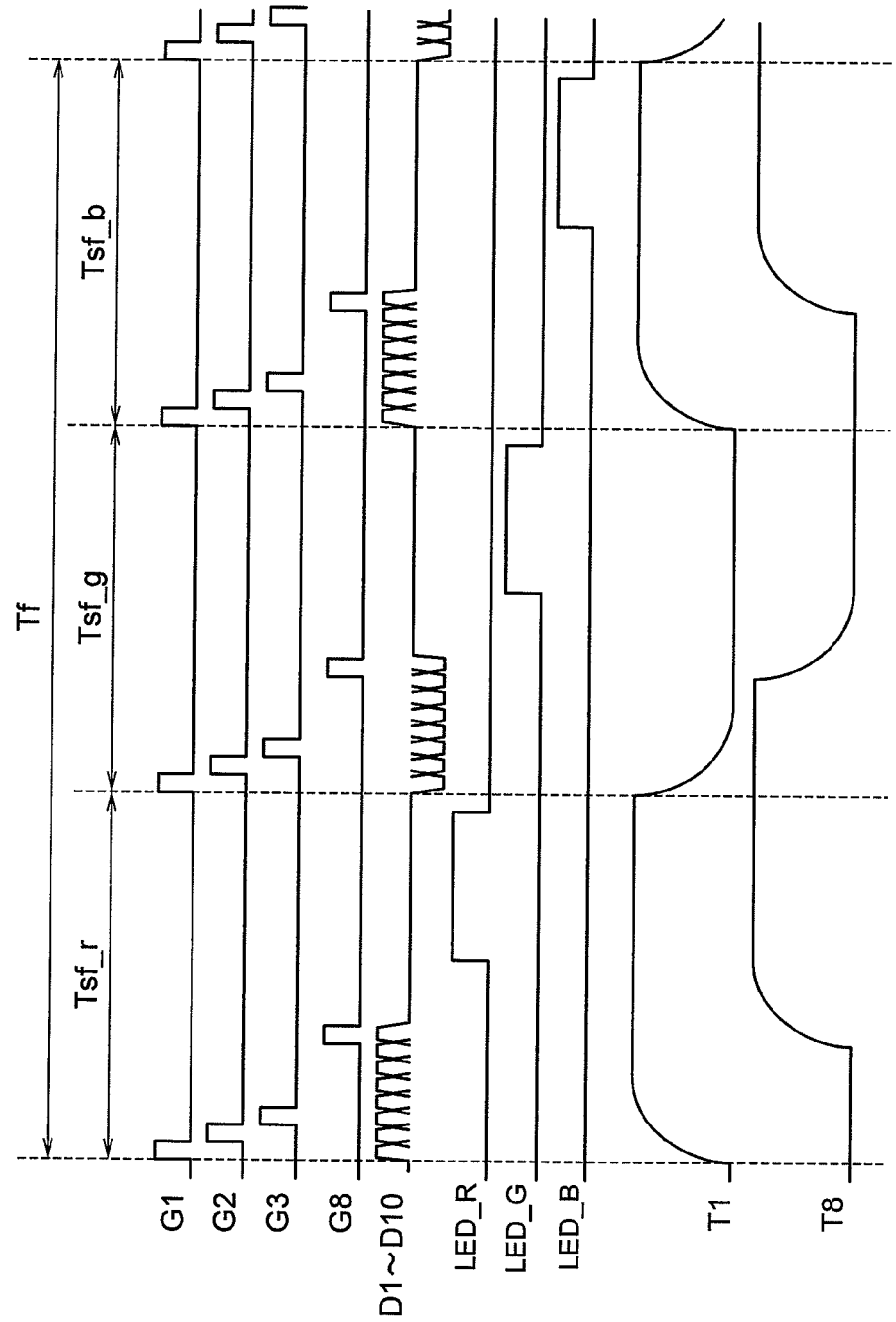
FIG. 46 is a timing chart for showing a driving method of the related field sequential type liquid crystal display device.
Figure 47:
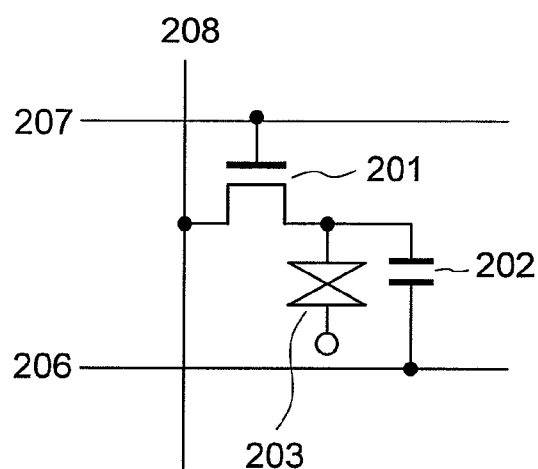
FIG. 47 is an equivalent circuit diagram of a single pixel of the related field sequential type liquid crystal display device.
Figure 48:
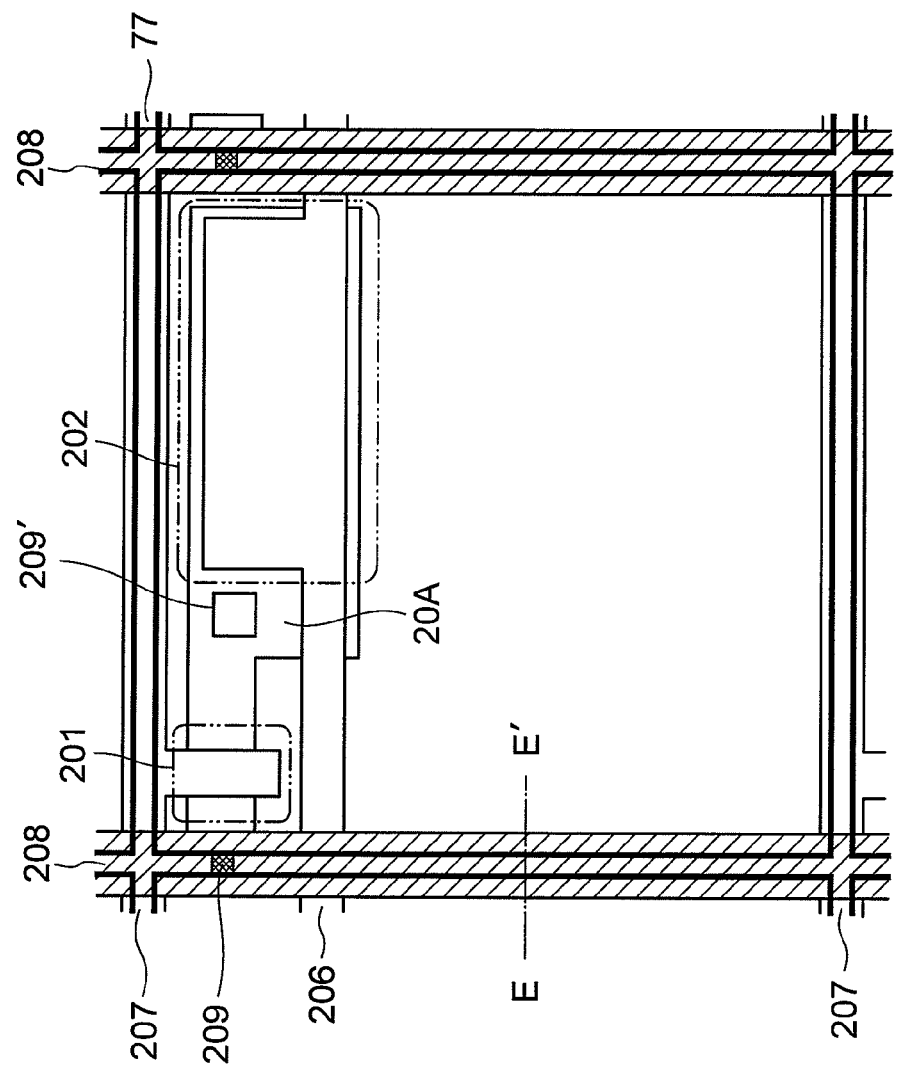
FIG. 48 is a plan view showing a structure of a single pixel of the related field sequential type liquid crystal display device.
Figure 49:
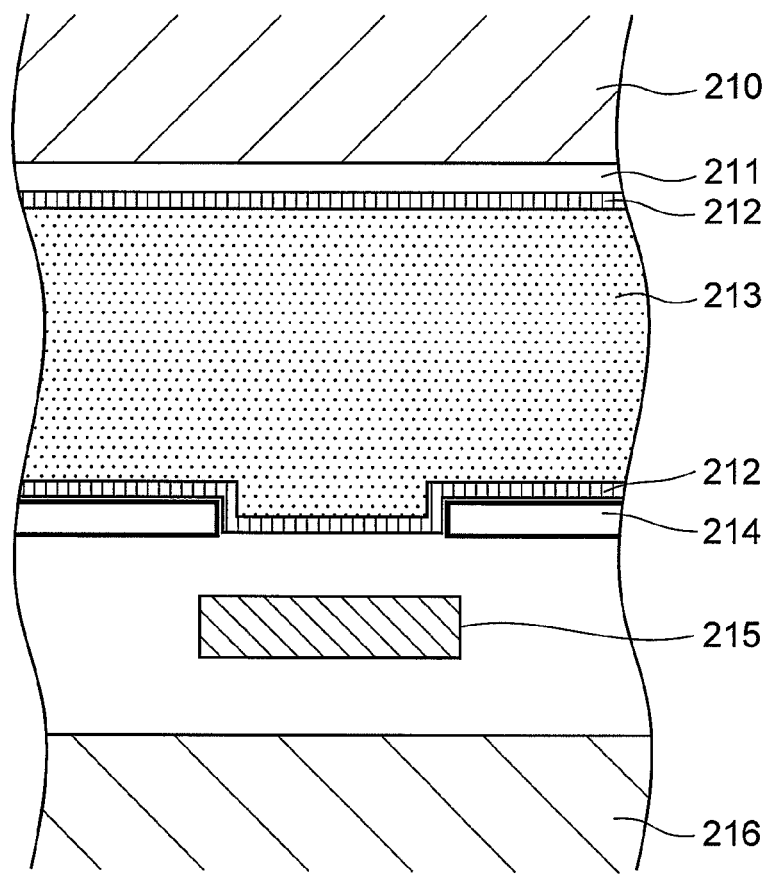
FIG. 49 is an illustration of a sectional structure of the related field sequential type liquid crystal display device.

FIG. 41 shows a timing chart of the liquid crystal display device of the seventeenth exemplary embodiment. One frame period Tf where a three-dimensional image for one screen is displayed is divided into two sub-frame periods Trs and Tls, and an image for the right eye and an image for the left eye are displayed in each of the sub-frame periods.

The period for lighting up the light source R is shown with a high-level period of R_BL, and light-up is started after passage of a certain time from the point when writing of the image for the right eyes is completed. Similarly, the period for lighting up the light source L is shown with a high-level period of L_BL.

As a configuration and a structure of the liquid crystal display device, any of the above-described first to sixth exemplary embodiments of the invention can be employed. Further, the counter electrode potential VCOM, the shield electrode potential VSHD, and the video signal potential may be set in accordance with the structure, and the device may be operated by any one of the methods described above in the seventh-eleventh exemplary embodiments. Furthermore, a material that is capable of high-speed response is used for the liquid crystal.

With this exemplary embodiment of the invention, it is possible to display a color three-dimensional image to be bright with fewer flickers. The reason for this is that it is unnecessary with the liquid crystal display device used in this exemplary embodiment to divide the pixels for displaying the image for the right eye and the image for the left eye. Therefore, it is possible to provide a larger numerical aperture for transmitting the light when fabricating a liquid crystal display device having the same display area. Thus, a brighter image can be obtained. The reasons for enabling the flickers to be reduced are the same as those described above in each of the first-tenth exemplary embodiments.

In addition, with the exemplary embodiment of the invention, it is possible to use the liquid crystal display device and the liquid crystal system described in each of the exemplary embodiments for portable terminal devices. This makes it possible to achieve a portable terminal device with a bright display luminance having fewer flickers on a display part.

In the above, the liquid crystal display device and the liquid crystal system of the exemplary embodiments of the invention as well as the driving methods employed therein are described. However, the contents executed in each step of the above-described driving methods may be formed into programs to be executed by a computer of the control part. This makes it possible with the computer to achieve such propositions to reduce flickers even when a liquid material capable of high-speed response is used, and to increase the display luminance.

With the embodiments of the invention, it is possible to reduce flickers dramatically even when a liquid crystal material of high response speed is used for the liquid crystal display device.

Flickers as the issue of the liquid crystal display device that uses a material of high response speed for the liquid crystal are generated because a potential fluctuation of the data line generates a potential fluctuation of the pixel electrode when the pixel electrode and the data line are coupled due to the parasitic capacitance. A shield electrode layer is provided under the pixel electrode via an insulating film in the liquid crystal display device of the present invention, so that the parasitic capacitance of the pixel electrode and the data line or the like can be reduced to be extremely small. Thereby, the flickers can be reduced dramatically.

Further, with the exemplary embodiment of the invention, it is possible to improve the display luminance of the field sequential type liquid crystal display device. With the field sequential type, the amount of light required for achieving a proper white balance becomes larger in order of G, R, B. Thus, in field sequential drive, it is effective to display more images of G than images of others for improving the luminance. However, when the number of sub-frames is increased, each sub-frame period becomes shorter, thereby requiring a liquid crystal material that is capable of responding at still higher speed. As described above, however, when the response speed of the liquid crystal becomes fast, flickers are to be generated.

Since it is possible with the exemplary embodiment of the invention to reduce the flickers even when a material of high response speed is used, the driving method employing a large number of sub-frames can be used. Therefore, a bright image with fewer flickers can be obtained.

Further, with the exemplary embodiment of the invention, it becomes possible to reduce the size and the cost of the liquid crystal projector. With the exemplary embodiment of the invention, images with fewer flickers can be obtained even when the field sequential system is used for the liquid crystal display device. Therefore, it is possible to configure a projector with two liquid crystal display devices, whereas three liquid crystal display devices are required conventionally. Thereby, the size and the cost of the liquid crystal display device can be reduced. Furthermore, it is possible with the exemplary embodiment of the invention to display three-dimensional color images to be bright with fewer flickers.

Even when the field sequential type is employed for the liquid crystal display device used in the exemplary embodiment of the invention, images with fewer flickers can be obtained. Thus, it is unnecessary to provide the color filter. Therefore, it is unnecessary to divide each pixel into three sub-pixels, so that the light of the backlight can be utilized efficiently. Furthermore, it is unnecessary to divide the pixels for displaying the image for the right eye and the image for the left eye. Therefore, it is possible to provide a larger numerical aperture for transmitting the light when fabricating a liquid crystal display device having the same display area. Thus, a brighter image can be obtained.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

As described above, it is possible with the present invention to achieve the liquid crystal display device having a bright screen with fewer flickers. Therefore, the present invention can be applied broadly to wide ranges of industrial fields that use liquid crystal display devices, such as TV sets, image pick-up devices, portable terminals, projectors, etc., and its applicability is high.

What is claimed is:

1. A liquid crystal display device, comprising:
   a display panel including a pixel matrix in which pixels each including at least a switching element and a pixel electrode are arranged in matrix near intersection points of data lines and gate lines arranged longitudinally and laterally, and a counter electrode that is arranged to oppose the pixel matrix with a liquid crystal layer interposed therebetween; and
   a control part for dividing a period for displaying a color image of one frame into a plurality of sub-frame periods, and lighting up light sources of different colors for each of the sub-frame periods to display images according to the colors of the light sources on the display panel, wherein
   a shield electrode layer separated by an insulating film is disposed between the pixel electrode and the data lines,
   the shield electrode layer reduces a coupling of capacitances of the pixel electrode and the data line through shielding, and
   the control part applies a voltage to the shield electrode layer by changing a waveform for each of the sub-frame periods.

2. The liquid crystal display device as claimed in claim 1, wherein the control part sets polarities of video signals written to all the pixels of the pixel matrix for the counter electrode to be same for each of the sub-frame periods, and changes the waveform of the voltage applied to the shield electrode layer depending on the polarities of the video signals for the counter electrode.

3. The liquid crystal display device as claimed in claim 1, wherein the control part divides each of the sub-frame periods at least into two periods, a writing period for writing the video signal to the pixel matrix and a display period for lighting up the light source, and changes the voltage waveform that is applied to the shield electrode layer in the display period.

4. The liquid crystal display device as claimed in claim 1, comprising a lighting device for irradiating, to the display panel, light of high directivity in two different directions.

5. The liquid crystal display device as claimed in claim 4, wherein:
   the lighting device irradiates the light emitted towards one of the two different directions to a first observing position by transmitting the pixels, and irradiates the light emitted towards other one of the directions to a second observing position by transmitting the pixels; and
   the control part displays an image for the first observing position or an image for the second observing position in accordance with the directions of the irradiated light through outputting an instruction to the lighting device to irradiate the light emitted towards the two different directions alternately for every continuous two sub-frame periods.

6. The liquid crystal display device as claimed in claim 4, wherein:
   the lighting device irradiates the light emitted towards one of the two different directions to the right eye of an observer by transmitting the pixels, and irradiates the light emitted towards other one of the directions to the left eye of the observer by transmitting the pixels; and
   the control part displays an image for a right eye or an image for a left eye in accordance with the directions of the irradiated light through outputting an instruction to the lighting device to irradiate the light emitted towards the two different directions alternately for every continuous two sub-frame periods.

7. A liquid crystal display device, comprising:
   a display panel including a pixel matrix in which pixels each including at least a switching element and a pixel electrode are arranged in matrix near intersection points of data lines and gate lines arranged longitudinally and laterally, and a counter electrode that is arranged to oppose the pixel matrix with a liquid crystal layer interposed therebetween; and
   a control means for dividing a period for displaying a color image of one frame into a plurality of sub-frame periods, and lighting up light sources of different colors for each of the sub-frame periods to display images according to the colors of the light sources on the display panel, wherein
   a shield electrode layer separated by an insulating film is disposed between the pixel electrode and the data lines,
   the shield electrode layer reduces a coupling of capacitances of the pixel electrode and the data line through shielding; and
   the control means applies a voltage to the shield electrode layer by changing a waveform for each of the sub-frame periods.

8. A driving method for displaying an image on a display panel that includes: a pixel matrix in which pixels each including at least a switching element and a pixel electrode are arranged in matrix near intersection points of data lines and gate lines arranged longitudinally and laterally, and a counter electrode that is arranged to oppose the pixel matrix with a liquid crystal layer interposed therebetween, the method comprising:
   dividing a period for displaying a color image of one frame into a plurality of sub-frame periods, and lighting up light sources of different colors for each of the sub-frame periods to display images according to the colors of the light sources on the display panel;
   reducing a coupling of capacitances of the pixel electrode and the data line through shielding; and
   applying a voltage to a shield electrode layer that is disposed between the pixel electrode and the data lines by changing a waveform for each of the sub-frame periods.

9. The driving method as claimed in claim 8, wherein polarities of video signals written to all the pixels of the pixel matrix for the counter electrode are set to be same for each of the sub-frame periods, and the waveform of the voltage applied to the shield electrode layer is changed depending on the polarities of the video signals for the counter electrode.

10. The driving method as claimed in claim 8, comprising: dividing each of the sub-frame periods at least into two periods, a writing period for writing the video signal to the pixel matrix and a display period for lighting up the light source, and changing the voltage waveform that is applied to the shield electrode layer in the display period.

11. The driving method as claimed in claim 8, comprising: dividing each of the sub-frame periods at least into two periods, a period for writing the video signal to the pixel matrix and a display period for lighting up the light source, and applying a correction voltage that is different from the video signal to the data line in the display period.

12. The driving method as claimed in claim 8, comprising, irradiating, to the display panel, light of high directivity in two different directions.

13. The driving method as claimed in claim 12, comprising:
irradiating the light emitted towards one of the two different directions to a first observing position by transmitting the pixels, and irradiating the light emitted towards other one of the directions to a second observing position by transmitting the pixels; and
displaying an image for the first observing position or an image for the second observing position in accordance with the directions of the irradiated light through outputting an instruction to the lighting device to irradiate the light emitted towards the two different directions alternately for every continuous two sub-frame periods.

14. The driving method as claimed in claim 12, comprising:
irradiating the light emitted towards one of the two different directions to the right eye of an observer by transmitting the pixels, and irradiating the light emitted towards other one of the directions to the left eye of the observer by transmitting the pixels; and
displaying an image for a right eye or an image for a left eye in accordance with the directions of the irradiated light through outputting an instruction to the lighting device to irradiate the light emitted towards the two different directions alternately for every continuous two sub-frame periods.

15. A non-transitory control program for drive-controlling a display panel that includes: a pixel matrix in which pixels each including at least a switching element and a pixel electrode are arranged in matrix near intersection points of data lines and gate lines arranged longitudinally and laterally, and a counter electrode that is arranged to oppose the pixel matrix with a liquid crystal layer interposed therebetween, the program allowing a computer to execute:
a function of outputting a control instruction to divide a period for displaying a color image of one frame into a plurality of sub-frame periods, and to light up light sources of different colors for each of the sub-frame periods to display images according to the colors of the light sources on the display panel;
a function of outputting a control instruction to reduce a coupling of capacitances of the pixel electrode and the data line through shielding; and
a function of outputting a control instruction to apply a voltage to a shield electrode layer that is disposed between the pixel electrode and the data lines by changing a waveform for each of the sub-frame periods.

* * * * *